US005710634A

United States Patent [19]
Kuriyama et al.

[11] Patent Number: 5,710,634
[45] Date of Patent: Jan. 20, 1998

[54] OUTPUT APPARATUS AND METHOD FOR READING AND RECORDING

[75] Inventors: Hiroyuki Kuriyama, Kawasaki; Hiraku Sonobe, Yokohama; Kiyoharu Yoshioka, Yokohama; Jun Miyamoto, Yokohama; Hidehiko Kajiya, Funabashi, all of Japan

[73] Assignee: Canon Kabushiki Kaisha, Tokyo, Japan

[21] Appl. No.: 69,382

[22] Filed: Jun. 1, 1993

[30] Foreign Application Priority Data

Jun. 3, 1992 [JP] Japan .................................. 4-142668
Jun. 22, 1992 [JP] Japan .................................. 187534

[51] Int. Cl.$^6$ .................................. H04N 1/21; H04N 1/04
[52] U.S. Cl. .................................. 358/296; 358/498
[58] Field of Search .................................. 358/488, 496, 358/498, 296

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/140 R |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 4,839,740 | 6/1989 | Yoshida | 358/488 |
| 5,038,218 | 8/1991 | Matsumoto | 358/488 |
| 5,038,228 | 8/1991 | Takuda | 358/488 |
| 5,055,946 | 10/1991 | Kurahashi et al. | 358/498 |
| 5,126,855 | 6/1992 | Saito | 358/496 X |
| 5,166,707 | 11/1992 | Watanabe et al. | 358/296 |
| 5,587,812 | 12/1996 | Kasuya | 358/498 |

FOREIGN PATENT DOCUMENTS 59-123670 7/1984 Japan .
59-138461 8/1984 Japan .

*Primary Examiner*—Michael L. Gellner
*Assistant Examiner*—Randy W. Gibson
*Attorney, Agent, or Firm*—Fitzpatrick, Cella, Harper & Scinto

[57] ABSTRACT

An output apparatus comprises a recording sheet conveying section having two feeder portions; a reader section for reading information which has been outputted onto a recording sheet; and an output section for outputting information onto a recording sheet. The apparatus determines whether a sheet set in a feeder portion is a print sheet or an original document, and performs reading and/or recording in accordance with the determination and/or an application being executed. The apparatus further has a memory for storing information which has been outputted onto a sheet and a comparator for comparing the information stored in the memory with the information read from the sheet by the reading section. Based on the comparison, the apparatus determines a proper manner (i.e., proper output position and orientation of the data) to output information onto the other side of the sheet, and also selects information to be outputted.

27 Claims, 69 Drawing Sheets

FIG. 13

|   | | | First Block |
|---|---|---|---|
| 1. | [1, n+1, 2n+1, ----, 7n+1] ---- 1 Byte |
| 2. | [8n+1, 9n+1, ----, 15n+1] ---- 1 Byte |
| 3. | [16n+1, 17n+1, ----, 23n+1] ---- 1 Byte |
| ---- | ---- |
| 8. | [56n+1, 57n+1, ----, 63n+1] ---- 1 Byte |

Second Block

| 1. | [2, n+2, ----, 7n+2] ---- 1 Byte |
|---|---|
| 2. | [8n+2, 9n+2, ----, 15n+2] ---- 1 Byte |
| 3. | [16n+2, 17n+2, ----, 23n+2] ---- 1 Byte |
| ---- | ---- |
| 8. | [56n+2, 57n+2, ----, 63n+2] ---- 1 Byte |

FIG. 23

| FLAG \ SET UP | ASF PAPER FLAG 0 | ADF PAPER FLAG 1 | PAPER MODE FLAG 2 | ORIGINAL FLAG 3 | PRINT PAPER FLAG 4 |
|---|---|---|---|---|---|
| 1 | PAPER EXISTS | PAPER EXISTS | BOTH ADF/ASF | DECIDE AS ORIGINAL | DECIDE AS PRINTING PAPER |
| 0 | PAPER NOT EXIST | PAPER NOT EXIST | FIXED TO ASF | NOT DECIDED | NOT DECIDED |

FIG. 25

| DISPLAY \ FLAG | 0 | 1 | 2 | 3 | 4 |
|---|---|---|---|---|---|
| A  ASF  [PAPER OUT] | 0 | - | - | - | - |
| B  ASF  START | 1 | - | - | - | - |

FIG. 26

| DISPLAY \ FLAG | 0 | 1 | 2 | 3 | 4 |
|---|---|---|---|---|---|
| C  NO DISPLAY | – | – | 0 | – | – |
| D  ADF  MANUAL FEED | – | 0 | 1 | – | – |
| E  ADF  START | – | 1 | 1 | – | 1 |
| F  ADF  ?  PRINT PAPER ? | – | 1 | 1 | – | 0 |

FIG. 27

| DISPLAY \ FLAG | 0 | 1 | 2 | 3 | 4 |
|---|---|---|---|---|---|
| G  PLEASE SET PAPER | 0 | – | 0 | – | – |
|  | 0 | 0 | 1 | – | – |
|  | 0 | 1 | 1 | – | 0 |
| H  NO DISPLAY | OTHER | | | | |

OUTPUT APPARATUS AND METHOD FOR READING AND RECORDING

BACKGROUND OF THE INVENTION

1. Field of the Invention

The present invention relates to an output apparatus comprising an output section for outputting information onto an output medium and a reader section for reading the information outputted onto the output medium so as to output the information read by the reader section, and a method thereof.

2. Description of the Related Art

Many offices are employing various electronic appliances such as copying machines, word processors, facsimiles, computers, etc. in order to enhance the efficiency and productivity of desk work or the like. However, it is not easy to set such a variety of appliances on a desk because they take up an inconveniently large space. To solve this problem, a combined and thus compact apparatus having the functions of these individual appliances has been put on the market. Such a combined compact apparatus has been developed based on the fact that the individual appliances commonly employ printers and microprocessors.

An example of such a combined system is shown in FIG. 57. A reading and recording apparatus 500 has a display section 501 supported by a hinge portion 502 provided in a middle portion of the apparatus 500. Thus, the display section 501 is able to take at least two positions: a closed position at which the display section 501 covers a keyboard 503 provided in a front portion of the apparatus 500; and an open position at which the display panel of the display section 501 can be easily viewed from the front.

When the display section 501 is at the open position, a document stand 505 provided near the hinge portion 502 is exposed. When an original D is set on the document stand 505, the original D is fed into an image reader section (referred to as "the scanner section" hereinafter) contained in a main body 506 provided in the rear of the display section 501. Image information is read from the original D by a photo-electric converting device, such as a CCD, provided in the scanner section. The original D is then ejected onto one of trays 507. The information read by the photo-electric converting device is stored in a floppy disk or a memory device provided in a main body 506, and then processed, edited or transmitted to an external facsimile apparatus through a facsimile modem, a communication line or the like.

The reading and recording apparatus 500 is connected to an ink-jet printer 510 by means of a connector provided in a rear portion of the apparatus. The printer 510 prints out the image information read by the scanner section, word-processor documents or spread sheets or the like inputted to the main body 506, and documents or images received from an external facsimile apparatus, and the like. As described above, the system composed of the two casings, that is, the reading and recording apparatus 500 and the printer 510, has the functions of a word processor, a computer, a facsimile and a copying machine, thus achieving a reduction of the total size and harmonization of the operations for various functions.

Although the total size of the system can be further reduced by combining the two casings into one, the system composed of two casings as shown in FIG. 57 can be more conveniently used.

Further, since the paper eject path of the scanner section joins the print paper convey path immediately upstream of the printing section, there can be provided two print-paper feed portions (i.e., the paper feed portion of the scanner section can also be used as a paper feed portion for recording), which are particularly convenient when print sheets of different sizes are used.

However, the above-described system has problems in that:

1. Unification of the two casings will not reduce the total size.

2. The three paper trays 507 standing in the rear of the display section 501 detract from the beauty of the entire design. 3. The print sheets set in either one of the feeding trays 507 must be removed in order to use a print sheet differing in size from the print sheets set in the trays.

Next described are the constructions and functions of a scanner section (an original reader section or an image input section) and a printer section (an image output section) of a facsimile apparatus or a general-type image input-output apparatus connected to a personal computer or the like, with reference to FIGS. 68 to 70.

FIG. 68 shows a sectional view of an image input section of an image input-output apparatus connected to a personal computer or the like. An original reading sensor R reads image information from an original G pressed onto a reading surface 2102 by a platen roller 2101. The original reading sensor R is illustrated in detail in FIG. 70.

As shown in FIG. 70, an array of image sensors 2103 for reading an original G are linearly arranged along the width of an original G conveyed nearby. An illumination LED array 2104 emits light to an original G, and the light reflected from the original G strikes the image sensor array 2103 via a condenser rod-lens array 2105. Thus, the reflected light is converted to electric signals in accordance with the image carried on the original G, and the electric signals are outputted. FIG. 70 further shows a transparent glass plate 2106.

Referring back to FIG. 68, when an original G fed in the direction indicated by the arrow M is detected by an original detecting sensor $S_1$, the platen roller 2101 and driving rollers 2107 and 2109 start to rotate, thus conveying the original G. Slave rollers 2108 and 2110 are provided facing the driving rollers 2107 and 2109, respectively. A register sensor $S_2$ detects a leading edge portion of the original G being conveyed by the pair of the driving roller 2107 and the slave roller 2108.

When a predetermined length of time passes after detection of the leading edge portion of the original G by the register sensor $S_2$, and the leading edge portion of the original G reaches the reading surface 2102, a driving circuit (not shown) of the original reading sensor R is operated so that the original reading sensor R starts reading the image carried by the original G. Thus, the original image is read by the original reading sensor R while the original G is being conveyed. When the image reading has finished, the original G is further conveyed by the driving and slave rollers 2109 and 2110 to be ejected from the apparatus. The figure further shows lower and upper guide plates 2111 and 2112 arranged under and over the convey path of an original G.

An image recorder section (the printer section) will be described. FIG. 69 shows a sectional view of an image recorder section of an image input-output apparatus connected to a personal computer or the like. This image recorder section is provided next to an original reader section as described above. When a recording sheet P is inserted in the direction indicated by the arrow N, the recording sheet P is conveyed by driving rollers 2115 and 2118 and slave rollers 2116, 2117 and 2119. A register sensor $S_3$ detects a leading edge portion of a recording sheet P being conveyed.

A predetermined length of time after the register sensor $S_3$ detects the leading edge portion of a recording sheet P, a recording head E performs recording on the recording sheet P while the sheet P is being conveyed. After recording, the recording sheet P is further conveyed by driving and slave rollers 2118 and 2119 to be ejected from the apparatus. Because the recording head E performs recording by thermal ink-transfer recording, ink-jet recording or electronic latent image recording, an ordinary type of paper can be used as the recording sheets P.

However, in the above-described known apparatus, the position and direction of recording is determined by the orientation of an original image carried by an original when the original image is read and the orientation of a recording sheet P when it is inserted in the apparatus. Therefore, when, for example, it is desired that copy images be formed on both sides of a recording sheet P, the following inconvenience arises.

When both-side recording is performed on a plurality of recording sheets, for example, page 1 is recorded on the first side of sheet $N_1$, page 2 on the second side of sheet $N_1$, page 3 on the first side of sheet $N_2$, page 4 on the second side of sheet $N_2$, and so on, the orientation of recording on the first side of each sheet must be observed before inserting the sheet for the second-side recording, in order to make sure that the orientation of the second-side recording will conform with the orientation of the first-side recording. If a sheet is set in the wrong orientation for the second-side recording, the first and second-side recordings become upside down with respect to each other. Such an incorrect operation is a waste of time and paper.

If both of the two paper feed portions are set with recording sheets when printing is to be performed, the apparatus must request the user to select either one of the paper feed portions. Further, since the paper feed portion provided in a front portion of the apparatus also serves as a scanner paper feed portion, the apparatus must request the user to see whether the sheet set in that paper feed portion is an original. Thus, the user is required to perform a substantial amount of work.

SUMMARY OF THE INVENTION

An object of the present invention is to solve the above-mentioned problems of the conventional art by providing an output apparatus in which the sheet convey paths of a scanner section and a printer section join and output means and reader means are arranged downstream and upstream, respectively, from the joining point.

Another object of the present invention is to solve the above-noted problems by providing an output apparatus which is able to determine whether the sheet-set in the scanner/printer paper feed portion is a print sheet or an original in accordance with a software application that is executed when the sheet is set.

To achieve the above objects, an aspect of the present invention provides an output apparatus comprising: conveyer means for conveying an output medium, the conveyer means having two output medium feed portions including respective feeding convey paths and one output medium ejection portion, wherein the feeding convey paths of the two output medium feed portions join into one ejection convey path reaching the output medium ejection portion; output means for recording or outputting information onto an output medium in accordance with output signals, the output means being provided adjacent the convey path downstream from the joining point of the convey paths; reader means for reading recorded information which has been outputted onto an output medium, the reader means being provided adjacent one of the two feeding convey paths upstream from the joining point; and control means for controlling the conveyer means, the output means and the reader means.

According to another aspect of the present invention, an output apparatus as described above further comprises a display section for at least displaying the recorded information read by the reader means, the display section being provided in a front portion of the output apparatus, wherein the two output medium feed portions are provided adjacent and below the display unit and in the rear of the display section.

To achieve the above objects, a still another aspect of the present invention provides an output apparatus comprising: conveyer means for conveying an output medium, the conveyer means including an output medium feed portion; detector means provided near the output medium feed portion for detecting an output medium which has been set in the output medium feed portion; executing means for executing an application program including a program for recording or outputting information onto an output medium and/or a program for reading recorded information which has been outputted onto an output medium, the executing means being provided within the conveyer means; determining means which, when the detector means has detected an output medium set in the output medium feed portion, determines whether the output medium set in the output medium feed portion is an output medium to be read from or an output medium to be outputted onto in accordance with an application program being executed by the executing means.

A further object of the present invention is to solve the second-mentioned problem by providing an output apparatus and method which reads and checks the information which has been outputted onto an output medium and thereby outputs information onto the output medium in a proper manner.

To achieve the above objects, a further aspect of the present invention provides an output apparatus comprising: storage means for storing first information which is to be recorded or outputted onto an output medium; reader means for reading from an output medium fed in the output apparatus second information which has been outputted onto the fed output medium; comparing means for comparing the second information read by the reader means with the first information stored in the storage means; and setting means for setting at least one of an output position and an output orientation for outputting additional information inputted from the outside of the output apparatus by an external source onto the output medium based on comparison performed by the comparing means.

According to a still further aspect of the present invention, an output apparatus as described above further comprises output means for outputting the additional information inputted from the outside of the output apparatus onto an output medium in accordance with the output position and/or the output orientation which has been set by the setting means.

Also to achieve the above object, a further aspect of the present invention provides an output apparatus comprising: storage means for storing first information which is to be recorded or outputted onto an output medium; reader means for reading from an output medium fed in the output apparatus second information which has been outputted onto the fed output medium; comparing means for comparing the second information read by the reader means with the first information stored in the storage means; and select means for selecting additional information to be outputted from information inputted from the outside by an external source, based on comparison performed by the comparing means.

According to a still further aspect of the present invention, an output apparatus as described above further comprises output means for outputting the additional information selected from information inputted from the outside by the select means.

Further, to achieve the above objects, a further aspect of the present invention provides an output method comprising the steps of: storing first information which is to be recorded or outputted onto an output medium; reading from an output medium second information which has been outputted onto the output medium; comparing the second information read with the first information stored; and setting at least one of an output position and an output orientation for outputting additional information inputted from the outside by an external source onto the output medium on the basis of the result of comparison of the second information read with the first information stored.

According to a still further aspect of the present invention, an output method as described above further comprises the step of outputting the additional information inputted from the outside onto the output medium on the basis of settings regarding the output position and/or the output orientation.

Still further, to achieve the above objects, a further aspect of the present invention provides an output method comprising the steps of: storing first information which is to be recorded or outputted onto an output medium; reading from an output medium second information which has been outputted onto the output medium; comparing the second information read with the first information stored; and selecting additional information to be outputted onto the output medium from information inputted from the outside by an external source on the basis of the result of comparison of the second information read with the first information stored.

According to a still further aspect of the present invention, an output method as described above further comprises the step of outputting onto the output medium the additional information selected from the information inputted from the outside.

Further objects, features and advantages of the present invention will become apparent from the following description of the preferred embodiments with reference to the attached drawings.

BRIEF DESCRIPTION OF THE DRAWINGS

FIG. 13 also illustrates serial print data of the apparatus.

FIG. 25 shows the relations between the ASF-related displays and the flags.

FIG. 26 is the relations between the ADF-related displays and the flags.

FIG. 27 shows the relations between the paper set request message and the flags.

FIG. 28 shows pre-print menu (1).

DESCRIPTION OF THE PREFERRED EMBODIMENTS

Preferred eembodiments of the present invention will be described with reference to the accompanying drawings.
(Embodiment 1)

Figure 2:
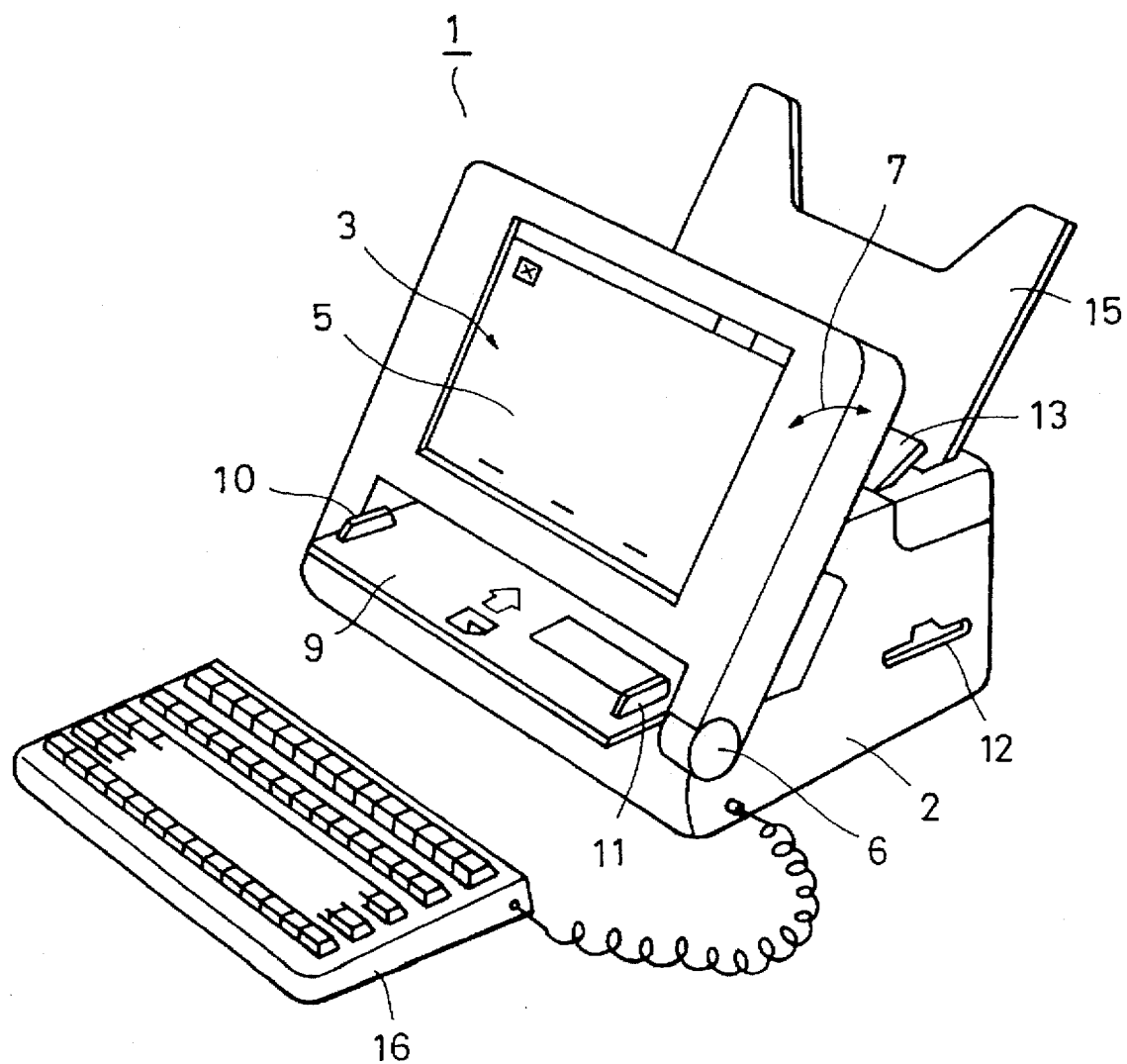
FIG. 2 is an exterior perspective view of the image forming apparatus shown in FIG. 1.

Referring first to FIG. 2 which is a perspective view of an apparatus embodying the present invention, the apparatus generally denoted by 1 has a main part 2 and a display unit 3 which is carried by the main part 2 for pivotal movement about a member 6 which provides a pivot axis as indicated by a double-headed arrow 7. A touch panel 5 serving as a pointing device is mounted on the surface of the display unit 3 so as to enable entry of data by a direct touch of a finger with a portion of the touch panel on a desired portion of an image which is displayed on the display unit 3.

A sheet of paper fed from a paper feed tray 9 is moved along a path which is defined beneath the display unit 3 and is ejected onto a paper ejection tray 13. The paper feed tray 9 has a fixed paper guide 10 which provides a position reference for the left side edge of the paper on the tray 9, and a movable paper guide 11 movable in the direction of the width of the paper. A print paper feed tray 15 holds a stack of paper sheets for printing. Paper sheets fed from this tray 15 also are ejected to the ejection tray 13. A slot 12 for receiving a floppy disk is formed in one side wall of the main part 2. A keyboard as an input device is connected to the main part 2.

Figure 3:
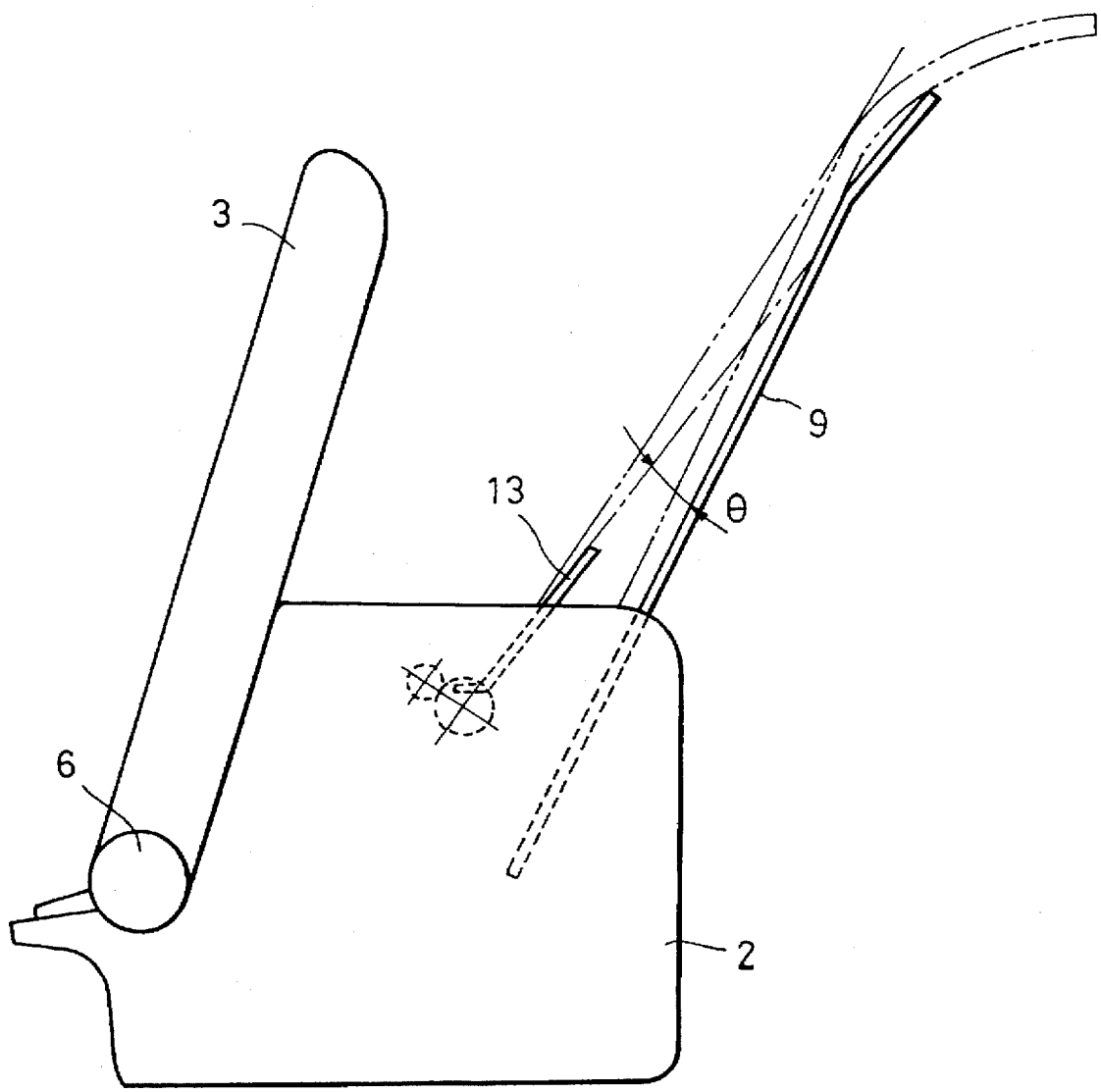
FIG. 3 is side view of the same apparatus.

The paper ejection tray 13 has a length which is as small as 50 mm and, hence, cannot hold large-sized paper sheets such as A-4 or B-4 size sheets. In contrast, the print paper feed tray 15 has a length which is as large as 250 mm so that it can hold A-4 or B-4 size paper. Referring to FIG. 3, the angle θ formed between the surface of the paper ejection tray 13 and the surface of the print paper feed tray 15 is set to about 15°, so that the extension of the plane of the surface of the paper ejection tray 13 intersects the surface of the print paper feed tray 15 at an upper end portion of the latter. Therefore, a paper sheet ejected from the main part 2 of the apparatus is moved first along the surface of the paper ejection tray 13 and the leading end of this paper sheet is then brought into contact with the surface of the print paper feed tray 15 or on the print paper placed on the tray 15 so as to be guided by the latter, as indicated by two-dot-and-dash line. Finally, the ejected paper is held on upper side of the apparatus, as shown in FIG. 3. Since the angle formed between the ejected paper and the paper on the tray 15 is small, there is no risk that the ejected paper is wrongly introduced into the paper inlet which is provided at the lower side of the tray 15.

<Description of the Components>

Figure 4:
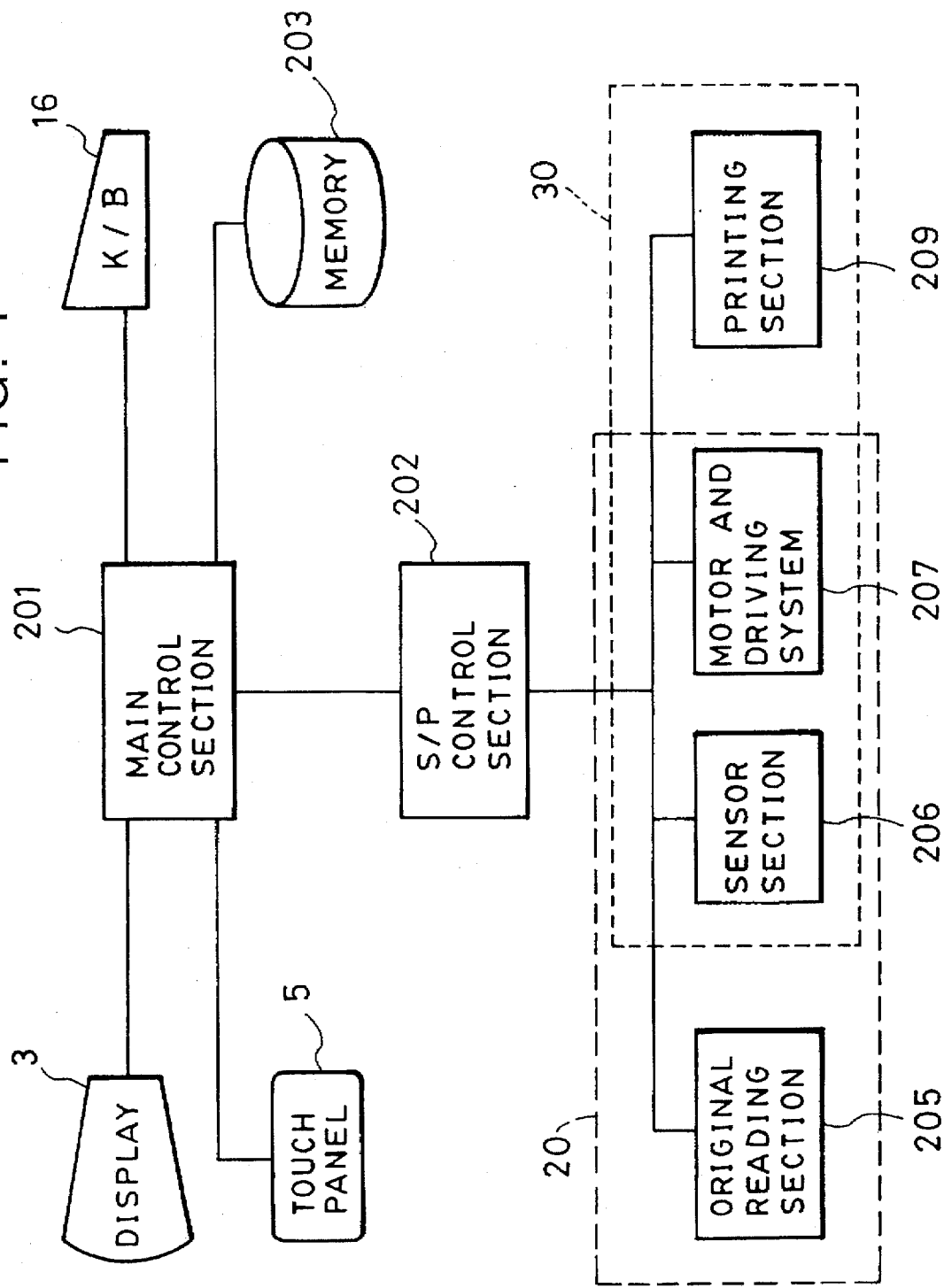
FIG. 4 is a block diagram of the overall control system of the same apparatus.

FIG. 4 is a block diagram which shows the construction of the whole apparatus. A main control section 201, which performs overall control of the operation of the whole apparatus, includes a microprocessor (MPU), a device control section for controlling various I/O units, a clock generator, and a memory section such as a ROM and a RAM which store programs used for various controls.

The I/O devices controlled by the main control section 201 are the keyboard 16, the touch panel 5, a memory 203 and a scanner/printer control section 202. The entry of instructions by the operator into the main control section 201 is conducted through the keyboard 16 when the entry is done in terms of characters or numerals and through the touch panel 5 when the entry is done by selecting an icon on the display unit 3. Data such as characters and images processed by the main control section 201, as well as application programs, are stored in the memory 203 which may be a hard disk or a floppy disk.

Information to be given to the operator is displayed on the display unit 3. The display unit 3 employed in this embodiment is of the type which employs a liquid crystal display device illuminated by a back light, having a display size of 640 dots in the horizontal direction and 480 dots in the vertical direction. The scanner/printer control section 202 has a built-in microprocessor (MPU) which performs sequential controls of a printer scanner section 20 and the printer section 30 which serve as means for inputting and outputting images.

The scanner section 20 and the printer section 30 respectively incorporate an original reading section 205 and a printing section 209, and further contain a sensor section 206 and a motor and driving section 207 which are used commonly by the scanner section 20 and the printer section 30. In the illustrated embodiment, the scanner section 20 and the printer section 30 have paper conveyor systems which are partly common to each other. These sections 20 and 30, including the commonly used sensor section 206 and the motor and driving section 207, are under control of the scanner/printer control section 202. The illustrated embodiment employs, as the printer section 30, an ink jet printer section which will be detailed later with reference to FIG. 6.

Figure 1:
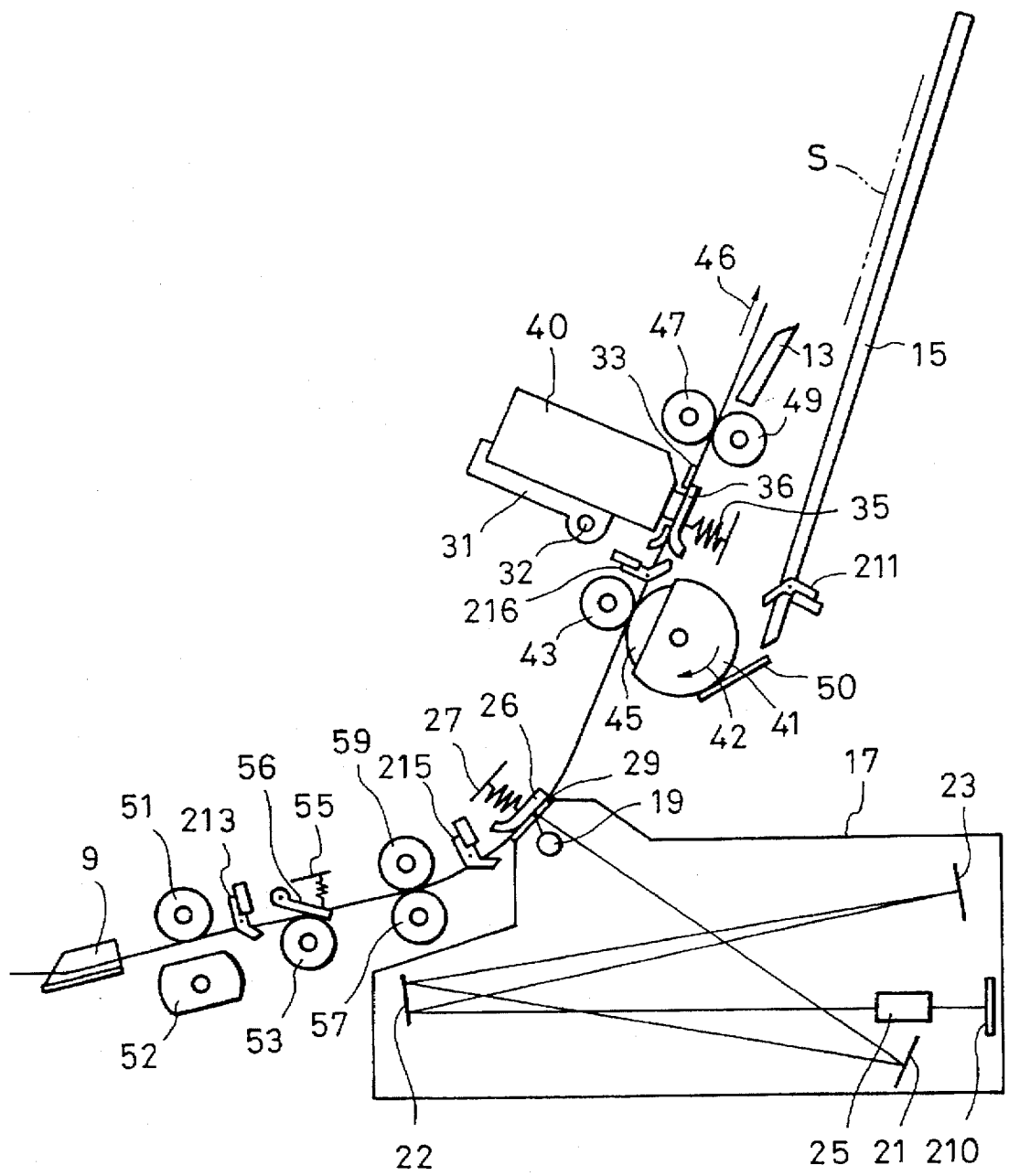
FIG. 1 is a longitudinal sectional view of an image forming apparatus according Embodiment 1 of the present invention.

FIG. 1 is a sectional view of the whole apparatus, showing particularly the scanner/printer section incorporated in the main part 2 of the apparatus. An original reading unit 17 includes an illuminating light source 19 for illuminating an original image. The light reflected from the original image impinges upon a lens 25 via mirrors 21, 22 and 23, so as to be focused on the light-receiving surface of a CCD 210, whereby the original is read photoelectrically. A white background plate 26 is urged by a spring 27 onto an original table glass 29, thereby pressing the original at a predetermined pressure.

The printer section 30 includes an ink jet recording head 40 which serves as a printhead. The recording head 40 is carried by a carriage 31 which is movable along a shaft 32 extending perpendicularly to the plane of the drawing sheet of FIG. 1. A platen 36 is pressed onto a locating plate 33 by means of a spring 35. A sheet of print paper is pressed by the platen 36 onto the locating pate 33 so that a predetermined distance is maintained between the paper and the recording head 40.

<Paper feed to printer>

The print paper is fed from an automatic sheet feeder (sometimes abbreviated as "ASF") which has a sheet sensor (sometimes abbreviated as "ASF sensor") 211. The ASF sensor 211 has a light-emitting element and a light-receiving element which constitute a photo-interrupter-type sensor in cooperation with a light shielding plate as an actuator. When a paper sheet is placed on the tray 15, the actuator is moved by the paper sheet so as to allow the light from the light-emitting element to reach the light-receiving element, so that the sensor 211 produces a signal indicative of the presence of the paper.

Numeral 41 designates a crescent roller having a rubbery surface. The roller 41 is driven to rotate in the direction of an arrow 42 so as to feed the paper sheet from the tray 15. A separation pad 50 frictionally brakes the paper fed by the crescent roller 41, so that only the uppermost sheet of the stack on the tray 15 is fed into the apparatus.

A conveyor roller 43 cooperates with an idle roller 45 in clamping therebetween the paper so as to convey the paper in the direction of an arrow 46. A register sensor 216, having a construction similar to that of the AFS sensor 211, senses the leading edge of the paper which has been conveyed, thereby setting the paper at the print start position in timing with the image forming cycle. A paper eject roller 47 cooperates with an idle roller 49 in clamping therebetween the paper and ejecting the same.

<Paper feed to scanner>

A weight roller 51 is urged towards a paper feed roller 52 by its weight. The paper feed roller 52 has such a configuration that diametrically opposing portions of a cylinder are removed and flattened. In operation, each of the remaining cylindrical surfaces cooperates with the weight roller 51 to nip and feed the paper, while each flattened portion of the paper feed roller 52 is spaced away from the path of paper. Numeral 53 denotes a separator roller which cooperates with a separator pad 56 urged by a spring, so as to separate the lowermost paper from a paper stack and to feed the separated paper. A conveyor roller 57 conveys the paper in cooperation with a roller 59.

A paper sensor (sometimes referred to as automatic document feeder or ADF sensor) 213 and an original document register sensor 215 are respectively similar to the aforementioned sensors 211 and 216. A paper sheet fed from the original feed tray 9 is advanced through a passage which merges in the path of conveyance of the sheet in the printer section, so that the paper is ejected by the aforementioned paper eject roller 47 onto the paper eject tray 13.

<Paper feed/convey roller drive system>

Figure 5:
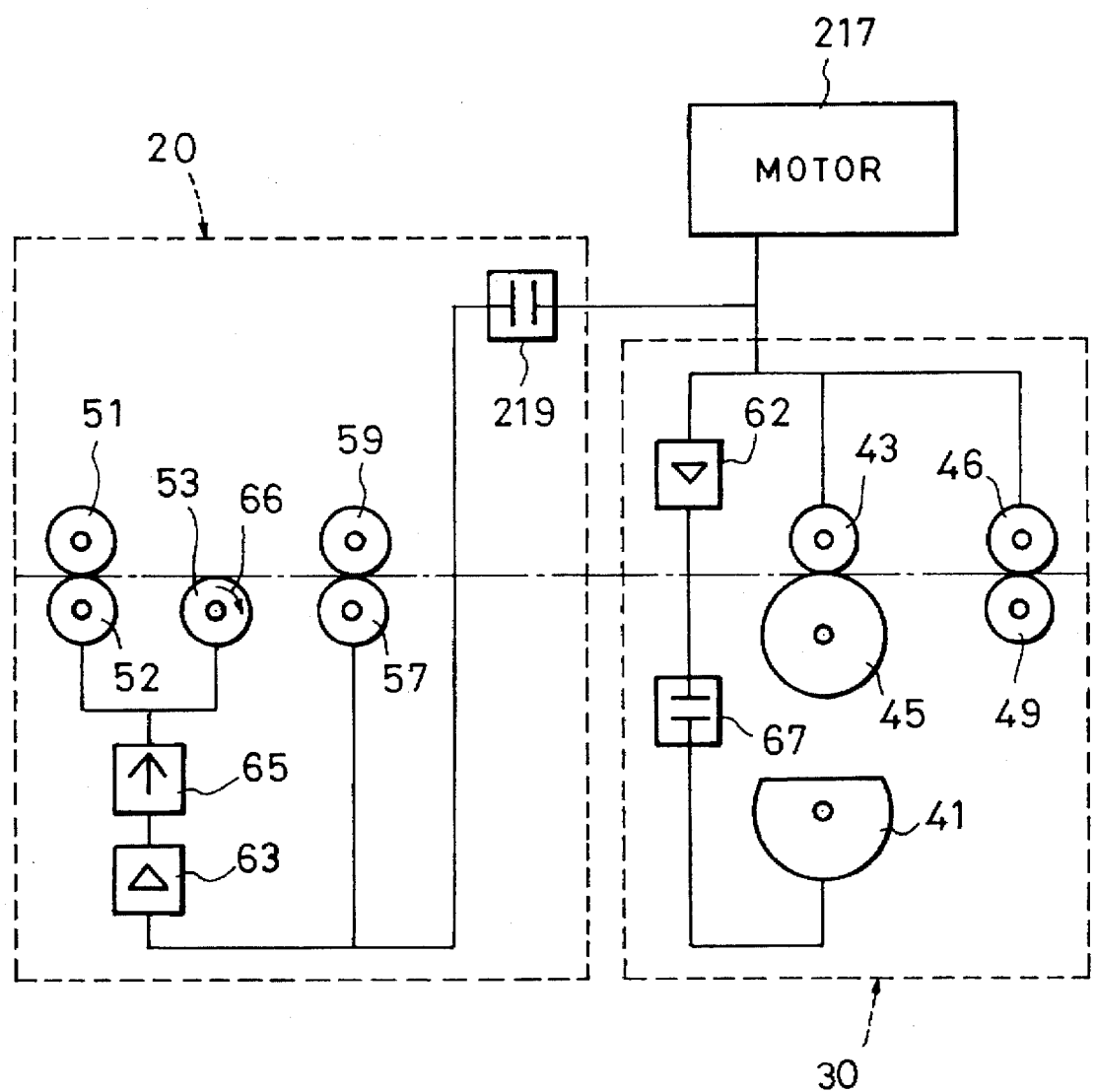
FIG. 5 is a diagram of the convey roller driving system of the same apparatus.

FIG. 5 shows the construction of the system for driving paper feed rollers. The driving system has a conveyor motor 217 the power of which is transmitted both to the printer section 30 and the scanner section 20. The transmission of power to the scanner section 20 is selectively done via a clutch 219. Power transmission to the crescent roller 41 also can be terminated by disengaging a clutch 67. A speed reduction unit 62 is incorporated in the path of transmission of power to the crescent roller 41 so that the crescent roller 41 is driven at the same peripheral speed as the conveyor roller 43.

Another speed reduction unit 63 incorporated in the path of transmission of power to the separator roller 53 is designed such that the separator roller 53 is driven at a peripheral speed which is half that of the conveyor roller 57.

A one-way clutch 65 incorporated in the path of transmission of power to the separator roller 53 allows the separator roller 53 to freely rotate when a tangential pulling force is applied to the surface of the latter in the direction of an arrow 66. Namely, when a paper sheet is advanced by the conveyor roller 57, the separator roller 53 is frictionally driven by the paper. In this state, power transmission to the paper feed roller 52 also is suspended.

<Outline of Printer>

Figure 6:
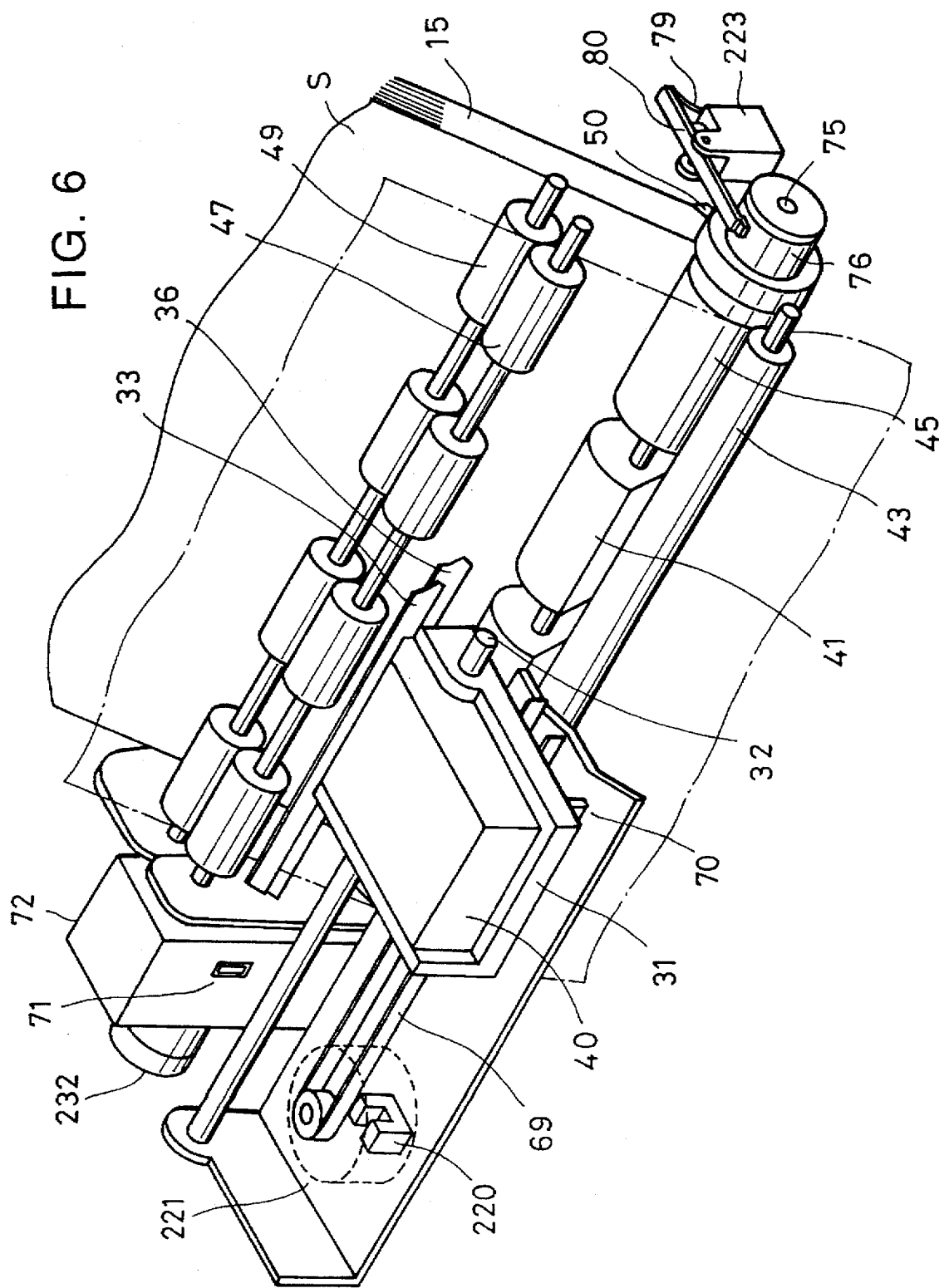
FIG. 6 is a perspective view of the printer section of the same apparatus.

FIG. 6 schematically shows the construction of the printer. As explained before, the head 40 is carried by the carriage 31 which is movable along the shaft 32 by the power transmitted from a carriage motor 221 through a timing belt 69 fixed to the carriage 31, whereby the head 40 is moved in the direction of the shaft 32.

A home position sensor 220 of photo-interrupter type has a light-emitting element, a light-receiving element and a shield plate 70. When the head 40 is in the home position, the shield plate 70 interrupts the light, so that the home position sensor 220 produces a signal indicative of the presence of the head 40 at the home position. Pulse count value for the carriage motor 221 is reset in accordance with the signal from the home position sensor 220. Namely, the pulse count value is reset to zero when the head 40 is at the home position.

A cap 71, which is made of an elastic material such as a rubber, is positioned so as to oppose the ink discharge surface of the recording head 40 when the latter is in the home position. The cap 71 is movable into and out of contact with the recording head 40. The cap 71 has a function to protect the recording head 40 and is also used when a recovery operation is conducted for recovering a safe discharging condition of the recording head The discharge recovery operation is an operation which is conducted for the purpose of expelling matters which tend to cause discharge failure, such as air bubbles, dust particles and ink of increased viscosity. The discharge recovery operation is performed by, for example, activating all the ink discharge energy generating elements upstream of the ink discharge openings so as to force ink out of all the ink discharge nozzles together with the above-mentioned matters, or by forcibly discharging the ink from all the ink discharge openings by other suitable means such as suction means. Numeral 72 designates a pump which generates vacuum for forcibly sucking ink from the ink discharge openings and for sucking ink which has been collected in the cap 71 as a result of the discharge recovery operation or a preliminary discharging operation. The pump 72 is driven by a recovery system motor 222.

The crescent roller 41 is fixed to a shaft 75 and, as explained before, cooperates with the separator pad 50 so as to feed the uppermost paper sheets one by one from the paper stack on the recording paper tray 15. The conveyor roller 43 cooperates with the roller 45 to convey the fed paper. The roller 45 is not fixed to the shaft 75. The platen 36 is pressed against the locating plate 33 so as to maintain the predetermined distance between the head and the paper. The paper eject roller 47 cooperates with the idle roller 49 in clamping the paper therebetween so as to convey and eject the paper.

The clutch 67 mentioned before is a spring clutch which makes use of a contracting force of a coiled spring, and selectively transmits the driving torque from a drive wheel 77. The spring clutch 67 transmits the torque only in the operation mode in which the paper is fed from the recording paper tray 15, otherwise it idles so as not to transmit the torque. The clutch 67, which is held in idle state, is switched to operative state to transmit the torque, when a link 80 which has been raised by a leaf spring 79 is lowered by a plunger 223.

Figure 7:
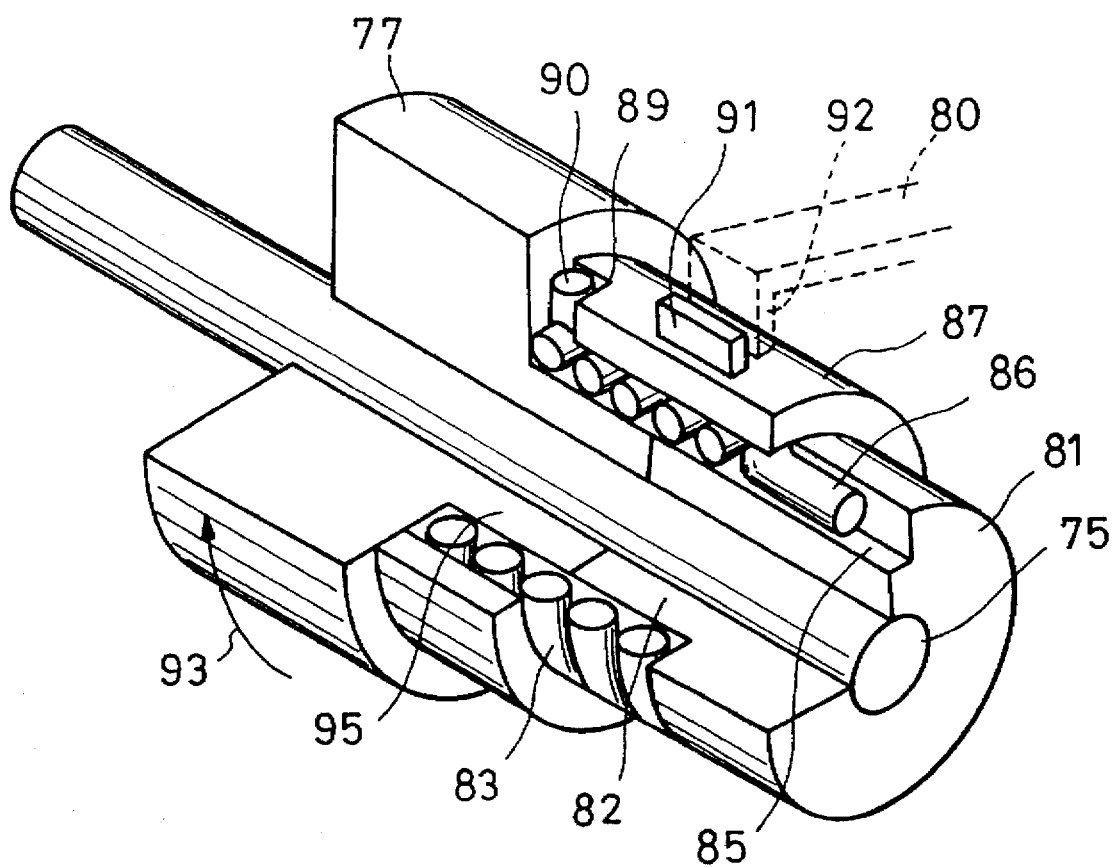
FIG. 7 is a perspective view of the clutch section of the same apparatus.

FIG. 7 shows the detail of the spring clutch 67 shown in FIG. 5. The main wheel 77 is adapted to be driven by the conveyor motor 217 in the direction of an arrow 93, and is rotatably carried by the shaft 75. A coiled spring 83 engages by its contracting force with a hub portion 95 of the main wheel 77. A follower wheel 81 is fixed to the shaft 75. The spring 83 also engages by its contracting force with a hub portion 82 of the follower wheel 81.

One end 86 of the coiled spring 83 is retained in an axial groove 85 formed in the hub portion 82. A spring end holder 87 is carried by the shaft 75 for rotation relative to the latter. The spring end holder 87 has a recess 89 which receives a projection 90 on the other end of the spring 83. The spring end holder 87 has a projection 91 formed on the outer peripheral surface thereof for engagement with a claw or pawl 92 of the above-mentioned link 80. The arrangement is such that, when the projection 91 on the spring end holder 87 engages with the pawl 92 of the link 80, the contracting force of the coiled spring 83 is reduced so that the spring clutch 76 is switched to off state, i.e., the state in which it does not transmit the torque.

When paper feed from the recording paper tray 15 is to be conducted, the plunger 223 lowers the link 80 so that the pawl 92 of the link 80 comes off the end holder 87, so that the coiled spring 83 recovers its contracting force. As a consequence, the clutch 76 is switched to torque-transmitting state, so that the power of the conveyor motor 217 is transmitted to the shaft 75 via the main wheel 77, coiled spring 83 and the follower wheel 75, whereby the crescent roller 41 is driven to convey the paper. The main wheel 77 rotates in the direction of the arrow 93 so as to enhance the contracting force of the coiled spring 83, whereby the torque is transmitted to the shaft 75 without fail.

One full rotation of the shaft 75 brings the projection 91 of the spring end holder 87 into engagement with the claw 92 of the link 80 which has been raised again by the leaf spring 79, so that the spring clutch 76 is switched to off state, thus terminating transmission of the torque from the main wheel 77 to the shaft 75. Consequently, the crescent roller 41 ceases to rotate. As a result of one full rotation of the crescent roller 41, the paper is fed by a length which is large enough to bring the leading end of the paper into the nip between the conveyor roller 43 and the idle roller 45.

The paper advanced by the conveyor roller 43 and the idle roller 45 is moved past the platen 36 and the locating plate 33 so as to be caught by the nip between the paper eject roller 47 and the idle roller 49, whereby the feed of paper from the recording paper tray 15 is completed.

<Paper conveying operation>

Conveyance of the paper is performed by the combination of the conveyor roller 43 and the idle roller 45 and the combination of the paper eject roller 47 and the idle roller 49. Meanwhile, the projection 91 on the spring end holder 87 is stopped by the claw 92 on the link 80, so that the spring end holder 87 seemingly rotates in the direction opposite to the arrow 93 relative to the main wheel 77. Consequently, the coiled spring 83 is loosened to slip on the hub portion 80 of the main wheel 77. Consequently, the torque is not transmitted from the main wheel 77 to the follower wheel 81 and, therefore, the shaft 75 is not driven. Thus, the conveyance of the paper is conducted while the crescent roller 41 is inoperative.

<Example of arrangement of ink discharge nozzles>

Figure 8:
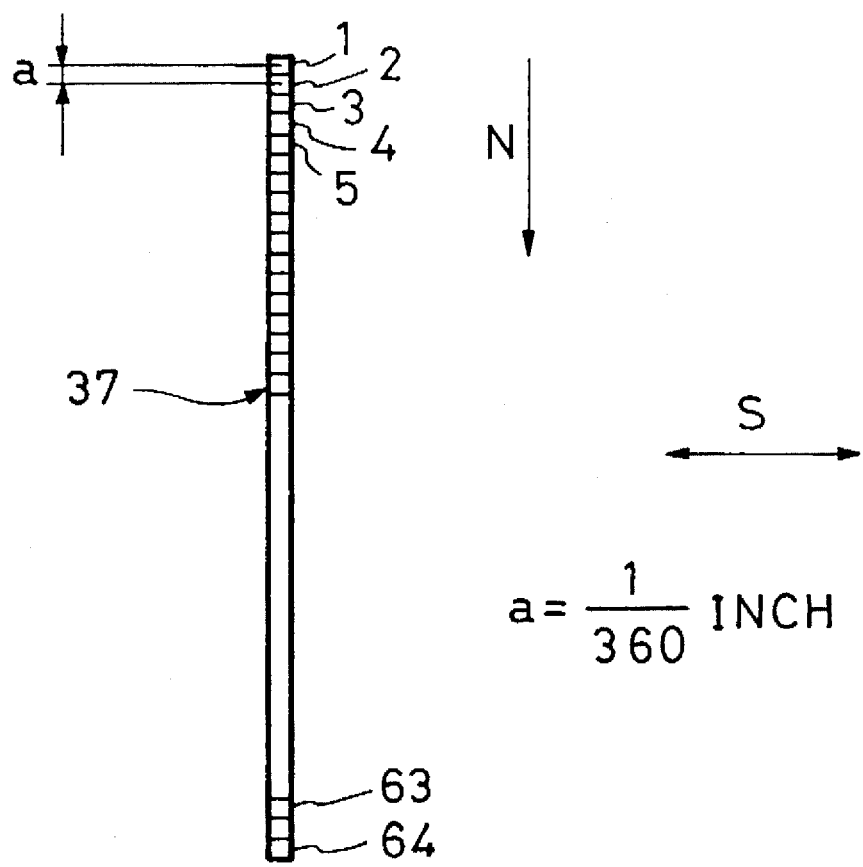
FIG. 8 is a front view of the nozzle of the apparatus.

Referring to FIG. 8, the recording head 40 has 64 nozzles Nos. 1 to 64 arranged in a single row which extends in the main-scan direction indicated by an arrow N. The pitch a at which these nozzles are arranged is $1/360$ inch. Thus, the nozzles provide a recording density of 360 dpi. The head 40 moves in the sub-scan directions indicated by an arrow S, together with the carriage 31 which is driven by the carriage motor 221, this enabling formation of two-dimensional images. The amount of conveyance of the paper performed by the conveyor motor 217 corresponds to the length of the nozzle row. Namely, after forming one-line image by selectively activating 64 nozzles, the paper is fed by an amount corresponding to 64 dot pitches, i.e., $64/360$ inch, thus preparing for the printing of the next line.

<Paper feed reference position>

Figure 9:
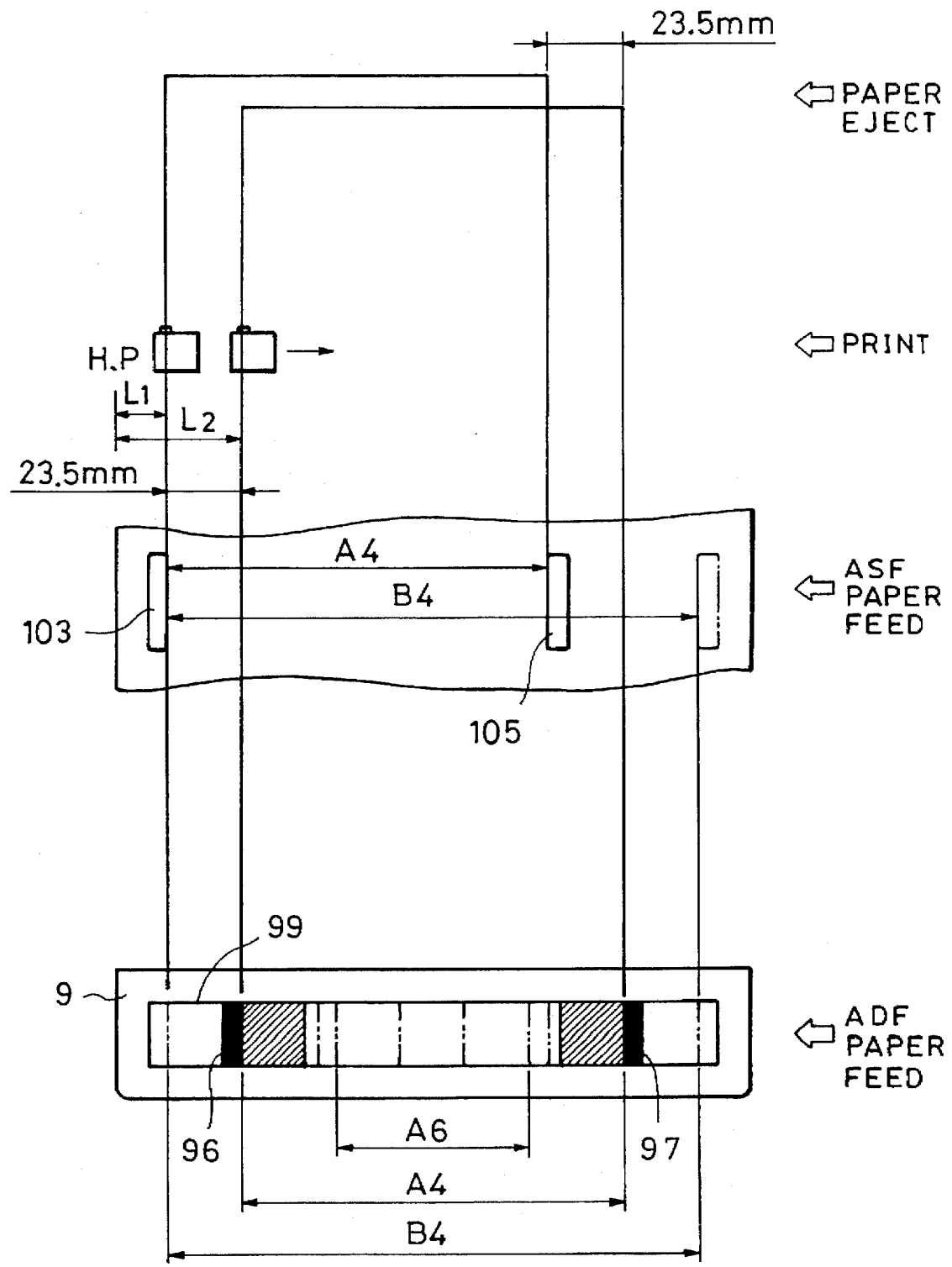
FIG. 9 illustrates the relations between the ADF and ASF paper feed reference positions and their respective print positions in the apparatus.
Figure 10A:
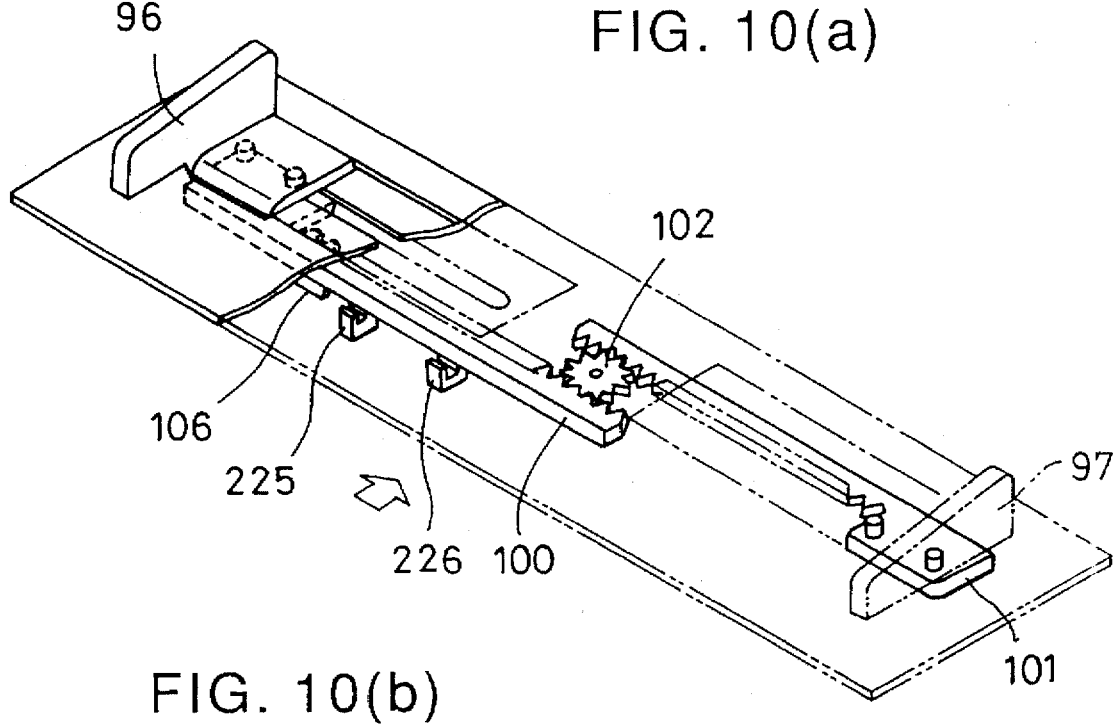
FIGS. 10(a) and 10(b) are perspective views of the mechanical portions of the sheet guides of the apparatus.
Figure 10B:
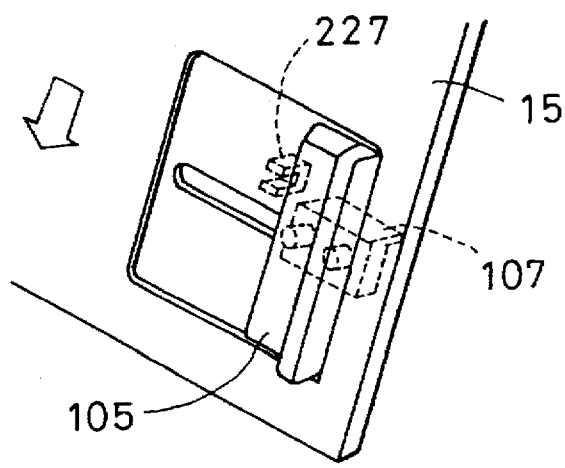

FIGS. 9 and 10(a), 10(b) schematically show the relationship between the paper feed reference position and the print start position of the printer. Numerals 96 and 97 denote paper guides which are provided on the ADF paper feed tray 9. These paper guides are slidable along a groove 99 to adjustably determine the distance therebetween to conform with breadths of different sizes of paper from B-4 size paper to A-6 size paper. These paper guides 96 and 97 are operatively connected to each other through racks 100, 101 and a gear 102 such that they are simultaneously moved towards or away from each other. Thus, the paper guides 96, 97 provide a position reference for the paper on the automatic document feeder (ADF) tray 9 so as to center the paper.

Numeral 103 denotes a reference guide fixed to the automatic sheet feeder (ASF) tray 15, while a paper guide 105 is adjustable in the width direction of the paper on the tray 15. Thus, the reference guide 103 provides a left edge position reference for a variety of sizes of papers from B-4 size paper to A-4 size paper.

The automatic document feeder tray 9, which handles also the A-6 size paper having the smallest width, is designed to center the paper, and the segments of paper feed roller are arranged in symmetry with respect to the widthwise center, in order to meet the demand for the paper size detection which is performed by selective light interruption. The detection of the paper size is performed by cooperation of a light shield plate 106 on the rack 100 integral with the paper guide 96 and a pair of photo-interrupter-type sensors 225, 226. The light shield plate 106 selectively interrupts the light to the sensors 225 and 226 so that paper size information is formed by these sensors and is delivered to a scanner/printer control section which will be described later. In the illustrated embodiment, when the paper on the tray 9 is of B-4 size, light is received by both the sensors 225, 226, i.e., the sensors 225, 226 are on, whereas, when the paper size is A-4, only the sensor 225 is turned off. When the paper is of A-5 size, both the sensors 225, 226 are off. When the paper is of A-6 size, the light is interrupted only in the sensor 226.

The automatic sheet feeder (ASF) is designed to handle only the papers of A-4 and B-4 sizes, by giving position reference to the left edges of the paper, thus facilitating scanning by the printhead. The paper size is discriminated by selective interruption of light in an ASF paper size sensor 227 by a slider 107 which is integral with the movable paper guide 105. When the paper is of A-4 size, the light is interrupted in the sensor 227.

As a result of the use of different position references in the ASDF and in the ASF, a breadthwise offset is formed on the paper eject tray between the paper fed from the ASF tray 15 and the paper fed from the ADF tray 9. This breadthwise offset amounts to 23.5 mm in the case of A-4 size paper which is used most frequently, and permits easy discrimination between the original sheet fed from the ADF and the recording paper fed from the ASF which are stacked on the paper eject tray. Obviously, the reference position for the B-4 size paper may be changed to enable discrimination also for the B-4 size paper.

The printing operation is controlled in accordance with the above-mentioned amount of offset. Assuming that the position of the left end of the paper fed in conformity with the left end position reference is $L_1$ (mm) from the home position of the print head 40 and that the amount of feed of the carriage is d (mm) per one each pulse supplied to the carriage motor, the position $L_2$ of the left end of the paper fed from the ADF in terms of the distance from the home head position is expressed by:

$L_2=L_1+23.5(mm)$

This position can be expressed as follows in terms of the number of pulses to be supplied to the carriage motor for driving the head to the left end position $L_2$:

$(L_1+23.5)/d$

Thus, the printing operation is controlled on the basis of the count of pulses supplied to the carriage motor.

<Description of scanner/printer section>

Figure 11:
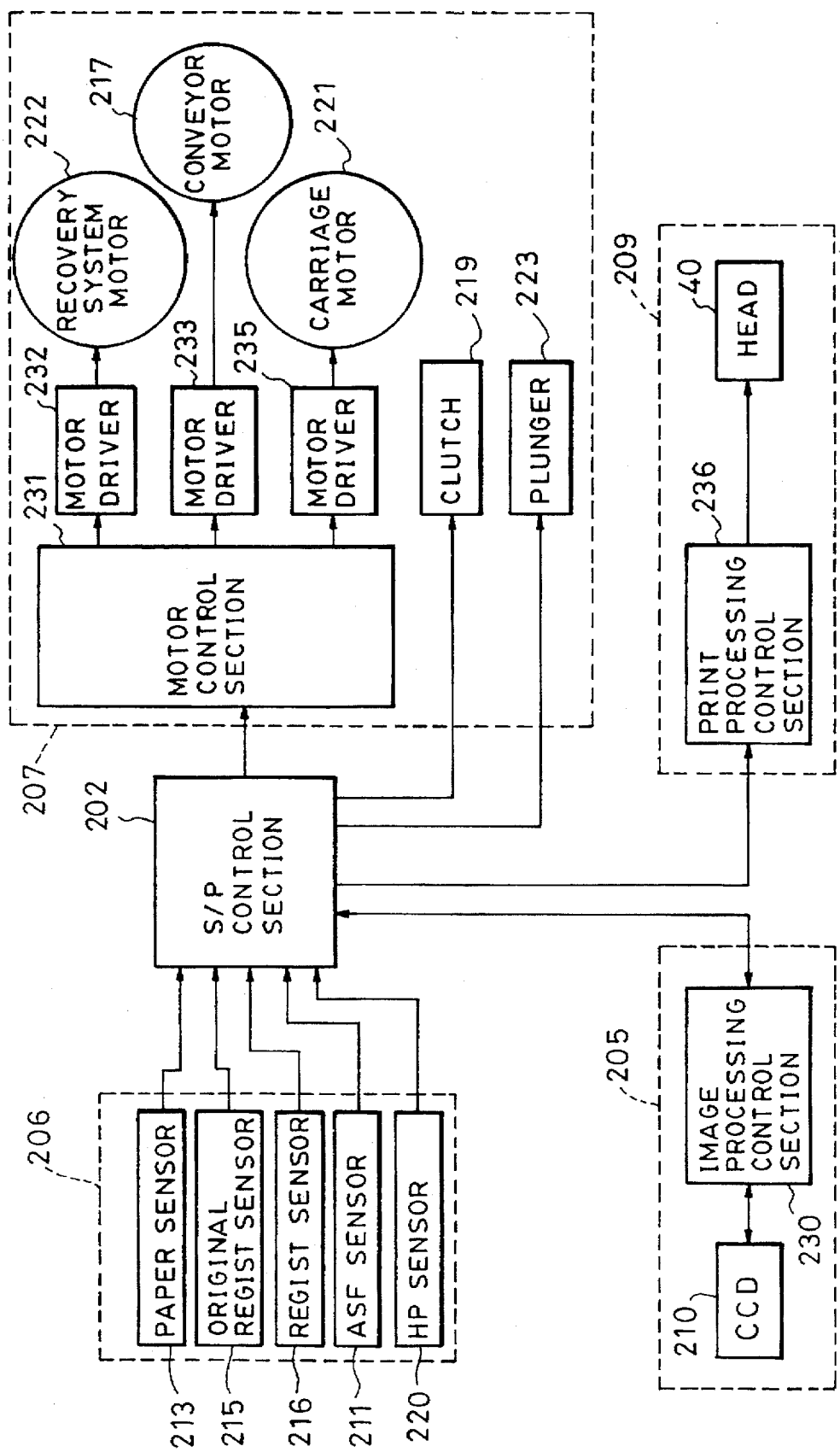
FIG. 11 is a block diagram of the scanner and printer sections of the apparatus.

FIG. 11 is a block diagram of the scanner/printer section including a scanner/printer control section 202 which controls various blocks of this section.

A sensor section 206 includes five photo-interruptor type sensors: namely, a paper sensor 201, an original register sensor 215, a register sensor 216, and the ASF sensor 211 and the home position sensor 220 which were mentioned before. The states of these sensors are monitored and administrated by the MPU of the scanner/printer control section 202. Information concerning the state of each sensor is sent from the MPU to the main control section 201. Instructions for operation of the scanner/printer section, including the original document reading operation and printing operation, are given by the main control section 201 to the scanner/printer control section 202, in accordance with the states of the above-mentioned sensors and in accordance with data entered through the touch panel 5 and the keyboard 16, so that the scanner/printer control section 202 controls the original reading section 205, printing section 209 and the motor and driving system section 207.

The original reading section 205 performs a reading operation in accordance with the control signals which are given by the scanner/printer control section 202, such as signals for setting the reading mode, timing signals, and so forth. An image processing section 230 performs various processings such as generation of CCD clocks for driving the CCD 210, shading correction in the original image data output from the CCD 210, automatic background control (ABD) processing, binary-coding of image data, and generation of video clocks synchronous with video signals.

The image data read by the scanner unit and then binary-coded are sent to the main control section 201 via the scanner/printer control section 202. The image data received by the main control section is stored in the memory 203, and is then treated in accordance with the application. For instance, the image data is displayed on the display unit 3, sent to the printing section 209, or transmitted to a remote station via an external interface (not shown).

Operations such as edition of the image data in each application are conducted under the control of the main control section. In order to make an efficient use of the storage capacity, image data is compressed when stored in the memory 203.

The printing section 209 performs the printing operation in accordance with control signals from the scanner/printer control section 202, such as the signal for setting the printing mode, printing data and timing signals. The printing section 209 includes a print processing control section 236 performs various processings such as print data density transformation processing for reforming the print data in accordance with the printing density attainable by the printhead, and vertical/ horizontal transformation of print data in accordance with the pattern of serial printing to be performed by the printhead.

The vertical/horizontal transformation is an operation for transforming the density-transformed serial print data into parallel print data in conformity with the nozzle row containing 64 dots.

Figure 12:
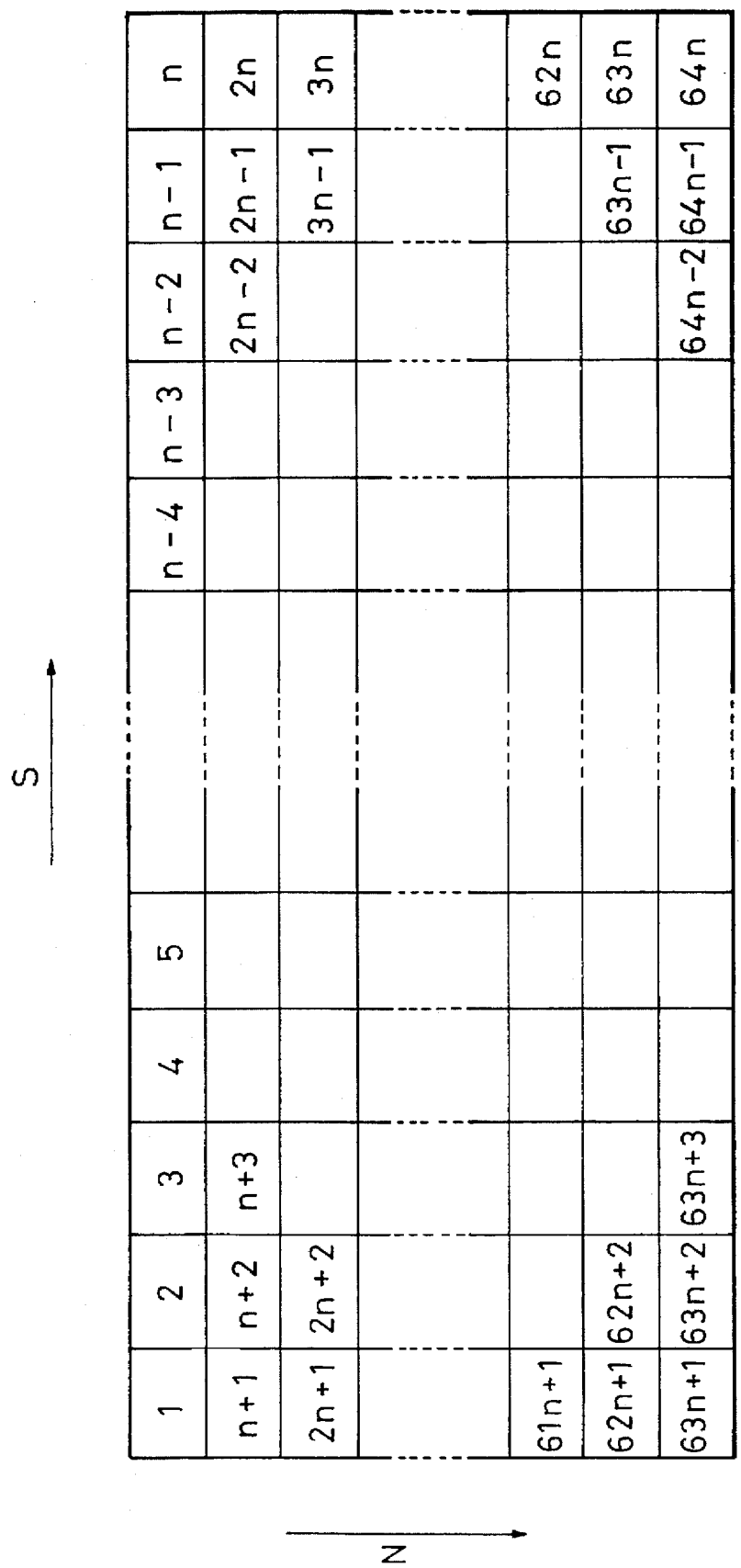
FIG. 12 illustrates serial print data of the apparatus.

As shown in FIG. 12, the serial print data has the form of a plurality of lines of dot sequence. The first line is formed of dots 1, 2, 3, . . . , n–1 and n in the direction of the sub-scan S, and 64 such lines of sequence are stored in a line buffer which is not shown.

The serial print data is decomposed first into n blocks, each block containing 64 dots as counted in the direction N as shown in FIG. 12. The serial data is then transferred to the head 40 on block basis. The 64 dot record data constituting each block is divided into 8 sections each containing 8 dots as shown in FIG. 13, and each such section constitutes one byte. Thus, 8 bytes are sequentially transferred, thus completing transfer of 64 dots of each block.

The motor and driving system 207 includes a recovery system motor 222, conveyor motor 217, carriage motor 221, clutch 219 and a plunger 223 which are under the control of control signals delivered by the scanner/printer control section 202. When stepping pulses for driving the motor from the S/P control section 202 and a hold signal for holding the motors still are supplied to a motor control section 231, the motor control section 231 accepts the stepping pulse and forms an exciting signal only for the motor with which the hold signal is "L", thereby causing stepping of such motor.

Conversely, when the hold signal is "H", the stepping pulse is rejected so that the exciting signal is formed to hold the motor rotor still. The motor driver 232 performs voltage conversion of the exciting signal delivered from the motor control section 231, thereby driving the recovery system motor 222. Similarly, the motors 217 and 221 are driven by the motor drivers 233 and 235.

The clutch 219 is turned off so as to disconnect the conveyor motor 217 from the scanner section 20 when the control signal from the scanner/printer control section 202 is "H", whereas, when the control signal is "L", the clutch 219 is turned on to connect the conveyor motor 217 to the scanner section 20. The plunger 217 operates so as to turn the mechanical clutch 76 off to disconnect the conveyor motor 217 from the crescent roller 41 of the printer section 30 when the control signal from the scanner/printer control section 202 is "H", whereas, when the control signal is "L", the plunger operates to turn the clutch 76 on.

<Reading by scanner>

Figure 14:
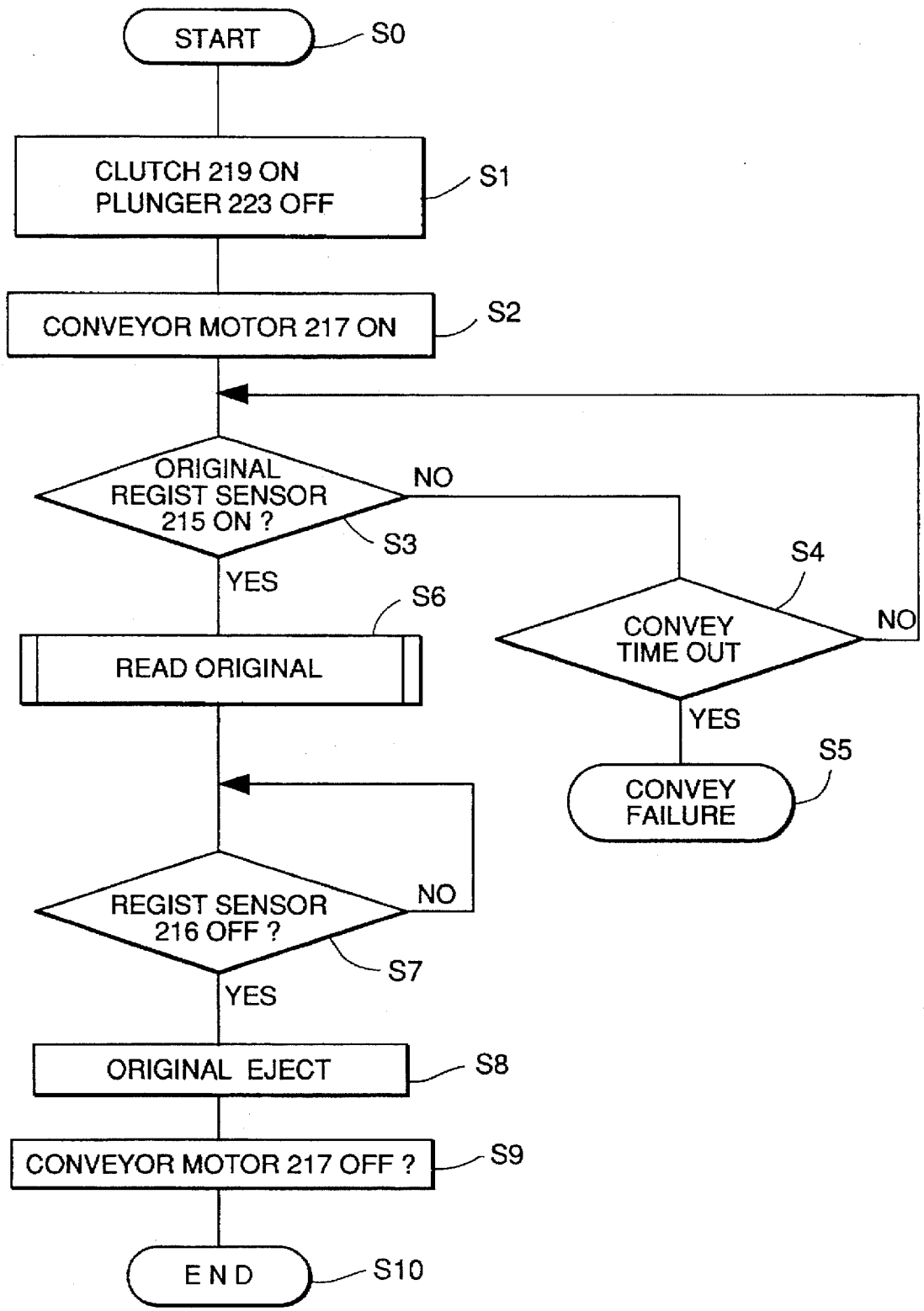
FIG. 14 is a flowchart of original document reading by the scanner section of the apparatus.
Figure 15:
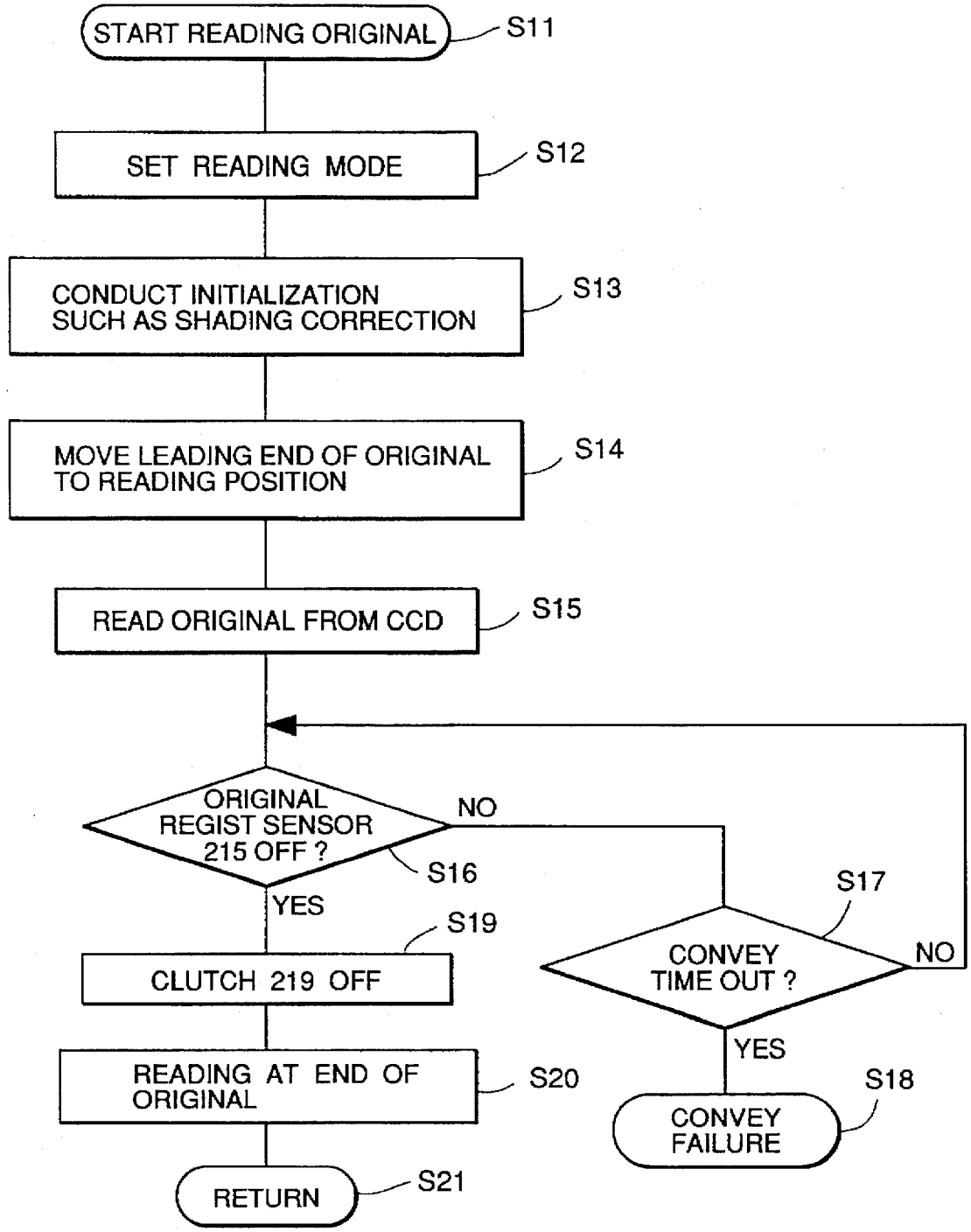
FIG. 15 is a more specific flowchart of original document reading by the scanner section of the apparatus.

FIGS. 14 and 15 are flow charts showing the operation of the original reading portion of the scanner section. Referring first to FIG. 14, the reading operation is started in response to "start" instruction given by the main control section 201. In Step S1, the clutch 219 is turned on and the plunger 223 is turned off, thereby disconnecting the drive of the ASF from the conveyor motor 217, whereby paper feed from the ASF is prohibited. In Step S2, the conveyor motor 217 is turned on, thereby commencing feed of the original document sheet from the ADF.

Step S3 determines whether the original document sheet has reached the original register sensor 215. If the original document sheet has not reached the sensor 215 yet, the process proceeds to Step S4 which counts the time. Namely, it is determined that the original document sheet has not been fed correctly when the time has been counted up before the original register sensor 215 is not turned off even after the feed of the original document sheet by a distance which is significantly greater than the length of the original document sheet. This distance is set to be about 1.5 times that of the length of the original document sheet. Thus, when the sheet is of A 4 size, the distance is set to be 297 mm×1.5=446 mm. The size of the original document sheet is detected by the paper guides 96, 97 as explained before. Such failure in the feed of the original document sheet is informed to the main control section 201 in Step S5. When the original document sheet has reached the original register sensor 215, the process proceeds to Step S6 to read the original.

The reading routine performed in Step S6 is shown in FIG. 15. Prior to the reading of the original by the CCD, reading modes such as density, magnification and halftone level are set in Step S12 in accordance with instructions given by the main control section 201. Then, Step S13 is executed to conduct initialization such as turning on of the original illuminating LED, shading correction for compensating for unevenness of brightness of the LED and so forth. After safe completion of the initializing operation, the process proceeds to Step S14 in which the original document sheet is fed to set the leading edge of the sheet to the reading position, thereby preparing for the reading of the first line of scan.

In Step S15, the original image is read by the CCD on line by line basis. Then, in Step S16, whether or not the original register sensor 215 has been turned off, i.e., whether the trailing end of the original document sheet has passed the original register sensor 215, is determined. If not, Step S17 determines whether a predetermined time has passed, in the same manner as that conducted in Steps S4 and S5 of the flow shown in FIG. 14. When the trailing end of the original document sheet has passed the original register sensor 215 before the time is counted up, the process proceeds to Step S19 in which the clutch 219 is turned off to disconnect the drive of the scanner section from the conveyor motor 217 so as to prohibit the feed of the subsequent original document sheet.

Then, Step S20 is executed to read the original image to the last scan line. The routine of Step S6 is completed when the image of one page of the original document sheet has been read. Referring again to FIG. 14, the original document sheet which has been read is further advanced and, in Step S7, whether the sheet has passed the register sensor 216 is determined. After confirming that the sheet has passed the register sensor 216, the original sheet is ejected to the tray 10 in Step S8, and the conveyor motor 217 is stopped in Step S9 to complete the reading operation. A plurality of original document sheets can be read by repeating the flow shown in FIG. 14.

<Printing on recording paper fed from ADF>

Figure 16:
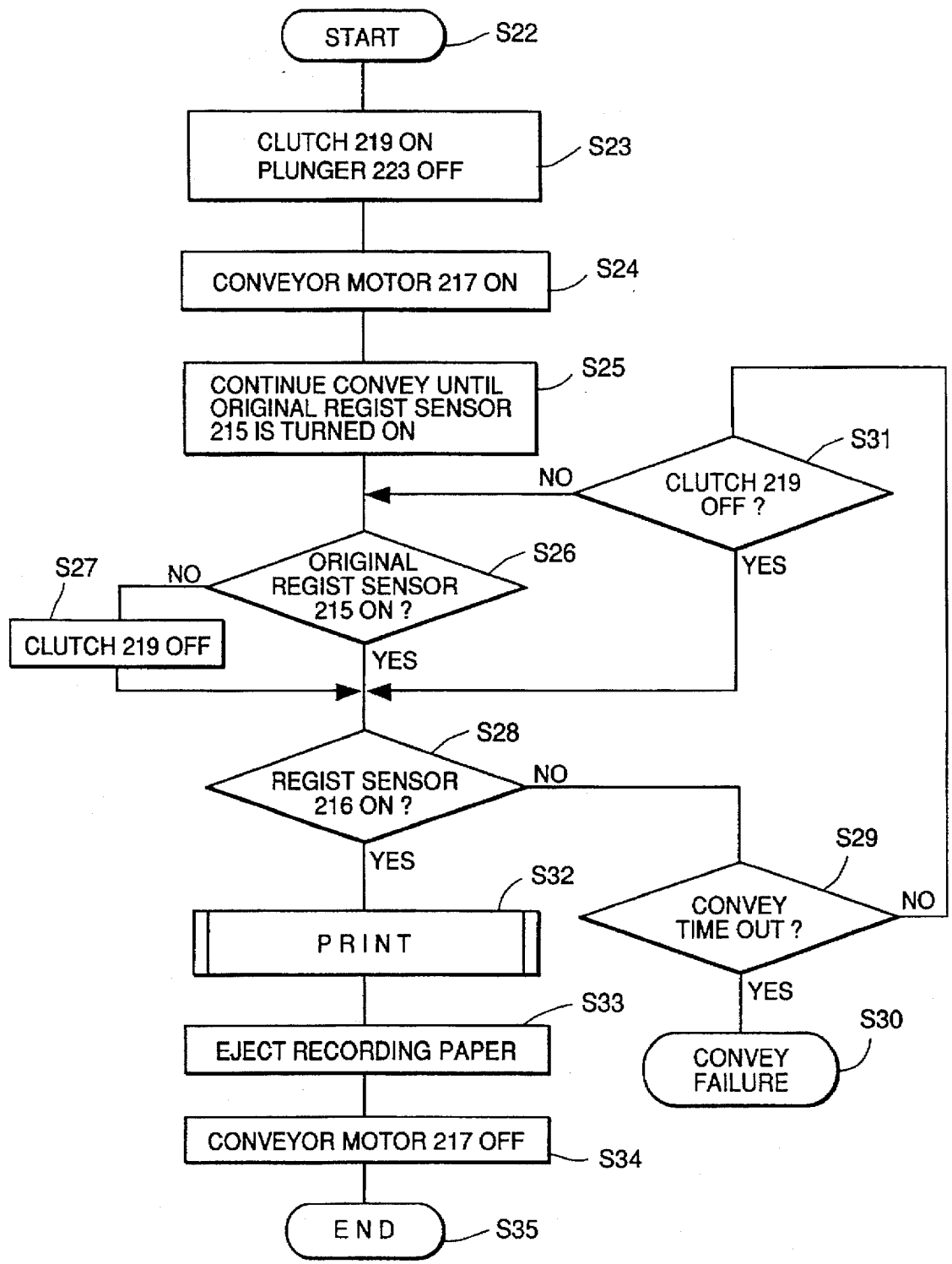
FIG. 16 is a flowchart of printing on an ADF-fed recording sheet of the apparatus.
Figure 17:
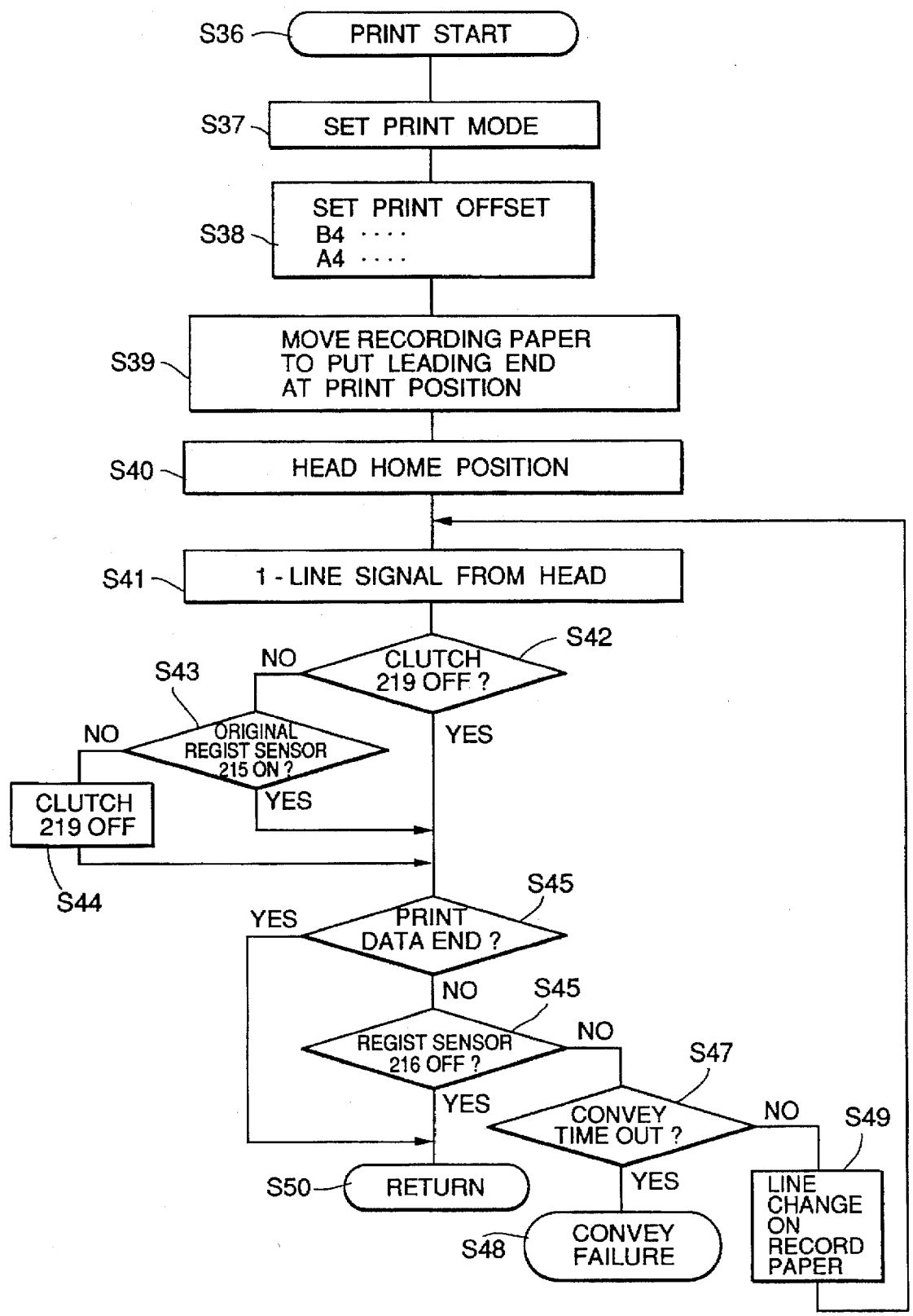
FIG. 17 is a more specific flowchart of printing on an ADF-fed recording sheet of the apparatus.

FIGS. 16 and 17 are flow charts illustrative of the operation for printing data on a paper sheet fed from the ADF. Referring to FIG. 16, the "ADF printing mode" is started in response to "start" instruction given by the main control section 201. In Step S24, the conveyor motor 217 is started and Step S25 is executed to feed the recording paper until the paper reaches the original register sensor 215. Step S26 determines whether the leading end of the recording paper has passed the sensor 215. When the paper has passed the sensor 215, an answer YES is given and the feed of the recording paper is continued and whether the paper has reached the register sensor 216 is determined in Step S28.

Meanwhile, time count is conducted in Step S29 in the same way as that in the flow explained in connection with FIGS. 14 and 15. When the set time has not been counted, the process proceeds to Step S31 which determines whether the clutch 219 is on or off. If the clutch 219 is in the on state, it is determined that the trailing end of the recording paper has not reached yet the sensor 215. In such a case, Step S26 is executed again to check the state of the sensor 215.

If the trailing end of the recording paper has passed the sensor 215 before the recording paper reaches the register sensor 216, Step S27 is executed to turn the clutch 219 off so as to disconnect the conveyor motor 217 from the scanner section thereby prohibiting the feed of the next recording paper. Conversely, when the trailing end of the recording paper has not passed the sensor 215 even when the recording paper has reached the register sensor 216, the process proceeds to Step S32 to commence the printing operation.

FIG. 17 shows the printing routine conducted in Step S32 of the flow shown in FIG. 16. Printing modes such as the size of the printing width, e.g., A 4 size or B 4 size, is conducted in Step S37. Then, Step S38 is executed to set printing offset in accordance with the printing width. The printing offset is the offset or distance of the print start position from the head home position as explained before in connection with FIGS. 9 and 10. Thus, the printing offset is set to L2 when the paper is of A 4 size and to $L_1$ when the paper is of B 4 size, and a number of the driving pulses corresponding to such a distance is set for the carriage motor 221.

Subsequently, Step S39 is executed in which the recording paper is moved to set its leading end portion to the position for recording the first line of the data, followed by execution of Step S40 for resetting the head to the home position. The print data is the parallel image data of 64 blocks obtained from the serial image data, transferred from the main control section 201 as explained before.

Then, Step S42 is executed to check for the state of the clutch 219 for the purpose of detecting the trailing end of the recording paper. If the clutch is off, it is determined that the trailing end of the recording paper has passed the sensor 215 in Steps S26 and S27 of FIG. 16, and the process proceeds to Step S45 to determine whether the print data has been terminated.

Conversely, if the clutch is still on in Step S42, the state of the sensor 215 is monitored and an operation is conducted in Step S44 to turn the clutch 219 off in Step S44. Then, the process proceeds to the aforementioned Step S45 to determine whether the print data has been terminated. In this case, the determination is conducted as to whether the print data has been terminated before the printing region on the recording paper is completely filled. If the printing is over, the printing routine is finished in Step S50.

Otherwise, the process proceeds to Step S46 which determines whether the trailing end of the recording paper has passed the register sensor 216. Line feed of the recording paper is then conducted in Step S49 while monitoring the feed time in Step S47 to print the next line of the data. This operation is repeated until the printing is finished, thus terminating the printing routine in Step S50. Referring again to FIG. 16, when the printing is finished with one page, the recording paper is ejected in Step S33, and the driving of the conveyor motor 217 is stopped to finish the ADF printing operation in Step S35. Printing on successive recording paper can be done by repeating the printing process shown in FIG. 16. Although not shown in the flowchart, the aforementioned recovery operation for recovering discharging condition of the head is conducted under a certain condition within the printing step S32.

<Printing on recording paper fed from ASF>

Figure 18:
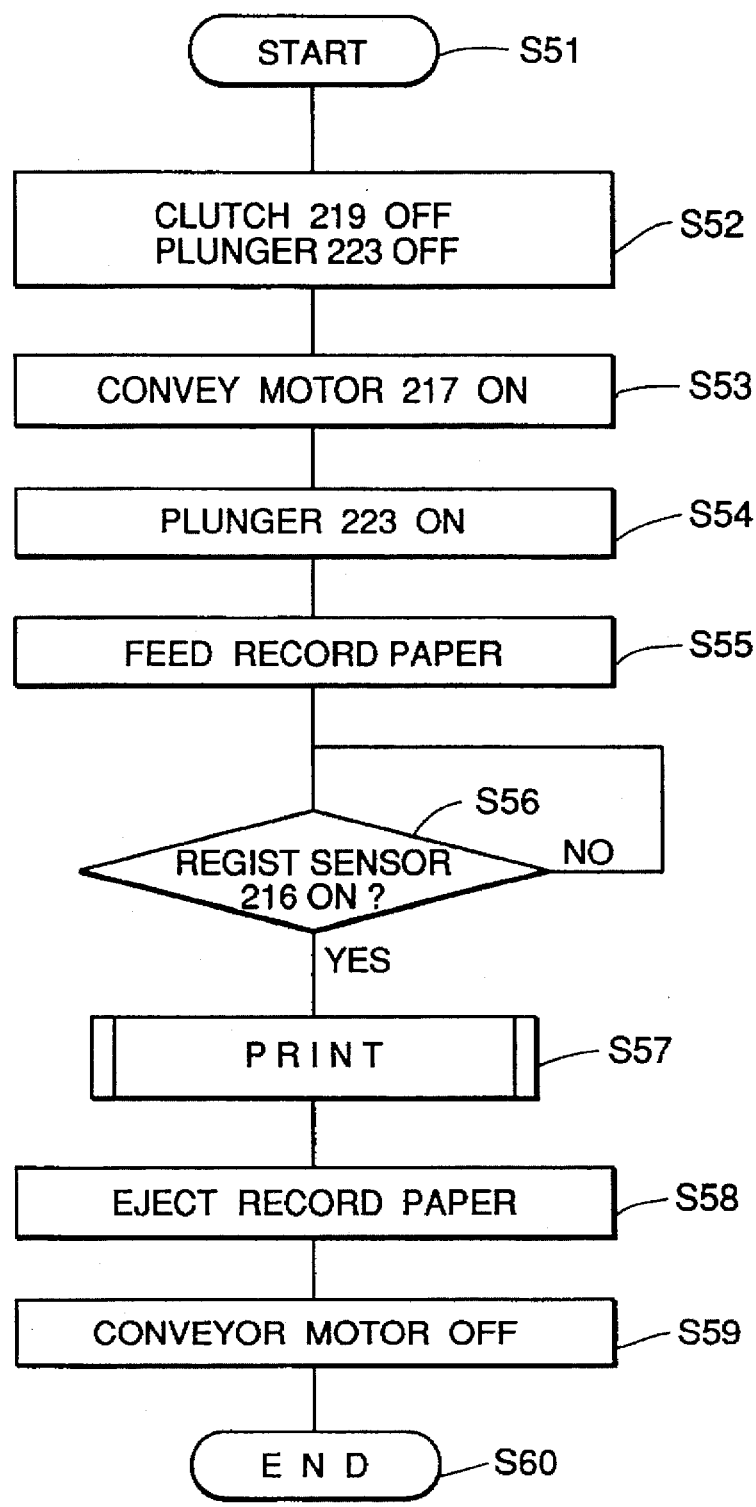
FIG. 18 is a flowchart of printing on an ASF-fed recording sheet of the apparatus.
Figure 19:
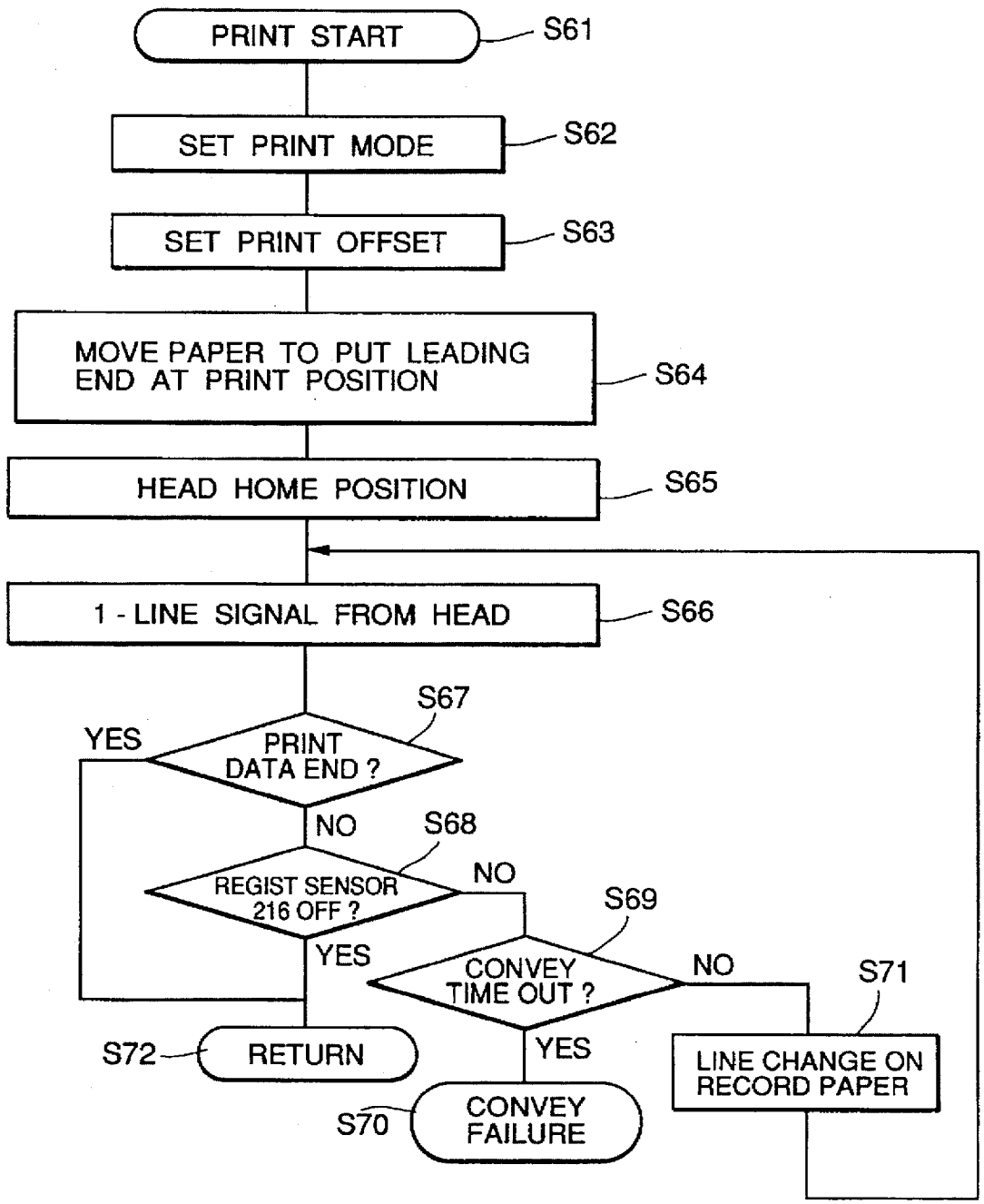
FIG. 19 is a more specific flowchart of printing on an ASF-fed recording sheet of the apparatus.

FIGS. 18 and 19 are flow charts illustrative of the operation for printing data on a recording paper fed from the ASF.

Referring first to FIG. 18, the ASF printing mode is started in response to "start" instruction given by the main control section 201 in Step S22. Then, both the clutch 219 and the plunger 223 are turned off in Step S52 and then the conveyor motor 217 is started in Step S53. Then, Step S54 is executed to turn the plunger 223 on. As a result of turning on of the plunger 223, the crescent roller 29 of the ASF section makes one full turn so that a sheet of recording paper is separated from the paper stack on the ASF and is fed by the operation of the conveyor motor 217 in Step S55. The feed is continued until the paper reaches the register sensor 216 in Step S56. Then, the printing operation is commenced in Step S57 when the paper has reached the register sensor 216.

FIG. 19 shows the printing routine performed in the Step S57 of the flow shown in FIG. 18. In Step S62, printing mode is set in accordance with printing mode instruction given by the main control section 201. Then, the printing offset is set in Step S63. In the ASF printing mode, the amount of offset is fixed to L1, unlike the operation in the ADF printing mode.

In Step S64, the printing paper is moved to set the leading end portion to the position for printing the first line of data, followed by resetting of the head to the home position conducted in Step S65. Then, printing is commenced to print the first line of the data in Step S66. After completion the printing of the first line, determination is conducted as to whether the printing data has been terminated in Step S67. The printing routine is finished in Step S72 if the printing data has been terminated. Conversely, if the printing data has not been terminated, the process proceeds to Step S68 in which the trailing end of the recording paper is sensed by the register sensor 216. Then, the printing operation is repeated while determination is conducted as to whether the printing data has been terminated, whether the printing has to be done for the next line of data and whether the set time has been counted up in Step S69.

Referring back to FIG. 18, the paper is ejected in Step S58 when the printing is finished with one page, and the conveyor motor 217 is stopped in Step S59 to terminate the ASF printing operation in Step S60. Printing on successive paper sheets can be done by repeating the printing operation shown in FIG. 18. Although not specifically shown in the flowchart, the recovery operation for recovering the discharging condition of the head is conducted under certain conditions within the printing routine of Step S57.

<Application operation>

Figure 20:
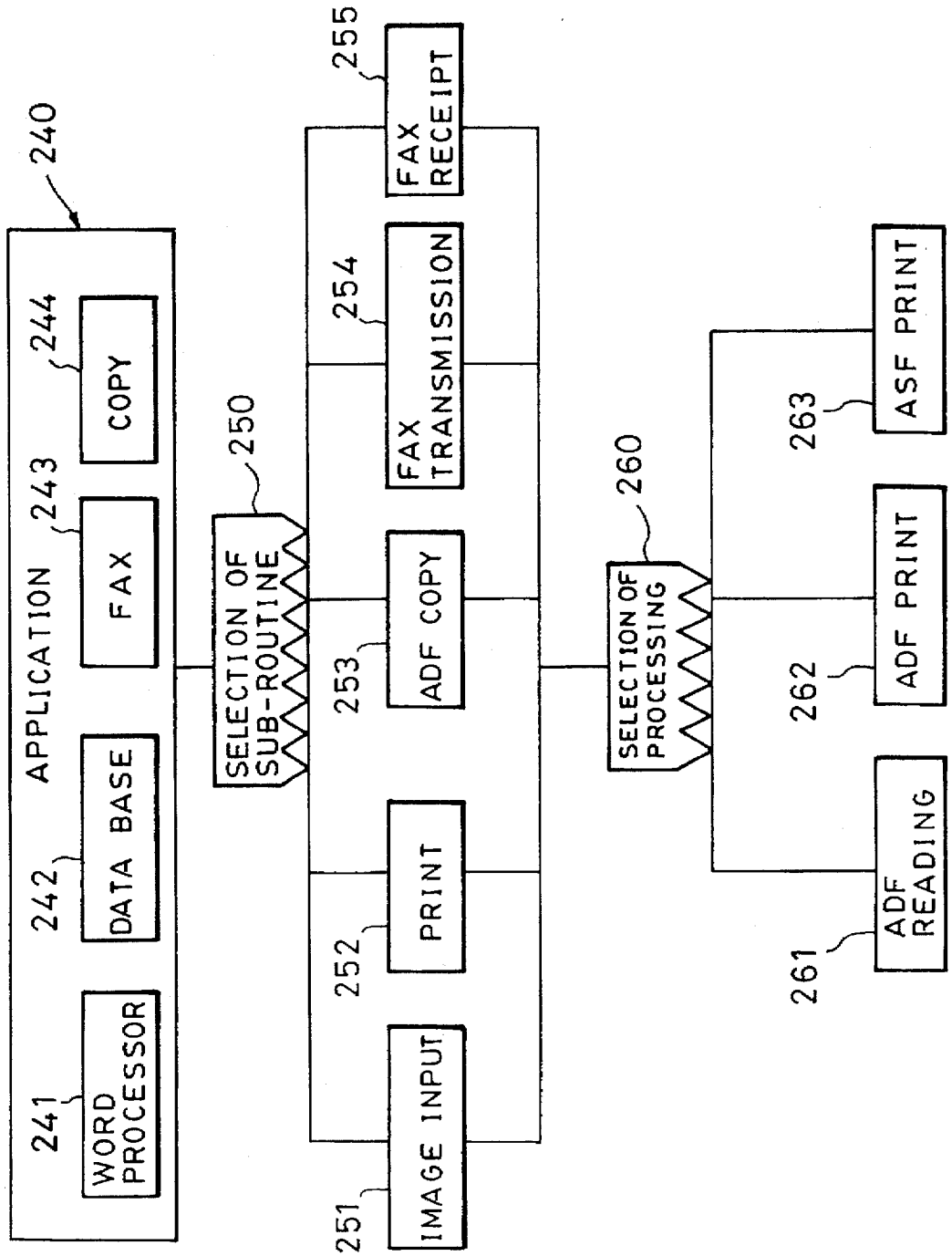
FIG. 20 illustrates the relation of applications, various control sub-routines and various processings of the scanner and printer section.

FIG. 20 shows application programs in relation to the control sub-routines and processings performed by the scanner/printer section. Four types of applications or modes are available: wordprocessor mode, data base administration mode, facsimile mode and copying mode. A desired sub routine is selectable from each application. For instance, when a photograph is "pasted" to a document by using the wordprocessor mode, the sub routine "image input" is used, whereas, the sub routine "printing" is called for the purpose of printing the completed document. Each sub routine performs reading of image and printing by using necessary processings.

<Printing>

Figure 21:
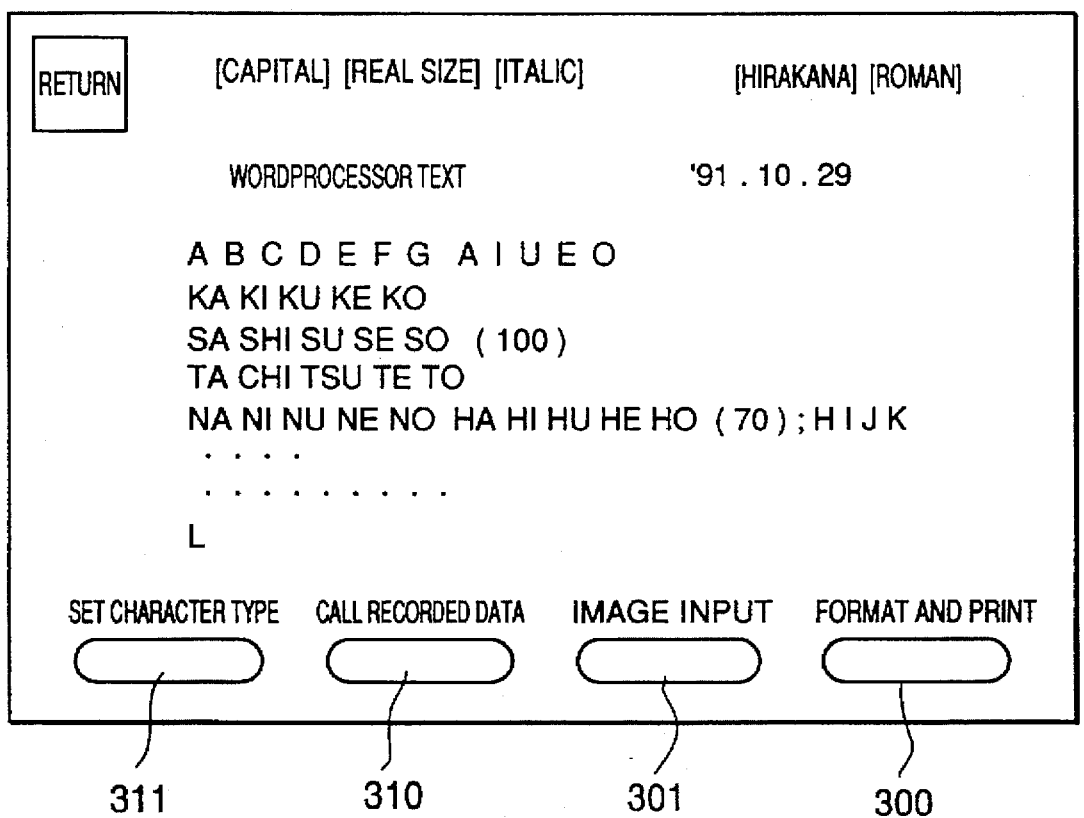
FIG. 21 shows a display view for word processing of the apparatus.

For the purpose of printing a text formed by the word-processing mode, a preprint menu is called from a word-processor editing menu shown in FIG. 21, by appointing an icon 300. Numeral 301 denotes an icon for calling pre-image-input menu.

Figure 22:
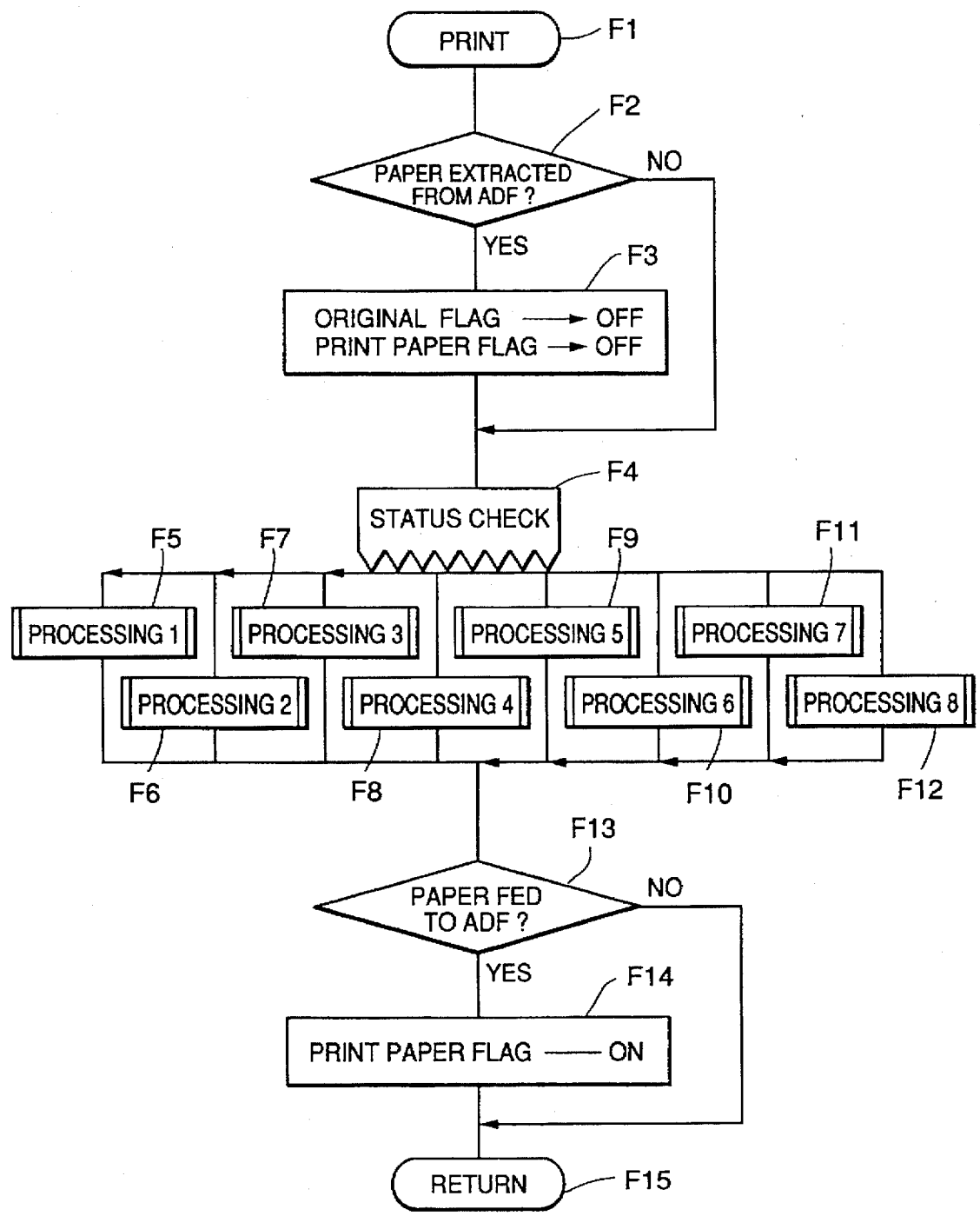
FIG. 22 is a flowchart of printing of the apparatus.

FIG. 22 shows the flow of the printing routine.

A printing subroutine Fj is executed when the icon 300 is pressed. After an original flag or a print paper flag has been set (turned on), a check is conducted as to whether the paper has not been extracted from the ADF (F2). If the paper has been extracted, both the original flag and the print paper flag are cleared (turned off).

Then, a status check F4 is conducted to determine the composition of the preprint menu. This check is conducted by examining the states of five flags 0 to 4 which will be mentioned later. In order to display eight types of preprint menu, the process proceeds to a subroutine of processings 1 to 8.

After completion of the subroutine, a check is conducted as to whether the paper has been inserted (F13) into the ADF. If the paper has been inserted, the print paper flag is turned on. The process returns after completion of the subroutine (F15).

A description will be given as to the contents of the five flags which are examined for the purpose of determining the composition of the preprint menu, with specific reference to FIG. 23.

<Flag 2>

The flag 2 is for setting the paper feed mode. This flag is set to "1" when both the ADF and ASF are considered as the source of the print paper, whereas, when the ASF alone is used as the source of the paper, this flag is set to "0".

<Flag 0>

The flag 0 is a flag indicative of the presence or absence of the paper on the ASF and is set to "1" and "0" when the paper exists and when the paper does not exist, respectively, on the basis of signals delivered by the scanner/printer control section.

<Flag 1>

The flag 1 is a flag indicative of presence of absence of paper on the ADF and is set to "1" and "0" when paper exists and when paper does not exist on the ADF, respectively, on the basis of signals delivered by the scanner/printer control section as is the case of the flag 0.

<Flag 3>

The flag 3 is a flag indicative of whether the paper on the ADF is an original document paper or not, and is set to "1" and "0", respectively, when the paper is an original document sheet and when the paper is not an original document sheet. The determination is conducted by a subroutine for detecting remaining paper.

<Flag 4>

The flag 4 is a flag indicative of whether the paper on the ADF is a printing paper or not, and is set to "1" and "0", respectively, when the paper is a printing paper and when the paper is not a printing paper. The determination is conducted by a subroutine for detecting remaining paper, as is the case of the flag 3.

Figure 24:
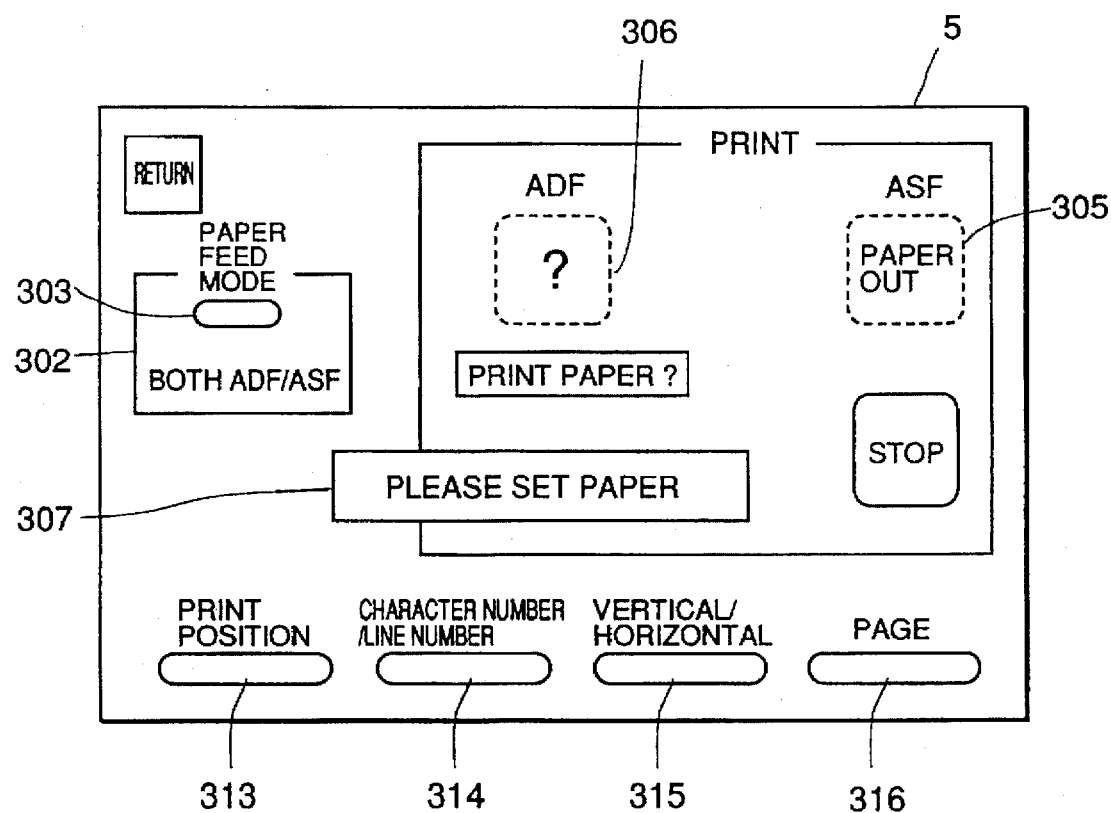
FIG. 24 is a view of an example of a menu for printing (pre-print menu (5)) of the apparatus.

FIG. 24 illustrates an example of the pre-print menu. Numeral 302 denotes a region for setting the paper feed mode. The setting is conducted by operating an icon 303. The illustrated state shows that the paper feed mode has been set for using both the ADF and the ASF as the source of the paper. Numeral 305 denotes a region for indicating the state of the ASF. The illustrated state shows that there is no paper in the ASF. Numeral 306 designates a portion for indicating the state of the ADF. The illustrated state shows that a paper sheet other than a printing paper is set on the ADF. Numeral 307 designates a message for requesting the operator to add paper.

<Pattern selection>

Figure 25:
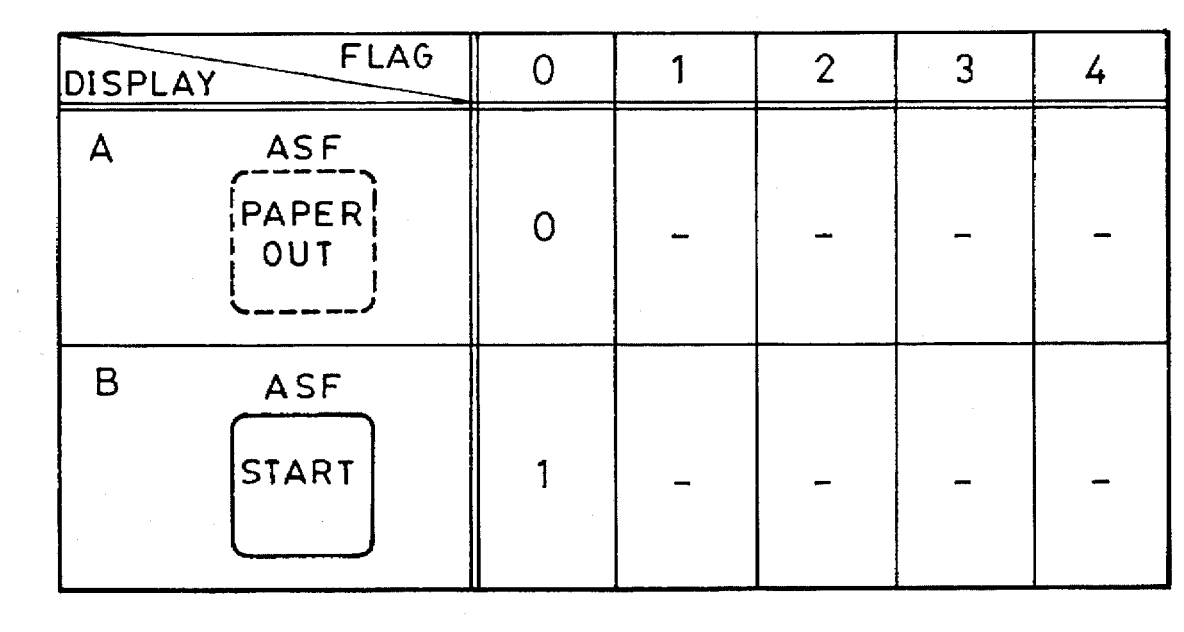

A description will be given of the method of selecting a pattern for each of the regions on the pre-print menu. FIG. 25 shows a table indicating the relationship between the display pattern of the ASF region 305 and the states of the flags. In the table shown in FIG. 25, a symbol "-" indicates that the flag does not take part in the determination. A display pattern A is displayed when the flag 0 has been set to "0", while a pattern B is displayed when the flag 0 has been set to "1". Thus, the pattern A is displayed when there is no paper on the ASF, whereas the pattern B is displayed when paper exists on the ASF.

FIG. 26 is a table showing the relationship between the display pattern on the ADF region 306 and the states of the flags. A pattern C, i.e., no message, is displayed when the flag 2 has been set to "0", i.e., when the paper feed mode has been fixed to choose the ASF mode. When the flag 2 has been set to "1", i.e., when both the ADF and the ASF are used as the source of the paper, a pattern D is displayed when the flag 1 has been set to "0", i.e., when there is no paper on the ADF. This display pattern is to request the operator to manually supply paper. In this state, input of any instruction through a touch on an icon is not accepted.

When the flags 2, 1 and 4 have been set to "1", i.e., when a paper which is determined as being a printing paper exists on the ADF, a pattern E is displayed. When this icon is pressed, an operation is started to feed paper from the ADF. Conversely, a pattern F is displayed when the state of the flag 4 is "0", i.e., when the paper has been determined as being a paper other than the printing paper.

FIG. 27 shows a table illustrative of the relationship between the paper add message and the states of flags. A pattern G is displayed when both the ADF and the ASF lack paper. A pattern H, i.e., no message, is displayed when paper exists on either one of the ADF and the ASF.

Display patterns of the respective regions of the pre-print menu are thus selected. It will be understood that 8 types of pre-print menus are available by combination of these patterns. These eight types of pre-print menus, represented by #1 to #8 respectively, are shown in FIGS. 28 to 34. The pre-print menu #5 is the same as that shown in FIG. 24. Thus, when a printing menu has been called by the operator, one of the pre-print menus #1 to #8 is selectively displayed in accordance with the result of examination of the states of the flags 0 to 4. Then, an operation is performed in accordance with a flow which will be explained hereinafter with reference to a flowchart.

<Processing 1>

Figure 35:
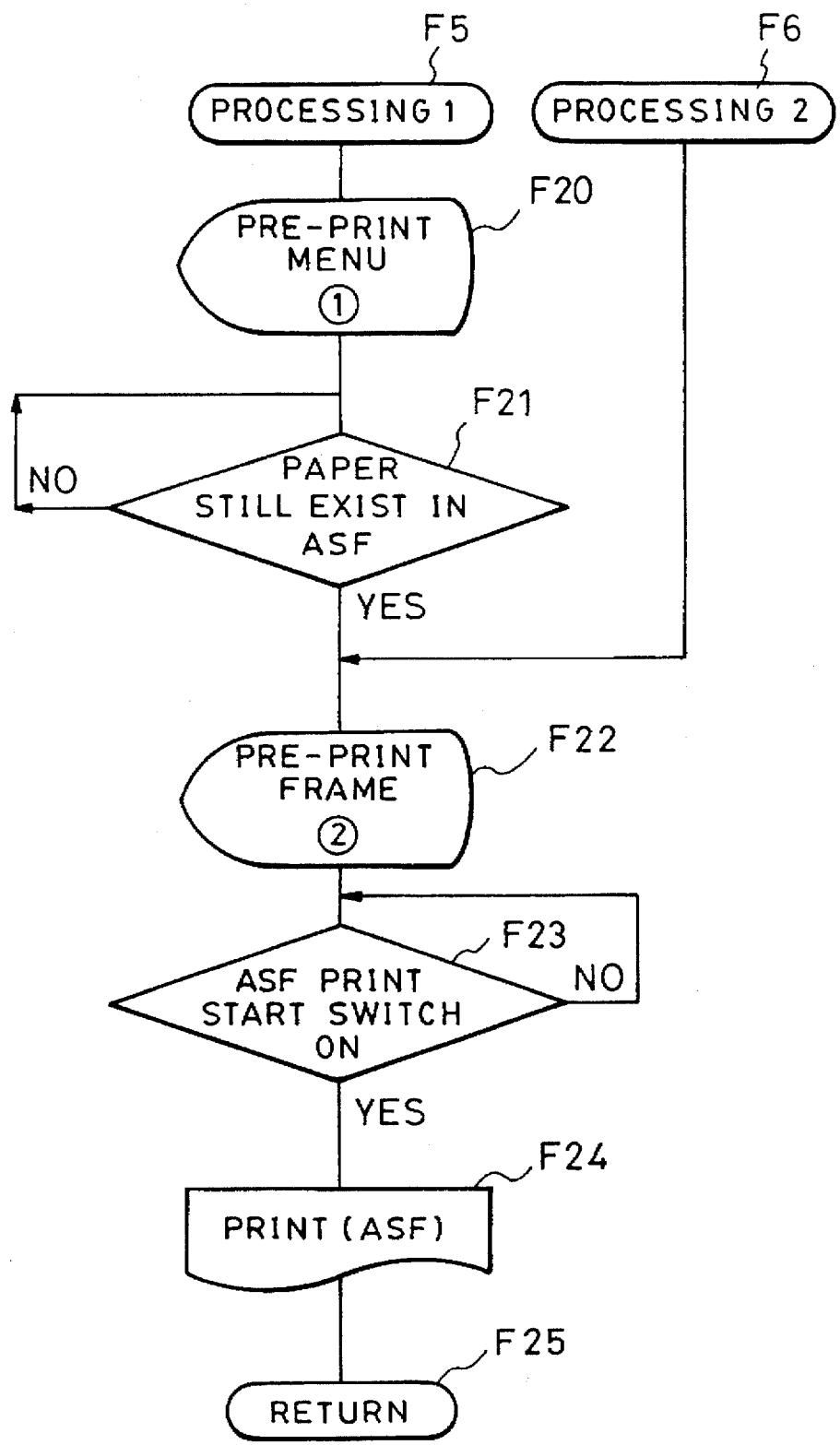
FIG. 35 is a flowchart of a printing operation.

FIG. 35 shows a flowchart illustrating the processing 1 (F5) and the processing 2 (F6). The processing 1 is a sequence which is validated when the paper feed mode has been set to select the ASF alone, and is executed when there is no paper on the ASF. In this case, the program displays the pre-print menu #1 shown in FIG. 26. Then, a check is conducted as to whether paper exists on the ASF and the sequence of the processing 2 (F6) is executed after a paper is placed on the ASF.

<Processing 2>

The processing 2 (F6) is a sequence which is valid when the paper feed mode has been set to select the ASF alone, and is executed when paper exists on the ASF. In this case, the program displays the pre-print menu #2 shown in FIG. 29. As the operator selects the ASF start switch 305 (F23), a printing operation is conducted to print on paper sheets of an appointed number fed from the ASF (F24). The process returns after completing this sub-routine (F25).

<Processing 3>

Figure 36:
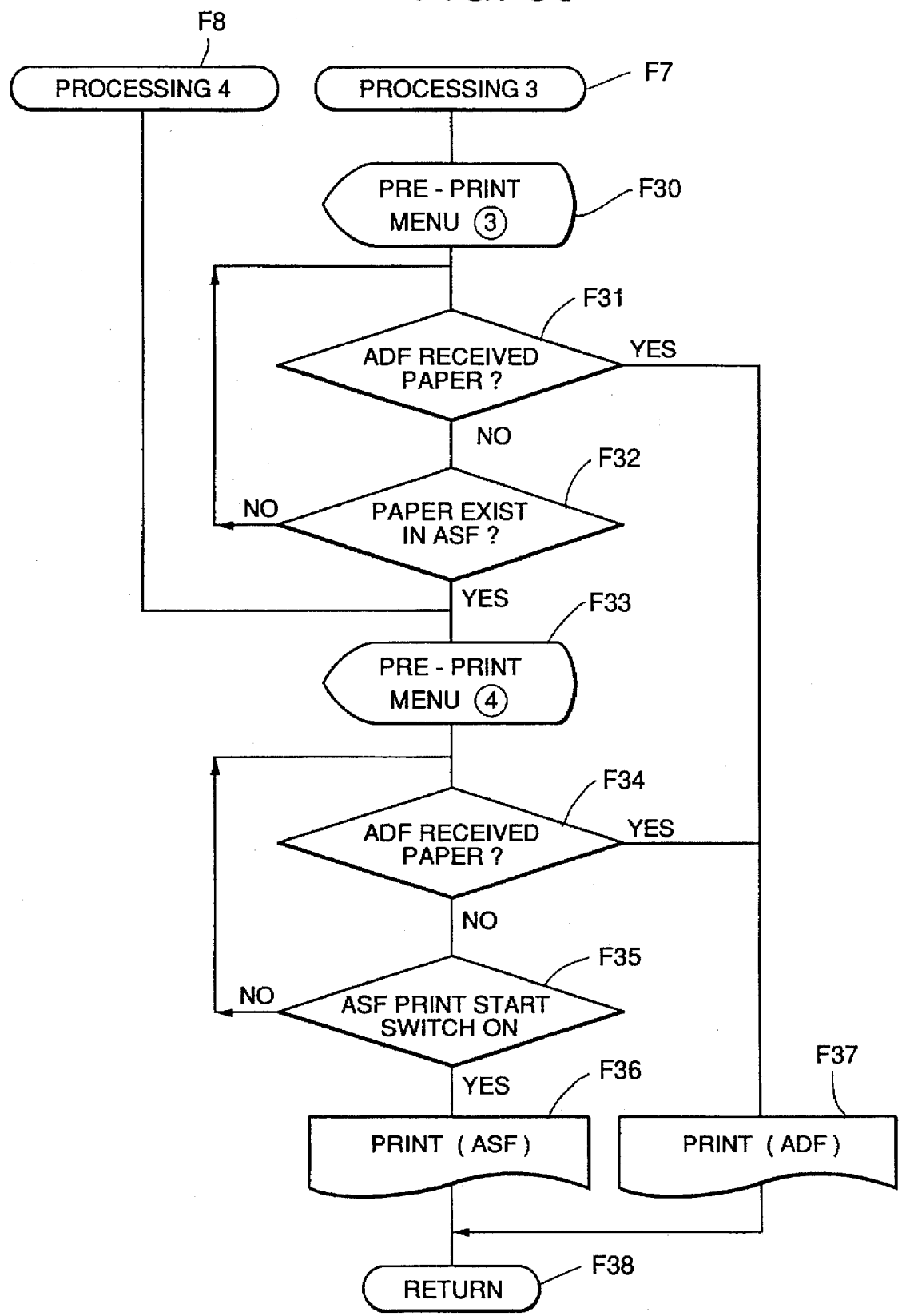
FIG. 36 is a flowchart of another printing operation.

FIG. 36 is a flow chart illustrative of the processings 3 (F7) and the processing 4 (F8). The processing 3 (F7) is a sequence which is valid when the paper feed mode has been set to use both the ADF and the ASF, and is executed when both the ASF and the ADF lack paper. In this case, the program displays the pre-print menu #3 of FIG. 30 (F30). A check is conducted as to whether paper has been inserted to the ADF after the start of the printing sub-routine (F31). If the paper has been set in the ADF, the paper on the ADF is determined as being printing paper, so that printing is conducted on an appointed number of paper sheets fed from the ADF (F37). The process returns after completion of the printing (F38).

When absence of paper on the ADF is detected (F31), a check is conducted as to whether paper has been set on the ASF (F32). If there is no paper on the ASF, the process returns to F31 to repeat the loop. If paper has been set on the ASF, the sequence of the processing 4 (FS) is executed.

<Processing 4>

The processing 4 (F8) is a sequence which is adopted when both the ADF and the ASF are used as the source of the paper feed, and is executed when paper exists on the ASF or when no paper exists on the ADF. In this case, the program displays the pre-print menu #4 of FIG. 31 (F33).

Subsequently, a check is done as to whether paper has been set on the ADF after the start of the printing sub-routine (F34). If paper has been set on the ADF, the paper set on the ADF is determined as being printing paper and printing is conducted on an appointed number of paper sheets fed from the ADF (F37). The process returns after the completion of this printing (F38).

Conversely, when the check in F34 has proved that no paper has been set on the ADF, a check is conducted as to whether the ASF printing start switch 305 has been selected (F35). If the switch 305 has not been selected, the process skips to F34 to repeat this loop of process. Conversely, if the printing start switch 305 has been selected, printing is conducted on an appointed number of paper sheets fed from the ASF (F36). The process returns after the completion of this printing operation (F38).

Figure 37:
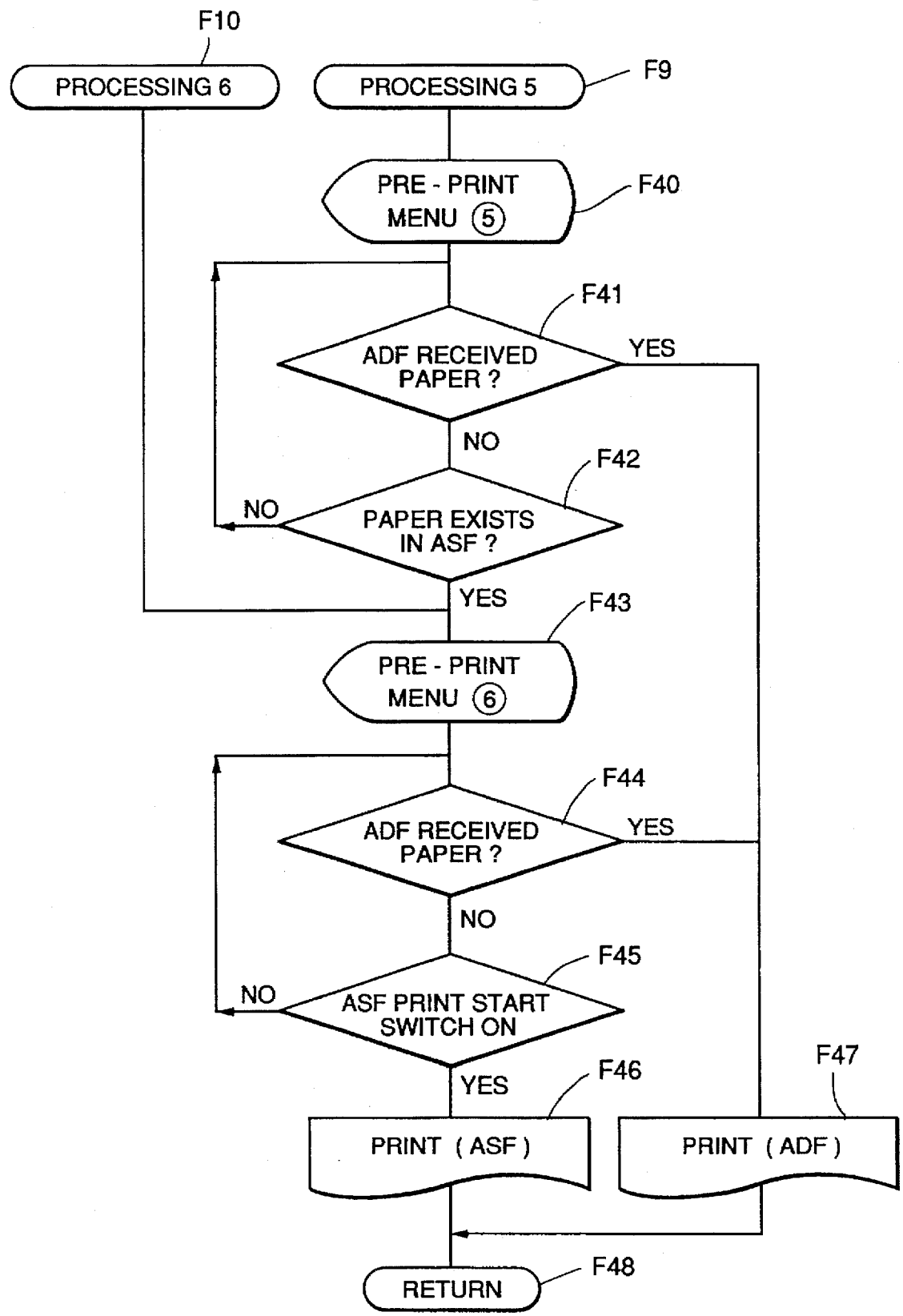
FIG. 37 is a flowchart of still another printing operation.

FIG. 37 shows a flow chart illustrative of the processing 5 (F9) and processing 6 (F10).

<Processing 5>

The processing 5 is a sequence which is adopted when the paper feed mode has been set to use both the ADF and the ASF and is executed when the ASF lacks paper while the paper on the ADF is a paper other than the printing paper.

In this case, the program displays the pre-print menu #5 of FIG. 24 (F40). Then, a check is conducted as to whether a paper was extracted from the ADF followed by insertion of a paper after the start of the printing sub-routine (F41). If paper has been set in the ADF, the paper on the ADF is judged as being a printing paper, and printing is conducted on an appointed number of paper sheets fed from the ADF (F47). If no paper has been newly set on the ADF after the start of the printing sub-routine, a check is conducted as to whether paper has been set on the ASF (F42). If there is no paper, the process returns to F41 to repeat this loop of operation. Conversely, if paper has been set, a sequence of the processing 6 (F10) is executed.

<Processing 6>

The processing 6 is a sequence which is adopted when the paper feed mode has been set to use both the ADF and the ASF, and is executed when paper exists on the ASF while the paper set on the ADF is a paper other than the printing paper. In this case, the program displays the pre-print menu #6 of FIG. 32 (F43).

Then, a check is conducted as to whether paper has been inserted into the ADF following extraction of paper from the ADF after the start of the printing sub-routine (F44). If paper has been inserted into the ADF, the paper on the ADF is judged as being printing paper, and printing is conducted on an appointed number of paper sheets fed from the ADF (F47). The process returns after completion of this printing (F48).

Conversely, when insertion of new paper to the ADF has not been conducted after the start of the printing sub-routine, a check is conducted as to whether the ASF print start switch 305 has been selected (F45). If this switch has not been selected, the process skips to F44 to repeat this loop of operation. If the switch has been selected, printing is conducted on an appointed number of paper sheets fed from the ASF (F46). The process then returns after the completion of the sub-routine (F48).

Figure 38:
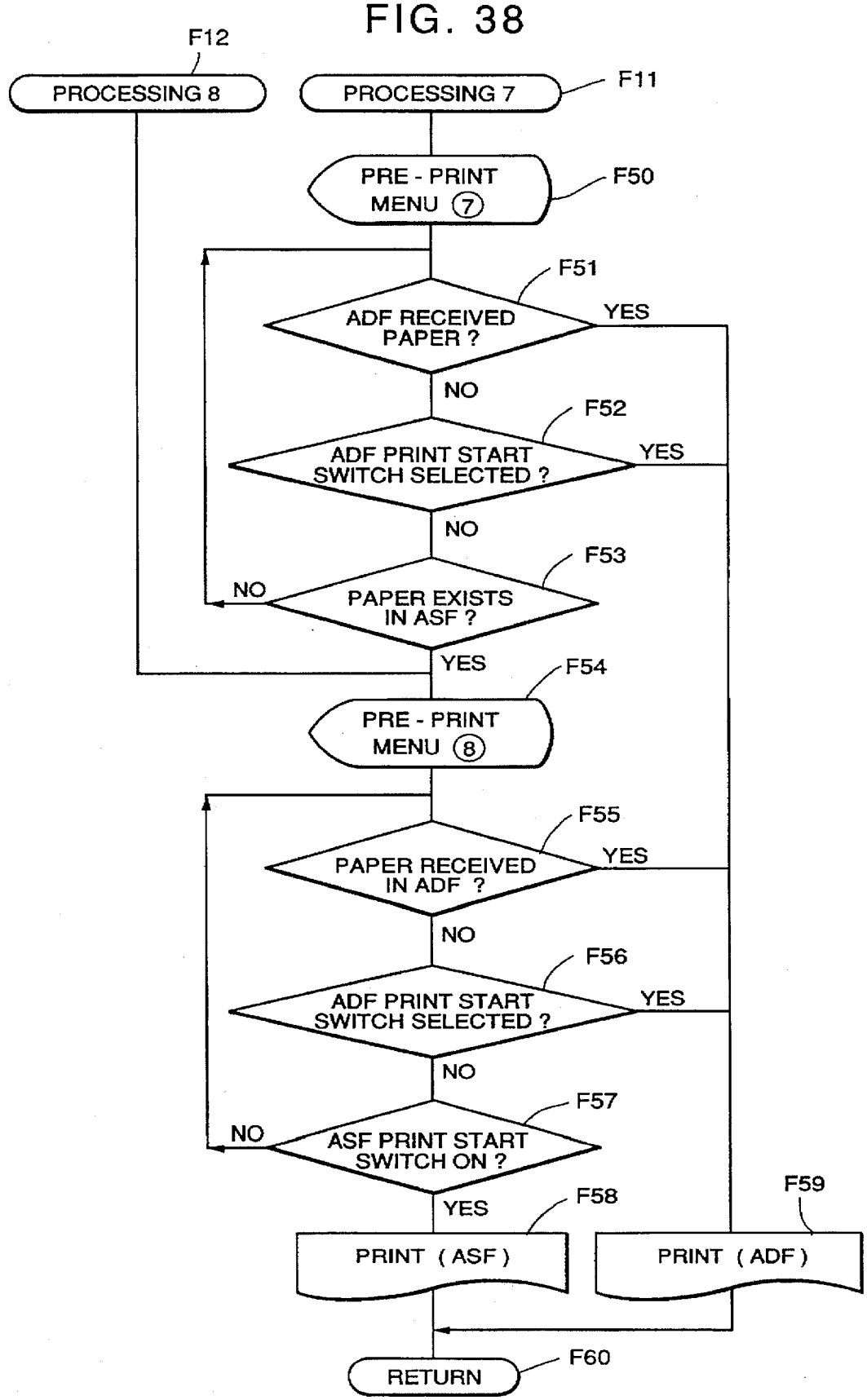
FIG. 38 is a flowchart of a further printing operation.

FIG. 38 shows the flow of the processing 7 (F11) and the processing 8 (F12).

<Processing 7>

The processing 7 is a sequence which is adopted when the paper feed mode has been set to use both the ADF and ASF and which is executed when the paper set on the ADF is printing paper while the ASF lacks paper.

Figure 33:
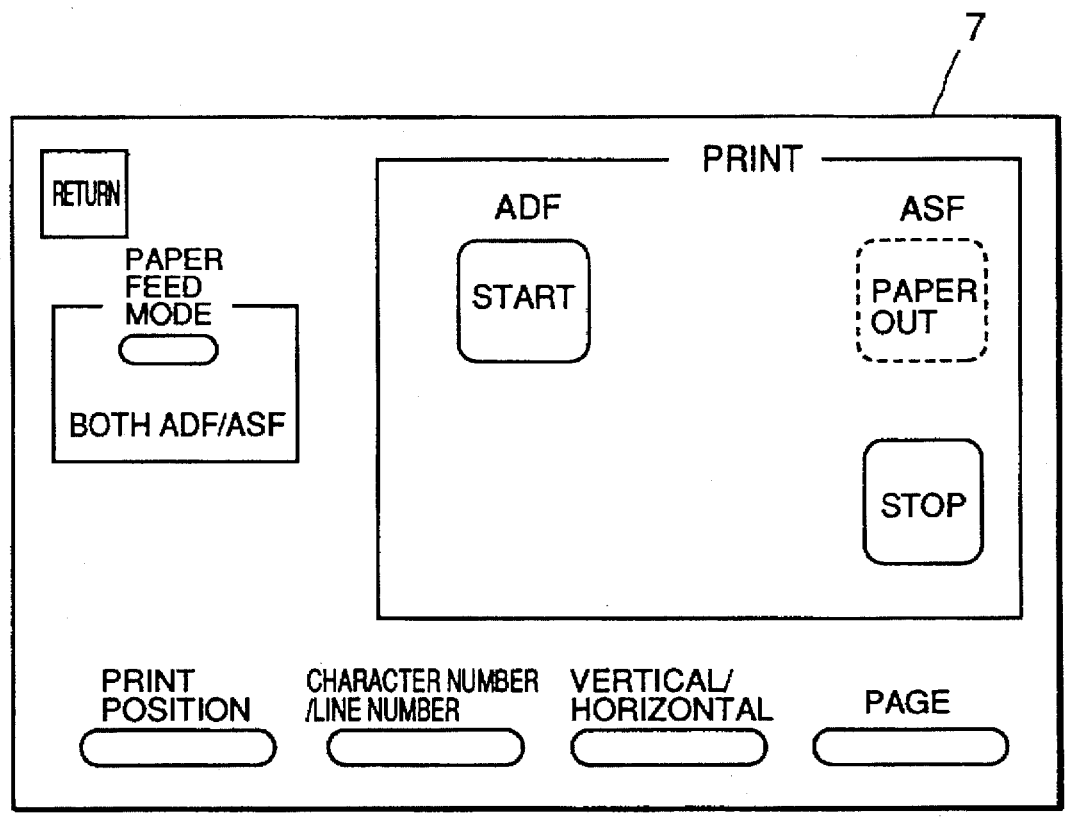
FIG. 33 shows pre-print menu (7)

In this case, the program displays a pre-print menu #7 of FIG. 33 (F50). Then a check is conducted as to whether paper has been newly inserted into the ADF following removal of paper therefrom, after the start of the printing sub-routine (F51). If paper has been newly inserted to the ADF, the paper on the ADF is judged as being printing paper, and printing is conducted on an appointed number of paper sheets fed from the ADF (F59). The process returns after completion of this printing (F60).

If insertion of paper has not been conducted after the start of the printing, a check is done as to whether the ADF print start switch 306 has been operated (F52). If this switch has been operated, printing is conducted on an appointed number of paper sheets fed from the ADF (F59). The process returns after the completion of the printing (F60). If the switch 306 has not been selected, a check is conducted as to whether paper has been placed on the ASF (F53). If no paper exists on the ASF, the process skips to F51 to repeat this loop of operation. A sequence of the processing 8 (F12) is executed when paper exists on the ASF.

<Processing 8>

Processing 8 (F12) is a sequence which is adopted when the paper feed mode has been set to use both the ADF and the ASF and is executed when the paper set on the ADF is printing paper while the ASF holds paper.

Figure 34:
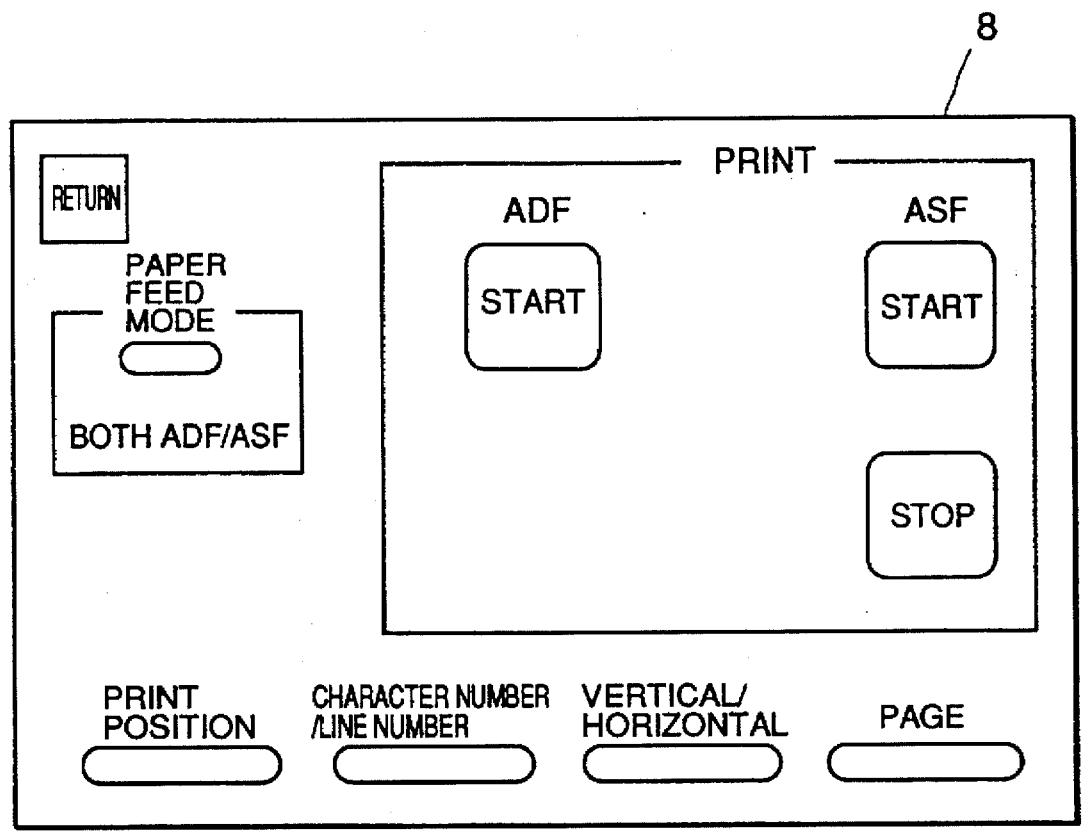
FIG. 34 shows pre-print menu (8)

In this case, the program displays the pre-print menu 8 of FIG. 34 (F54).

A check is then conducted as to whether paper has been inserted to the ADF following extraction of paper therefrom after the start of the printing sub-routine (F55). If paper has been inserted to the ADF, the paper on the ADF is judged as being the printing paper, and printing is conducted on an appointed number of paper sheets fed from the ADF (F59). The process returns after completion of this printing operation (F60).

If insertion of paper has not been newly conducted after the start of the printing sub-routine, a check is conducted as to whether the ADF print start switch 306 has been selected (F56). If this switch 306 has been selected, printing is conducted on an appointed number of paper sheets fed from the ADF (F59). The process returns after the completion of this printing operation (F60).

If the switch 306 has not been selected, a check is conducted as to whether the ASF print start switch 305 has been selected (F57). If the switch 305 has been selected, printing is conducted on an appointed number of paper sheets fed from the ASF (F58). The process then returns after completion of this printing operation (F60).

<Entry of image>

Figure 39:
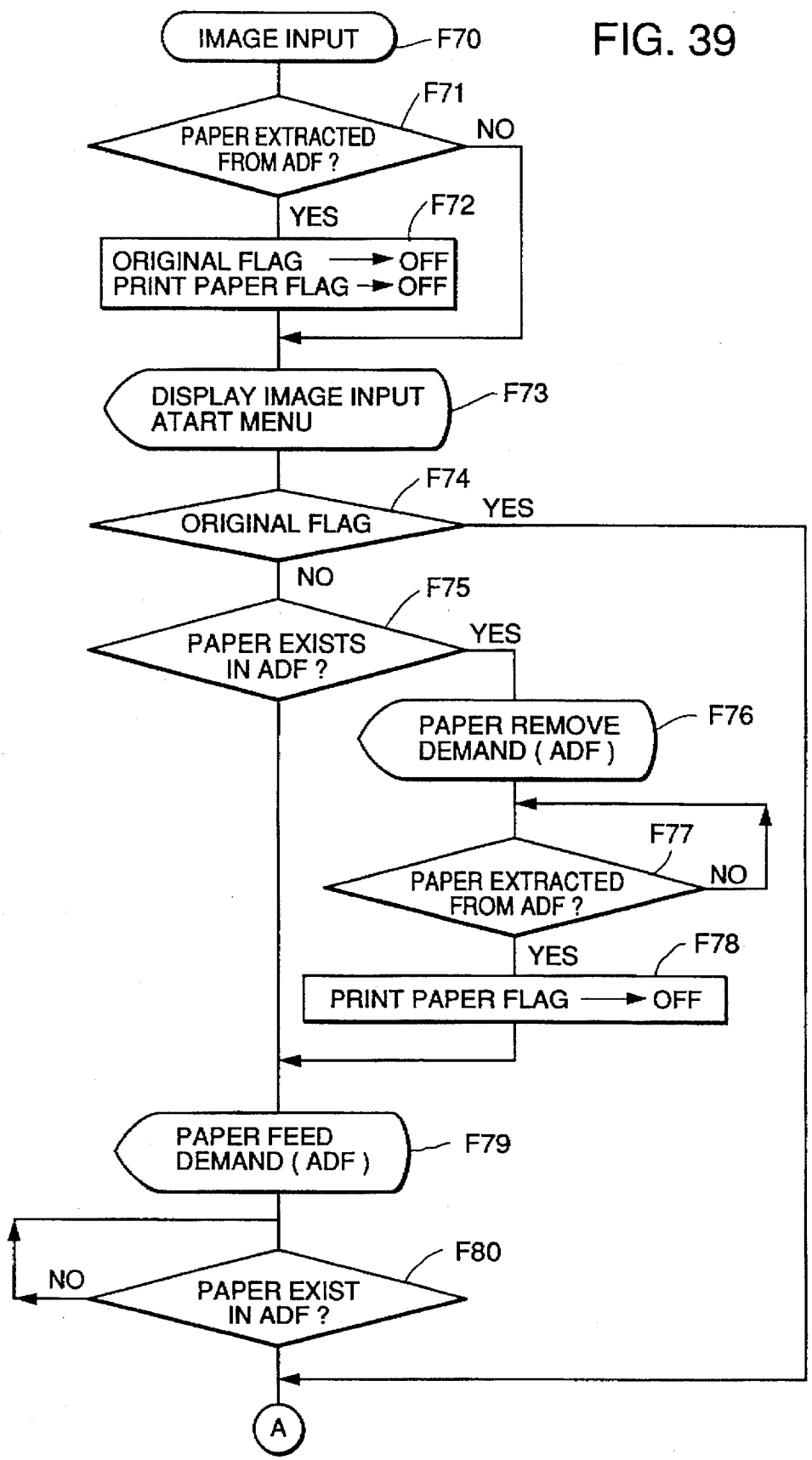
FIG. 39 is a flowchart of an image input sub-routine.
Figure 40:
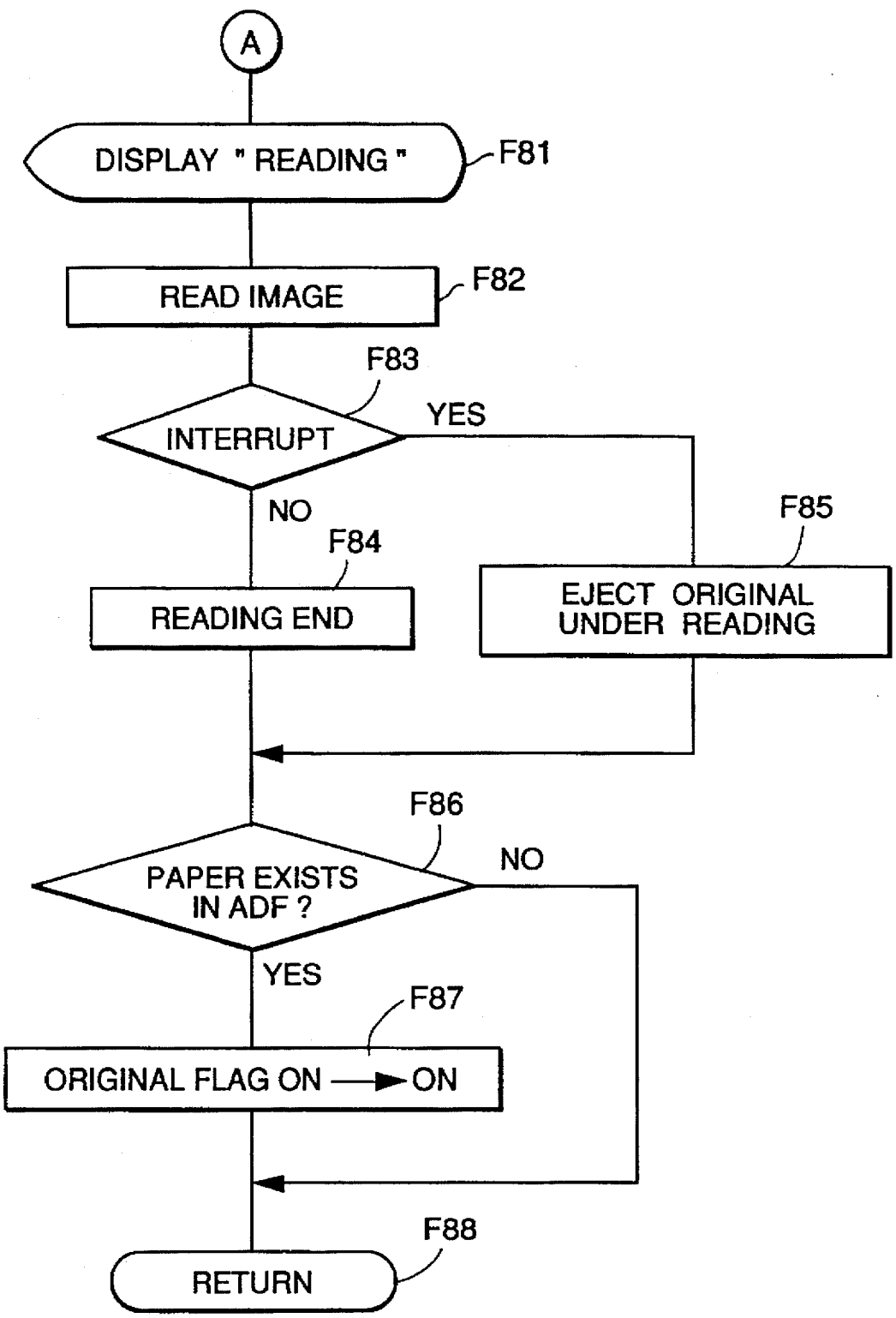
FIG. 40 is a continuation of the flowchart shown in FIG. 39.

Image input sub-routine of FIG. 39 is executed when the icon 301 is selected from the application shown in FIG. 21.

A check is conducted as to whether extraction of paper has not been conducted after paper has been set on the ADF (F71). If paper has been extracted, the original flag and the printing paper flag are both cleared (F72).

Figure 41:
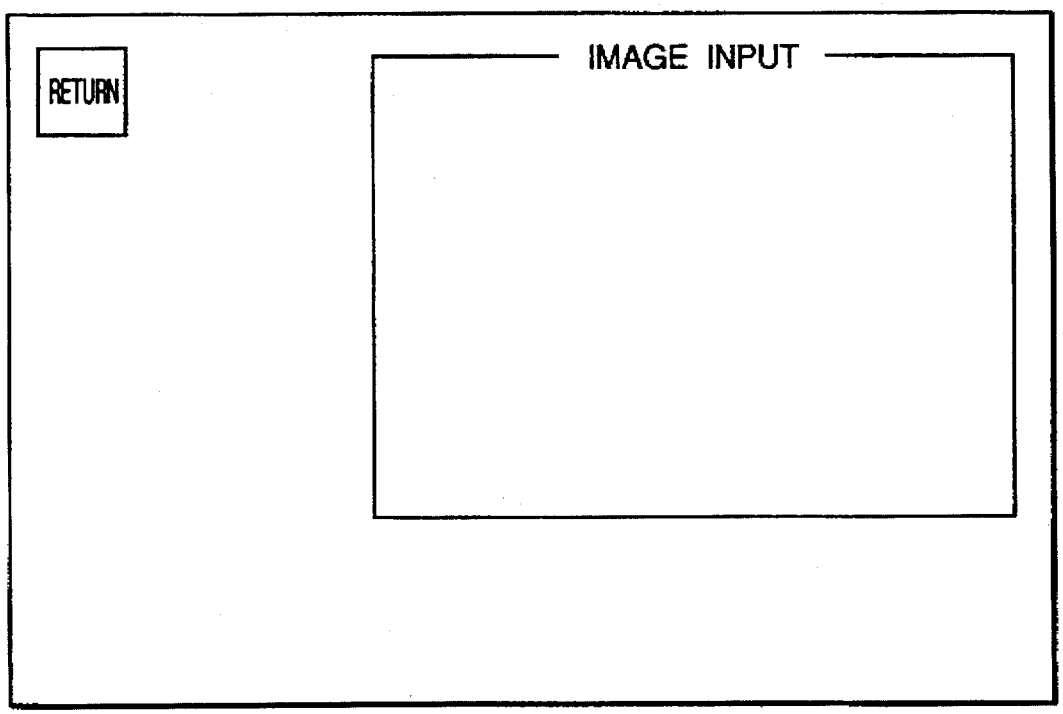
FIG. 41 is a display view for starting image input.
Figure 42:
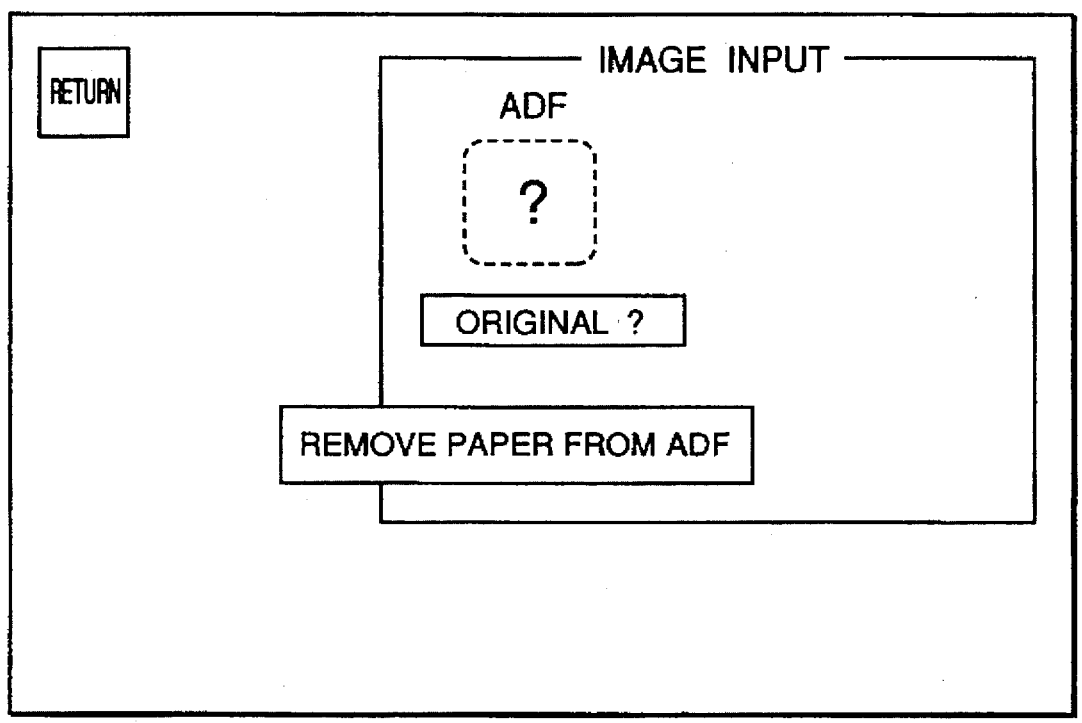
FIG. 42 display view for requesting to remove paper from the ADF.

Subsequently, the image input start menu of FIG. 41 is displayed (F73), and a check is done as to whether the original flag has been set on (F74). If the original flag has been set on, the process skips to an image reading step (F82). Conversely, when the original flag has been off, a check is conducted as to whether paper exists on the ADF (F75). If paper exists on the ADF, a demand is given for removal of the paper from the ADF (F76), and the menu shown in FIG. 42 is displayed. Then, the process waits for the removal of paper from the ADF.

Figure 43:
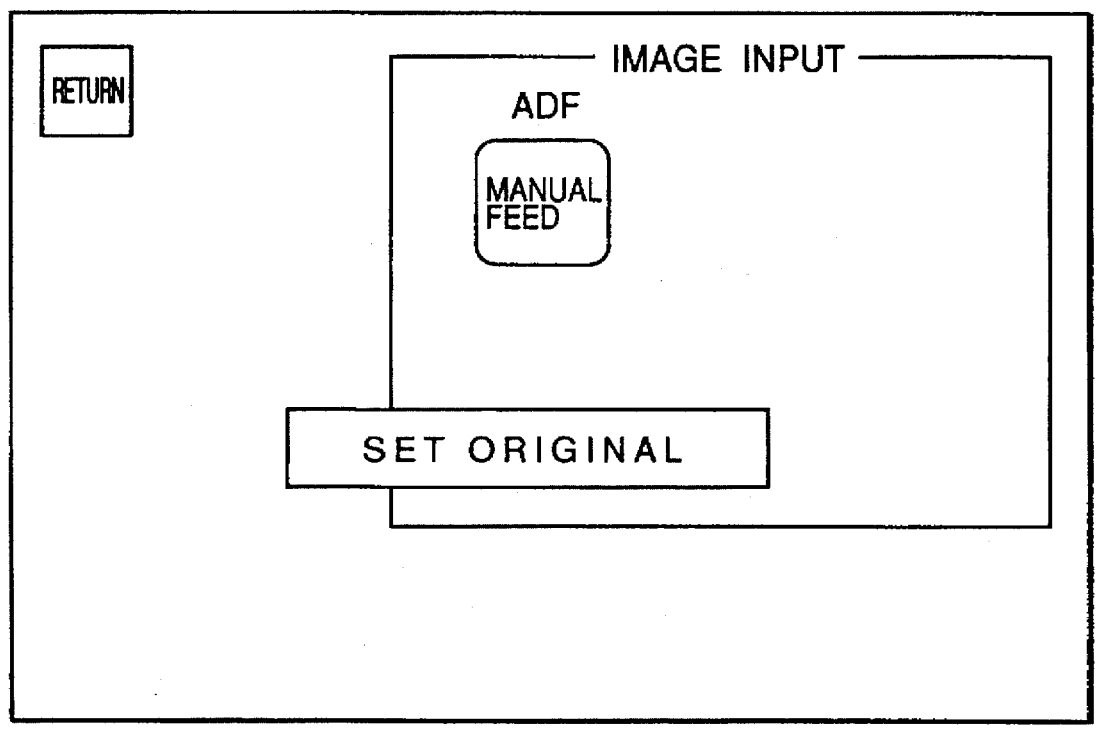
FIG. 43 is a display view for requesting to set an original.

After the removal of the paper from the ADF, the printing paper flag is cleared (turned off), and a demand is given for setting paper on the ADF, while the menu of FIG. 43 is displayed (F79). The process then waits for the insertion of paper into the ADF (F80). Thus, the design is such that the user is obliged to extract the paper if the paper on the ADF cannot be definitely determined as being a printing paper.

Figure 44:
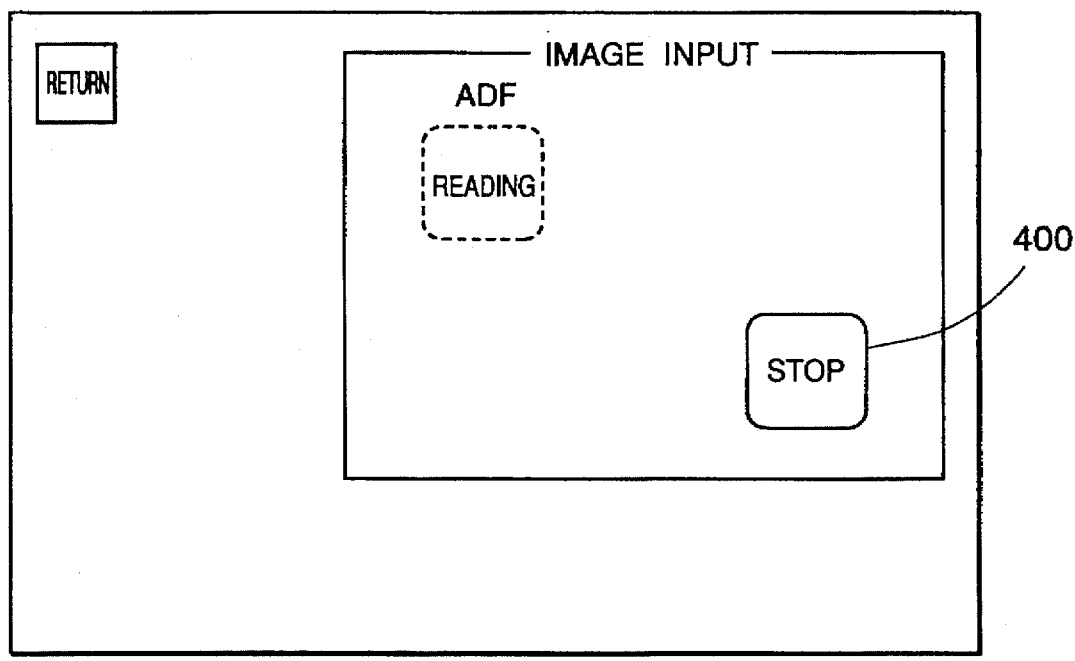
FIG. 44 is a display view during reading.

A menu of FIG. 44 indicating that the image is being read is displayed after an original is set on the ADF (F81), and reading of the image is executed (F82). When the reading of the image has to be interrupted, the operator selects the icon 400 on the menu of FIG. 44, so that one original sheet which is being read is ejected (F85). After the completion of the reading (F84), a check is conducted as to whether paper exists on the ADF (F86). If paper exists on the ADF, the original flag is turned on (F87).

The process returns (F88) when reading is completed with one sheet of original or when reading is interrupted. Namely, when the image input sub-routine has been over, any paper existing on the ADF is an original and, therefore, the printing paper flag is in off state.

<Copying operation>

Figure 45:
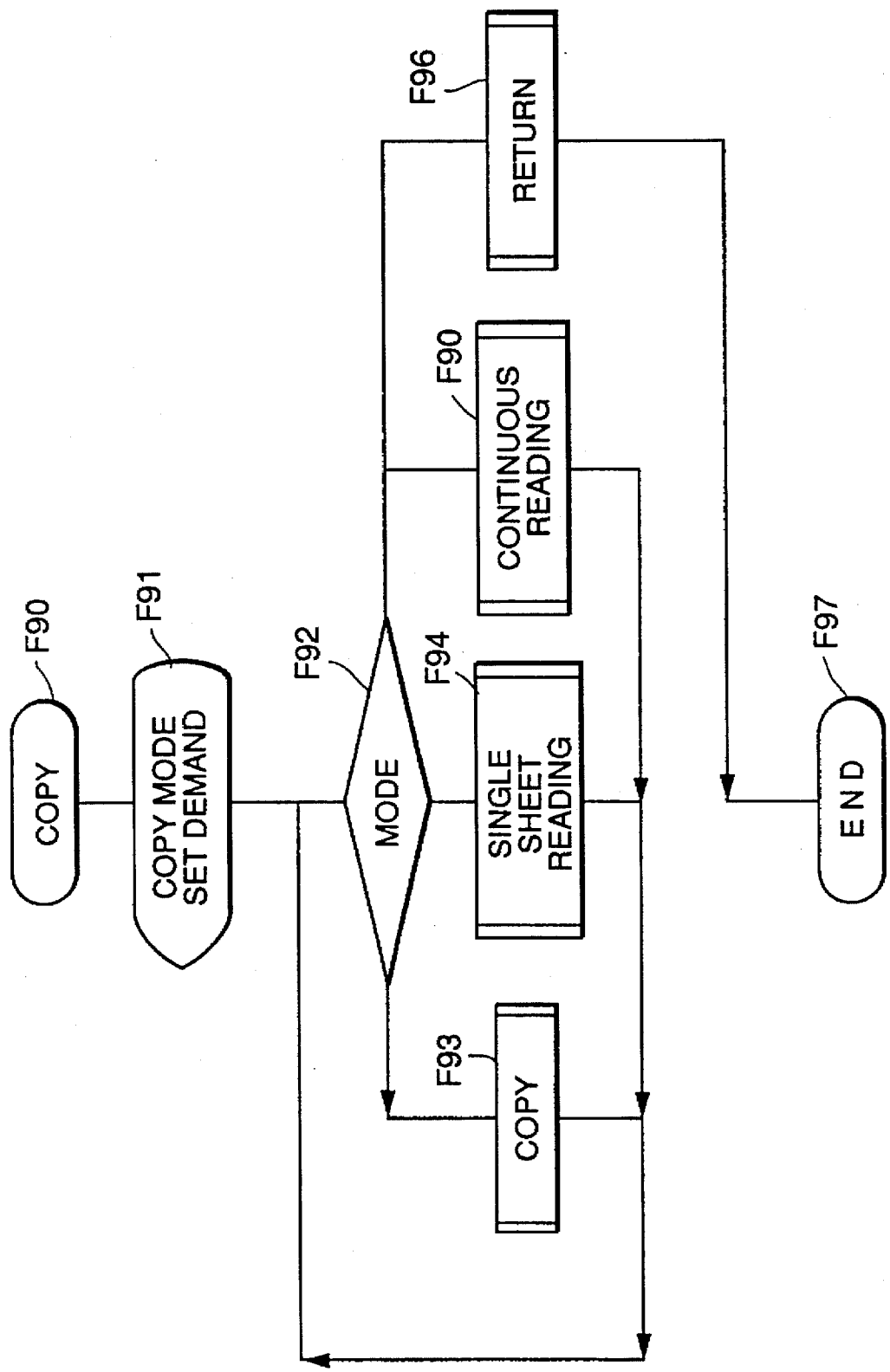
FIG. 45 is a flowchart of copying executed by an application.
Figure 46:
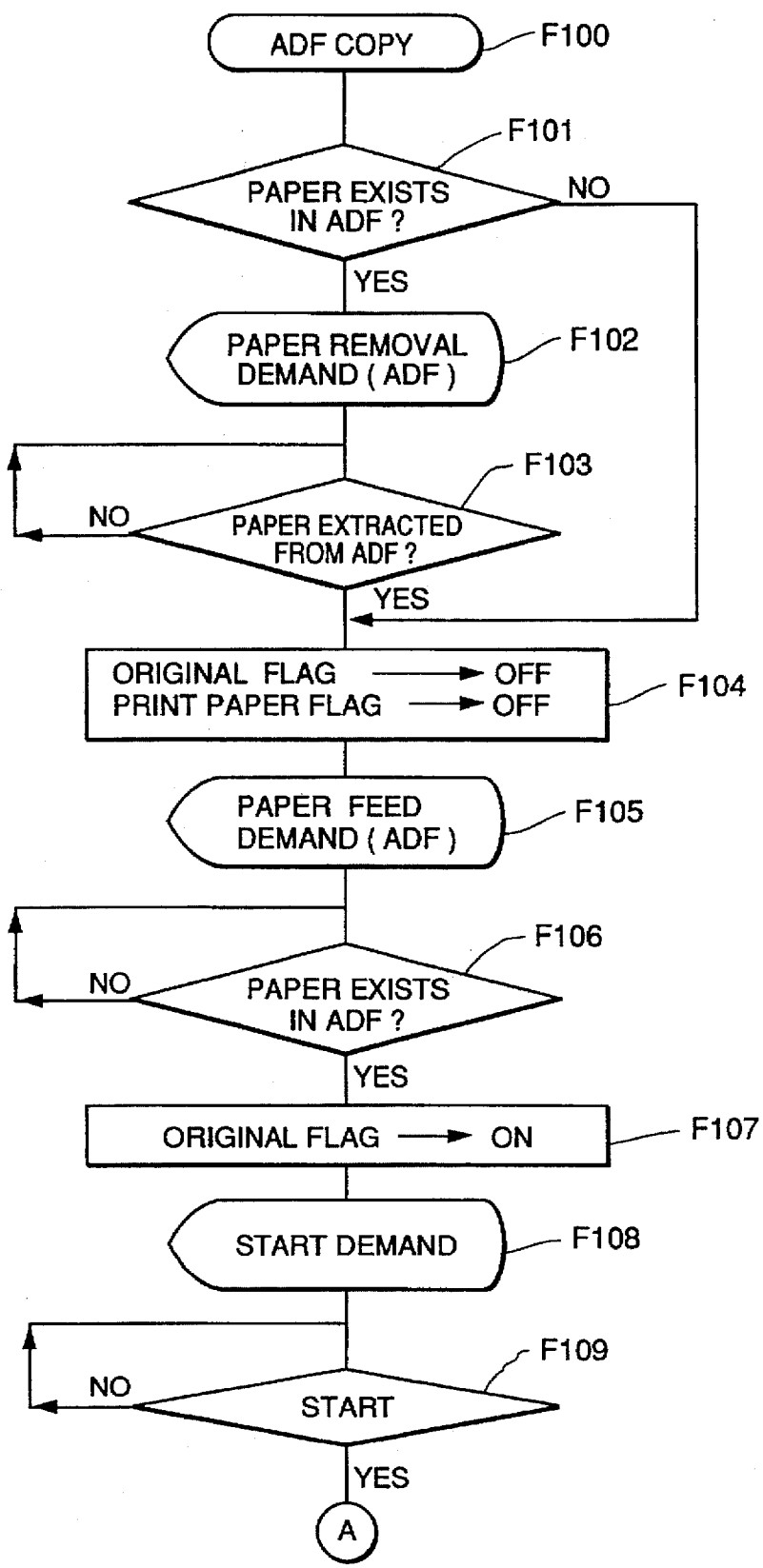
FIG. 46 is a flowchart of ADF-mode copy.
Figure 47:
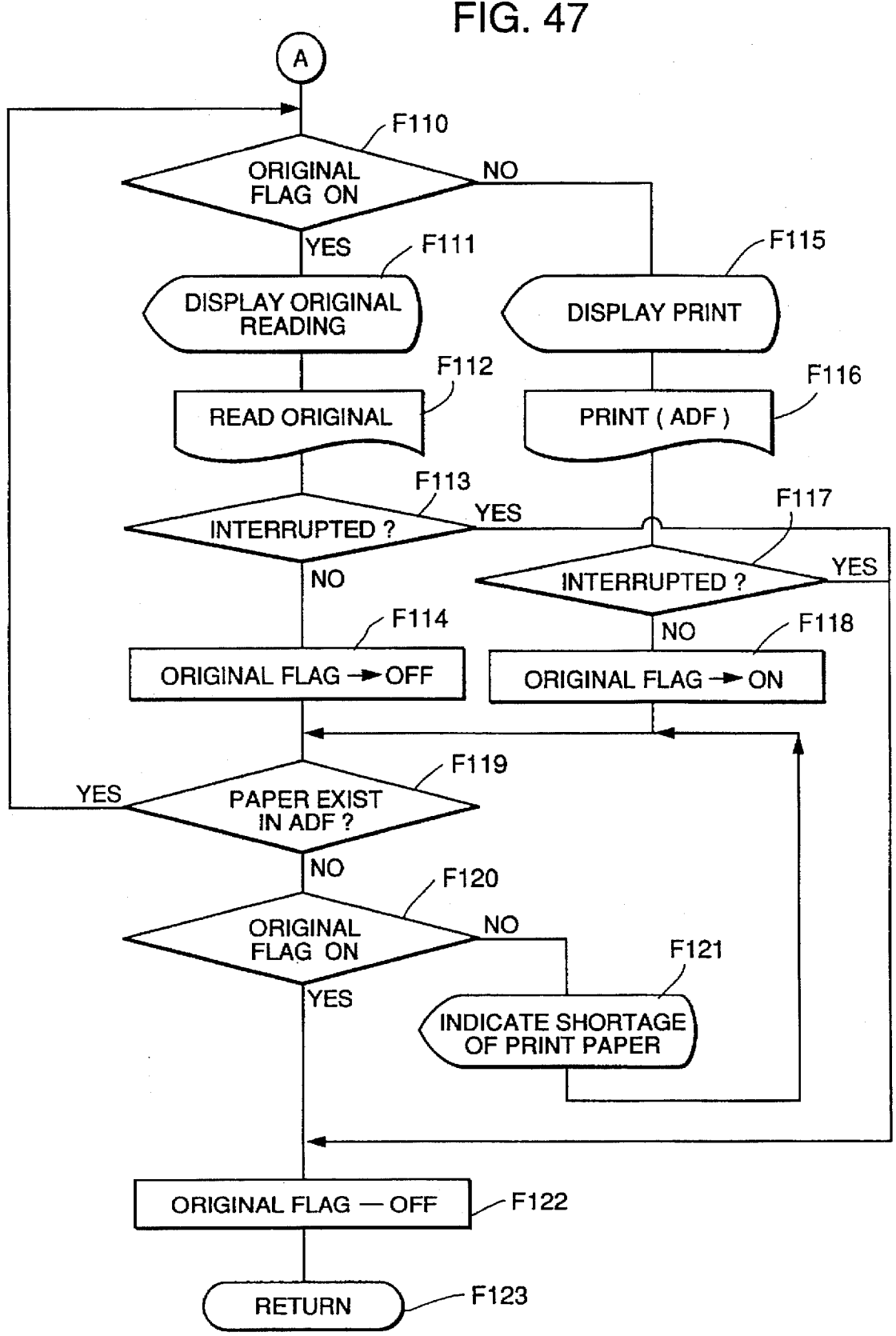
FIG. 47 is a continuation of the flowchart shown in FIG. 46.

Copying mode is selected from the applications shown in FIG. 20. The copying operation will be described hereinafter with reference to a flowchart shown in FIG. 45.

Figure 50:
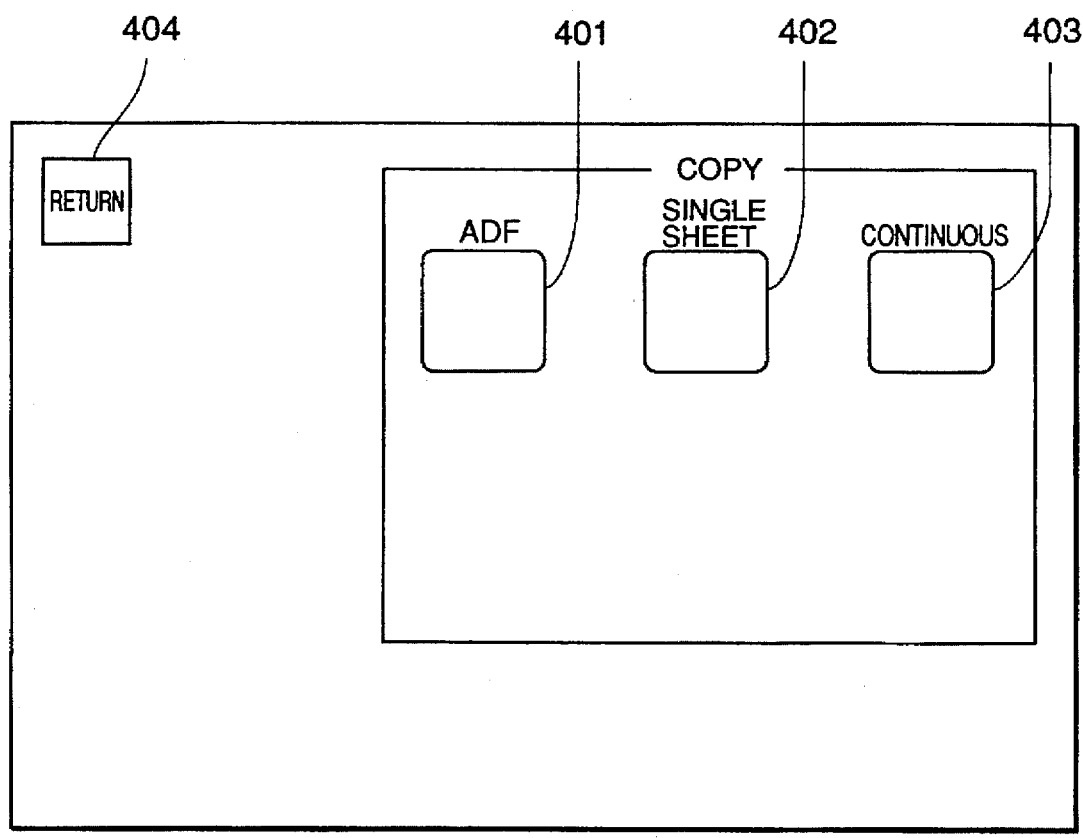
FIG. 50 is a display view for selecting a copy mode.

When copying operation is executed (F90), a copy mode selection menu of FIG. 50 is displayed. The menu contains ADF copy mode icon 401, single sheet reading copy mode icon 402 and a continuous reading copy mode icon 403. Each of these icons initiates its own sub-routine which will be mentioned later, and, when the user selects one of these icons, the sub-routine associated with the selected icon is executed. The copy mode is terminated when a resetting icon 404 is selected.

<ADF copy mode>

Figure 51:
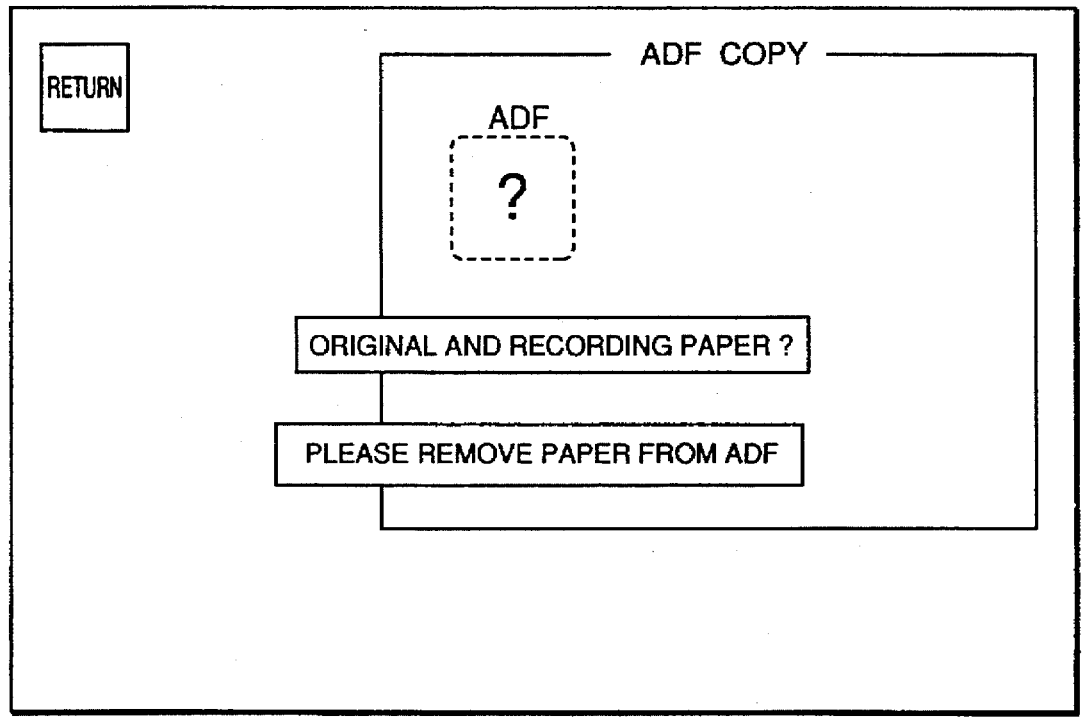
FIG. 51 is a display view for requesting to remove paper from the ADF.

Since the apparatus is of such design that both an original document sheet and a printing paper sheet can be simultaneously set on the ADF, the ADF copy mode is commenced with a check as to whether any paper exists on the ADF (F101). If paper exists, a menu of FIG. 51 is displayed so as to remove the paper from the ADF (F102) and the process waits for the removal of the paper (F103). The original flag and the printing paper flag are both turned off as a result of the removal of the paper (F104).

Figure 52:
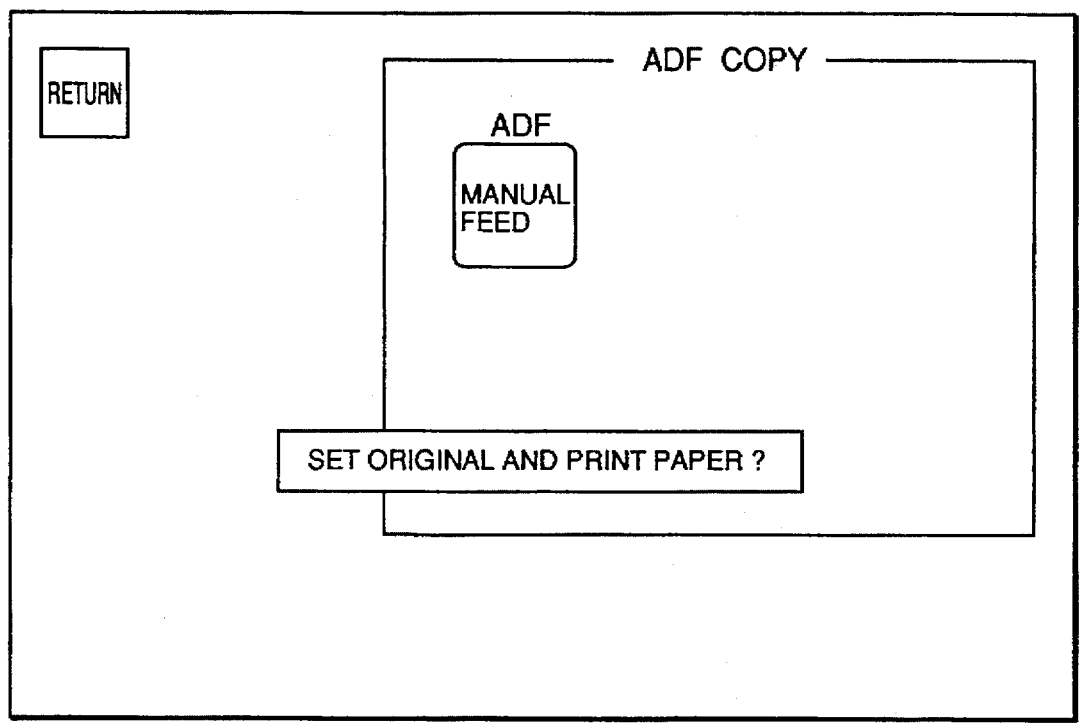
FIG. 52 is a display view for requesting to set print paper.
Figure 53:
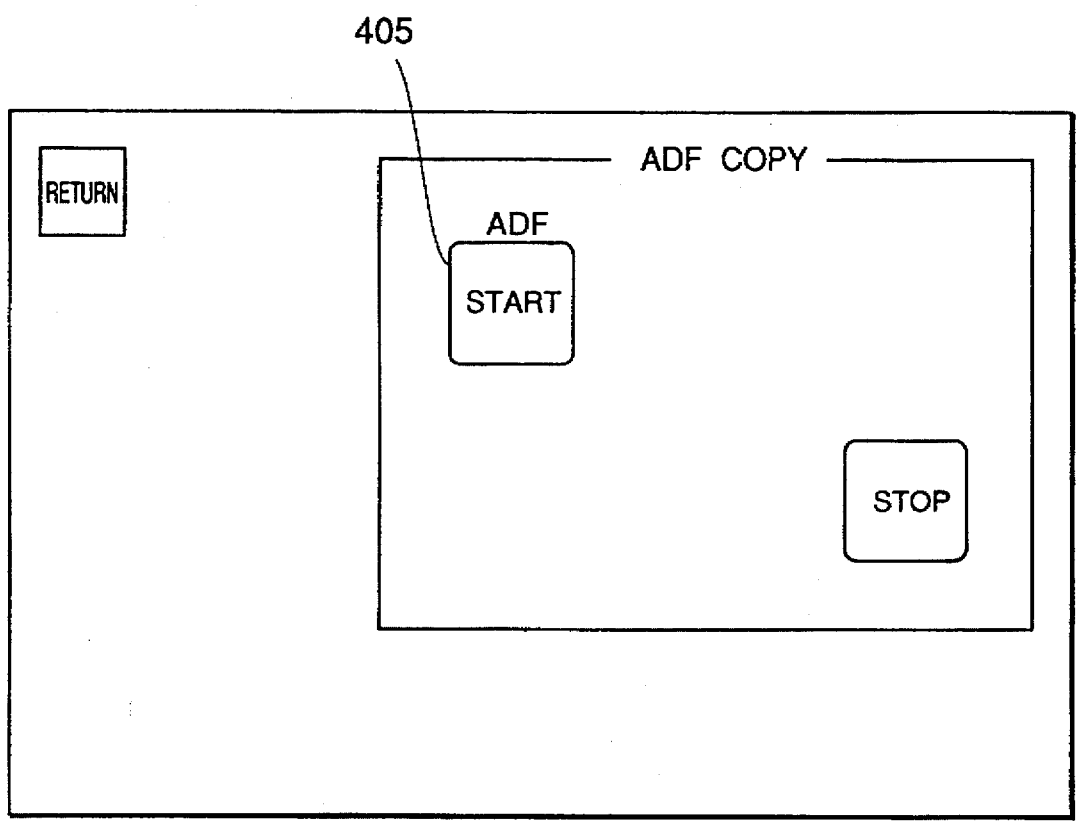
FIG. 53 is a display view for requesting to start printing.

Then, the menu of FIG. 52 is displayed (F105) to request the operator to set both the original sheet and the copy paper sheet or sheets (F106) on the ADF. The setting is done such that the original underlies the printing sheet or sheets. When the paper sheets are set, the original flag is turned on (F107) and the menu of FIG. 53 is displayed to request start of the copying operation (F108).

Figure 54:
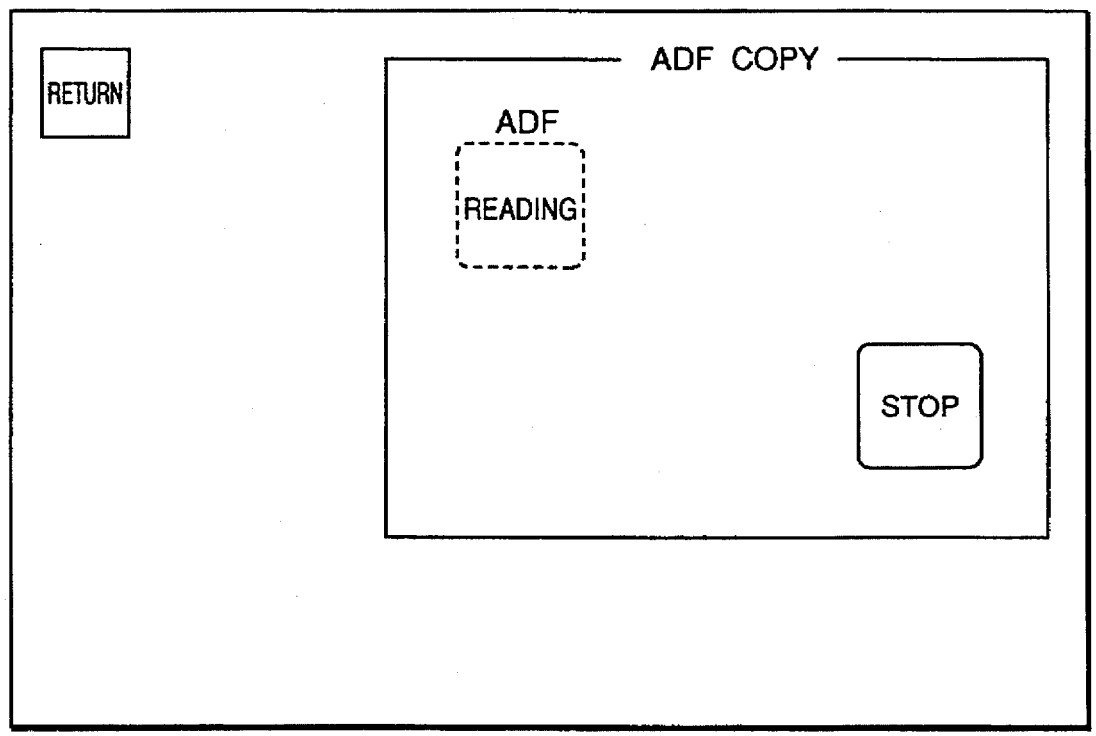
FIG. 54 is a display view during reading of an original.

When the icon 405 for starting the copying operation is selected (F109), a check is conducted as to whether the original flag is in on state (F110). If this flag is on, the paper is judged as being an original document sheet, so that the menu of FIG. 54 is displayed to indicate that the original is being read (F111), while executing the reading of the original (F112). If the reading is interrupted (F113), the original flag is turned off (F122) and the process returns (F123). If the reading is not interrupted, the original flag is turned off (F114) and a check is conducted as to whether paper exists on the ADF (F119). If paper exists on the ADF, the process proceeds to F110.

Figure 55:
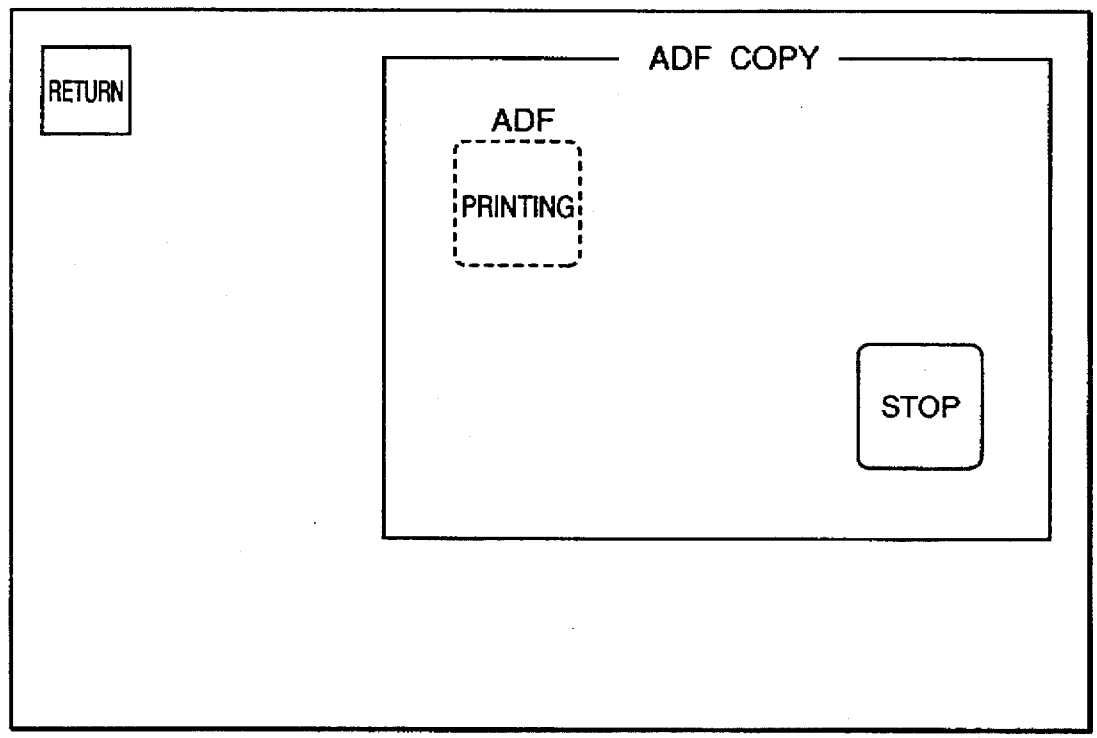
FIG. 55 is a display view during printing.

In F110, since the original flag has been turned off, the menu of FIG. 55 indicating that printing is being executed is displayed (F115), and the printing paper is fed from the ADF for printing thereon (F116). When printing is interrupted (F117), the process skips back to F112 to turn the original flag off. The process then returns (F123). If the printing is not interrupted, the original flag is turned on and the process proceeds to F119. The above-described sequence is repeated until all the paper sheets on the ADF are consumed.

Figure 56:
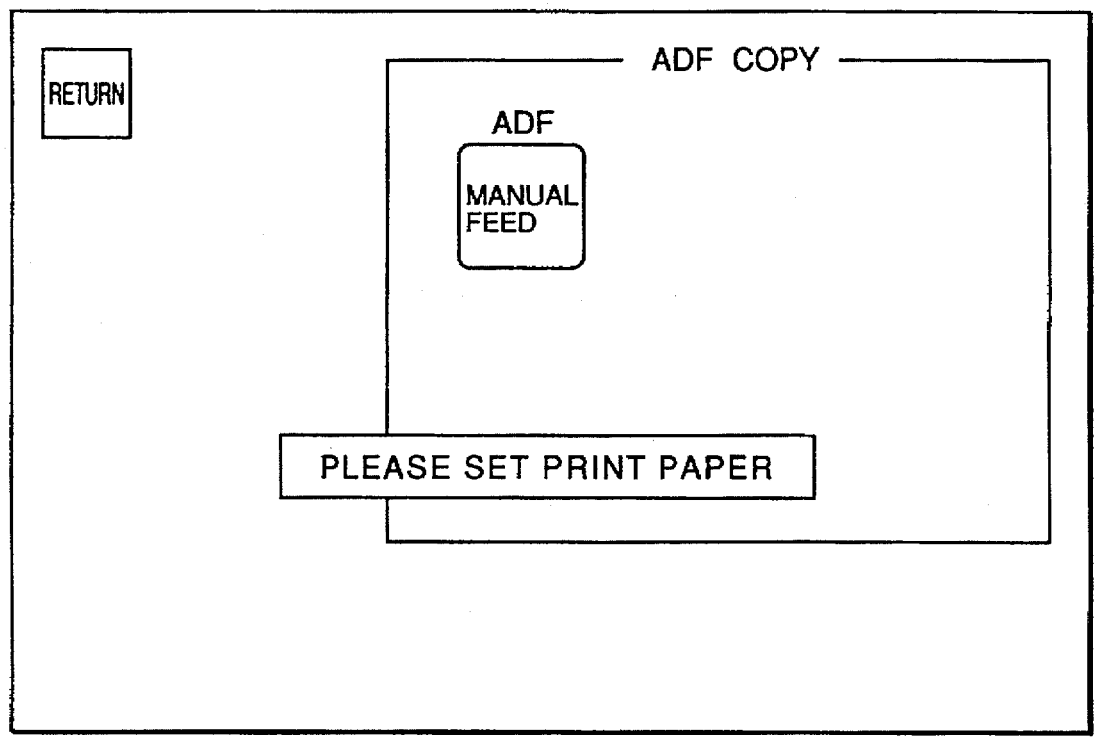
FIG. 56 is a display view during the ADF-mode copy (manual feeding).
Figure 57:
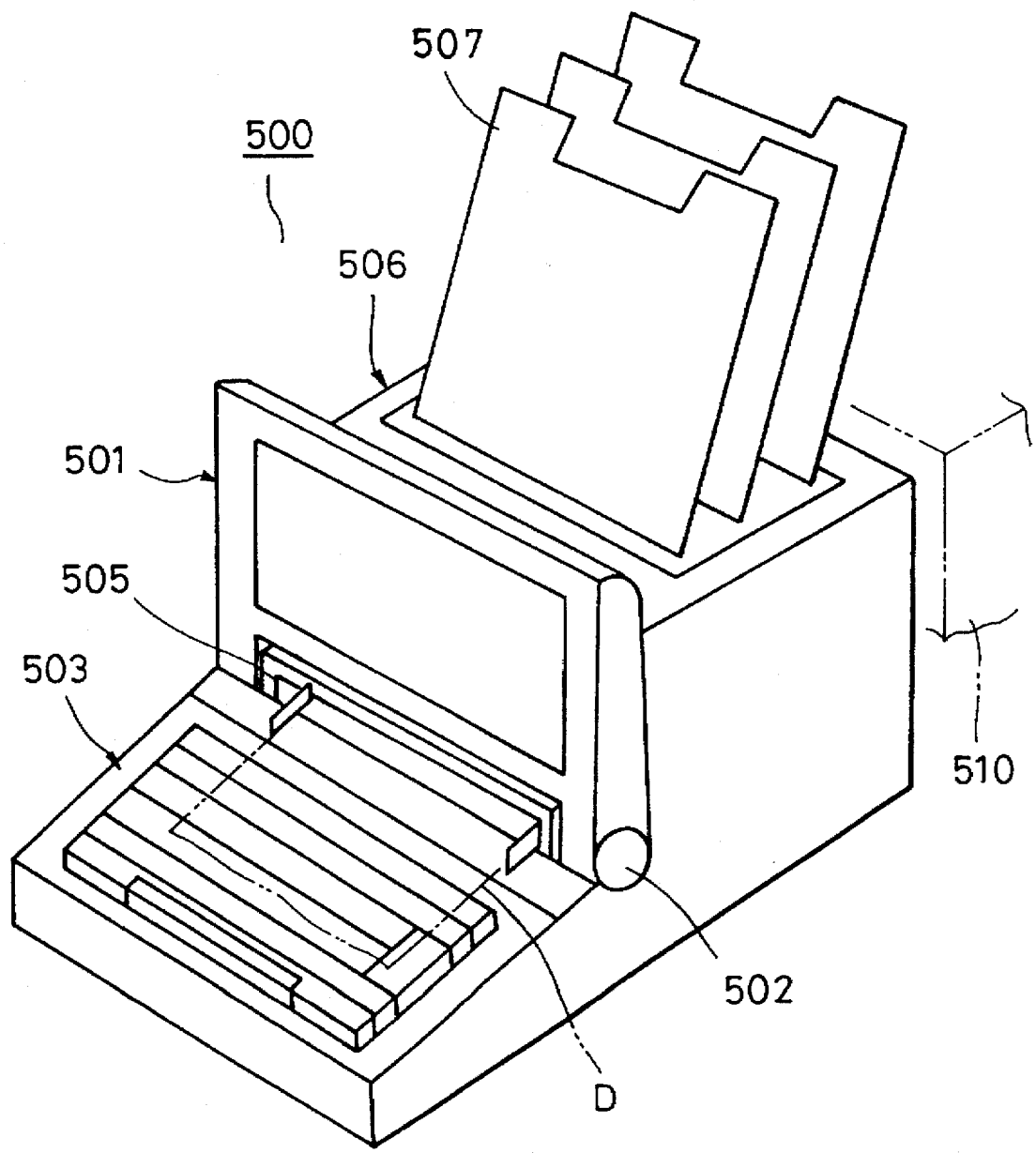
FIG. 57 is a perspective view of a known reader apparatus.

When all the paper sheets on the ADF have been consumed, a check is conducted as to whether the original flag has been turned on (F120). If the flag has been off, the menu of FIG. 56 is displayed (F121), and the process skips to F119. Conversely, if the original flag has been on, it is judged that the read original image has been printed, so that the original flag is turned off (F122). The process then returns (F123). Thus, when the ADF copying operation is finished, the printing paper flag is off if paper still remains on the ADF due to interruption.

<Single sheet reading copy mode>

Figure 48:
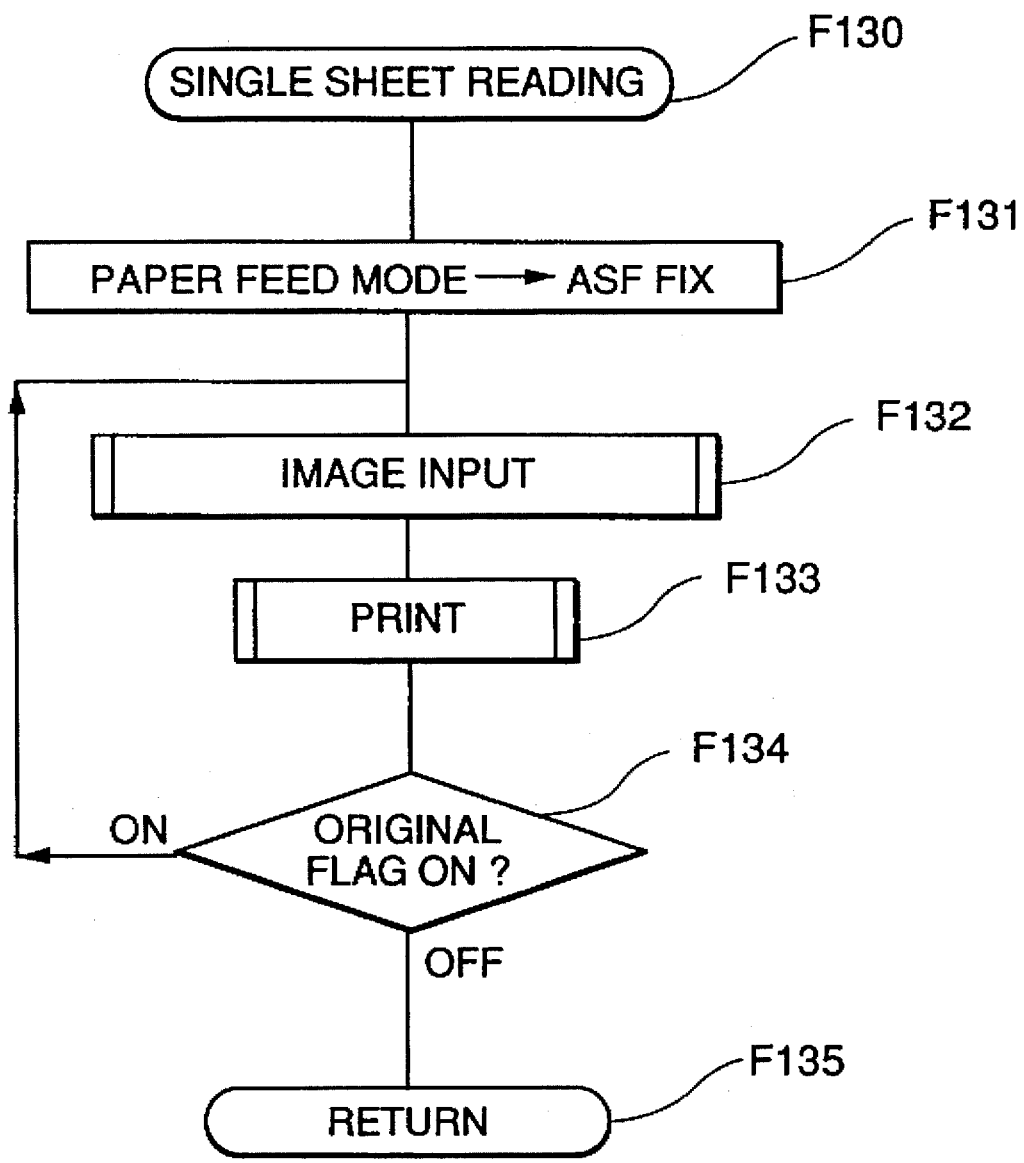
FIG. 48 is a flowchart of single sheet reading-mode copy.

In the single sheet reading copy mode, one sheet of printing paper is fed from the ASF when one original sheet from the ADF is read and printing is conducted on this single printing paper sheet, thus saving the capacity of the memory. This mode of operation will be described with reference to flowchart of FIG. 48.

When the single sheet reading copy mode is selected, the paper feed mode is set to fix the paper source to the ASF (F131), and the aforementioned image input sub-routine is executed (F132). Then, the read image is printed in accordance with the printing sub-routine explained before (F133). Then, a check is done as to whether there still remains any original document sheet to be read (F134). If there still remains an original document sheet to be read next, the process skips to F132 to read this original. Otherwise, the process returns (F135).

<Continuous reading copy mode>

On this copy mode, printing is conducted after all the original document sheets on the ADF are read. The printing paper sheets may be fed either from the ADF or from the ASF.

Figure 49:
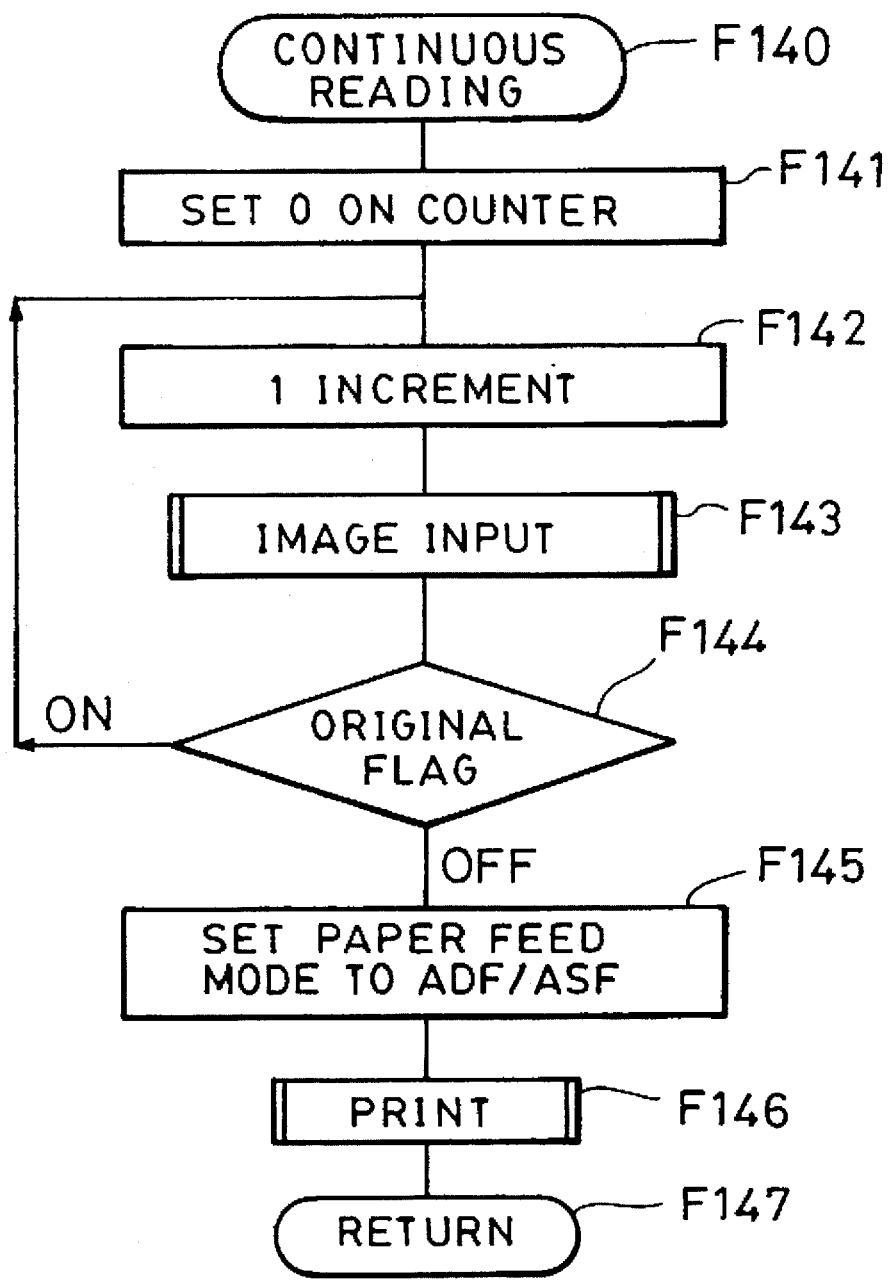
FIG. 49 is a flowchart of continuous reading-mode copy.

This copy mode will be described with reference to the flow chart shown in FIG. 49.

As the first step, an operation is conducted to clear the contents of a counter which counts the number of the original document sheets (F141). Then, for the purpose of entry of the image data, the aforementioned image input sub-routine is executed (F143) after incrementing the counter by one (F142). Then, a check is done as to whether all the original document sheets have been fed to the apparatus for reading of image (F144). If there still remains any original document sheet to be read, the process returns to F142 to repeat the described operation.

When all the original document sheets have been fed and read, the paper feed mode is set to the mode which accepts both the paper from the ADF and the paper from the ASF (F145), followed by execution of the printing sub-routine explained before (F146). The process then returns after completion of the printing (F147).

Thus, only the printing paper flag is set high when paper remains on the ADF in the printing sub-routine, whereas, when paper remains on the ADF in the ADF copy sub-routine, both the printing paper flag and the original flag are cleared. When paper remains on the ADF in the image input sub-routine, only the original flag is set high.

As will be understood from the foregoing description, according to the present invention, a path of sheet conveyance is formed to have a pair of sheet inlets which merge at a intermediate portion of the path and a single common paper eject portion connected to the merging portion. In addition, reading/recording means are composed of a printer section disposed along the path of sheet conveyance at the downstream side of the merging point and a reading section for reading original image information provided upstream of the merging point. The following advantages are brought about when the reading/recording means having the features set forth above are incorporated in an apparatus such as a computer or a wordprocessor.

(1) A compact reading/recording apparatus can be realized.

(2) The apparatus can have a neat design with reduced number of trays.

(3) The sheet inlet which is usable both for inserting originals to be read and printing paper sheets can be used as a manual feed tray when the apparatus is used for printing. It is therefore possible to easily conduct change of the size of the printing paper on which the read image is to be printed.

Furthermore, since the determination as to whether the sheet set on the feeder is an original document sheet or a copying paper sheet is conducted by the application software, warning is given to the user to prevent the user from conducting erroneous operation. For instance, there is a risk that the user erroneously operates the apparatus to conduct printing when an original document sheet is set on the feeder. In such a case, printing may be wrongly effected on the original document sheet. Such a risk, however, can be avoided in the present invention because the warning is given on the basis of the correct discrimination between the original document sheet and the recording paper sheet.

In the embodiment previously described, an ink jet printer of the type shown in FIG. 6 is used as the printing section 30 shown in FIG. 4. Obviously, however, a laser beam printer as shown in FIG. 58 can be used as the printer section 30.

Figure 58:
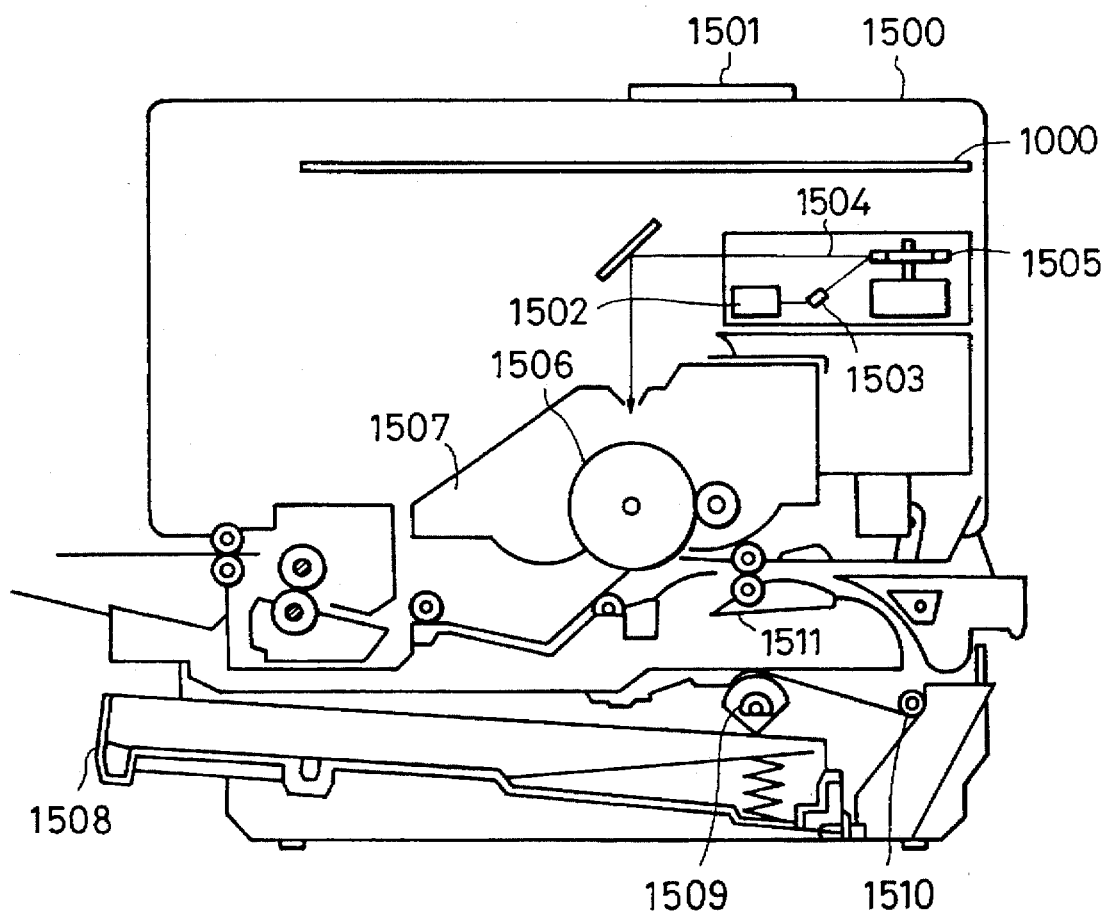
FIG. 58 is a sectional view of a printer which can be employed as the printer section 30 shown in FIG. 4.

More specifically, FIG. 58 is a sectional view of a printer, e.g., a laser beam printer, which can be used as the printer section 30 shown in FIG. 4.

Referring to this Figure, a laser beam printer main part 1500 stores printing information and other information supplied from an external host computer, and forms a bit map image in accordance with such information so as to print an image on a recording paper which is used as the recording medium. An operation panel 1501 carries switches for various operations, as well as indicators or displays such as of LED type. A printer control unit 1000 performs overall control of the whole laser beam printer, as well as analysis of various kinds of information such as printing information from the host computer. The printer control unit 1000 converts the printing information into video signals of a bit pattern corresponding to the printing information, and delivers the video signals to a laser driver 1502. The laser driver 1502 is a circuit for driving the semiconductor laser 1503 so as to turn on and off the laser beam emitted from a semiconductor laser 1503 in accordance with the received video signals. The laser beam 1504 is deflected to the left and right by a rotary polygon mirror 1505 so as to scan the surface of an electrostatic drum 1506, whereby electrostatic latent images of character patterns are formed on the electrostatic drum 1506. The electrostatic latent image is developed into visible image by a developing unit 1507 arranged around the electrostatic drum 1506, and the thus developed image is transferred to a recording paper sheet. Cut sheets are used as the recording paper sheets. The cut sheets are set in a paper feed cassette which is mounted on the laser beam printer 1500, and is fed into the apparatus by means of a feed roller 1509 and conveyor rollers 1510 and 1511 so as to be supplied onto the electrostatic drum 1506.

Obviously, the laser beam printer and the ink jet printer are only illustrative and the invention can employ other types of printers.

(Embodiment 2)

Figure 59:
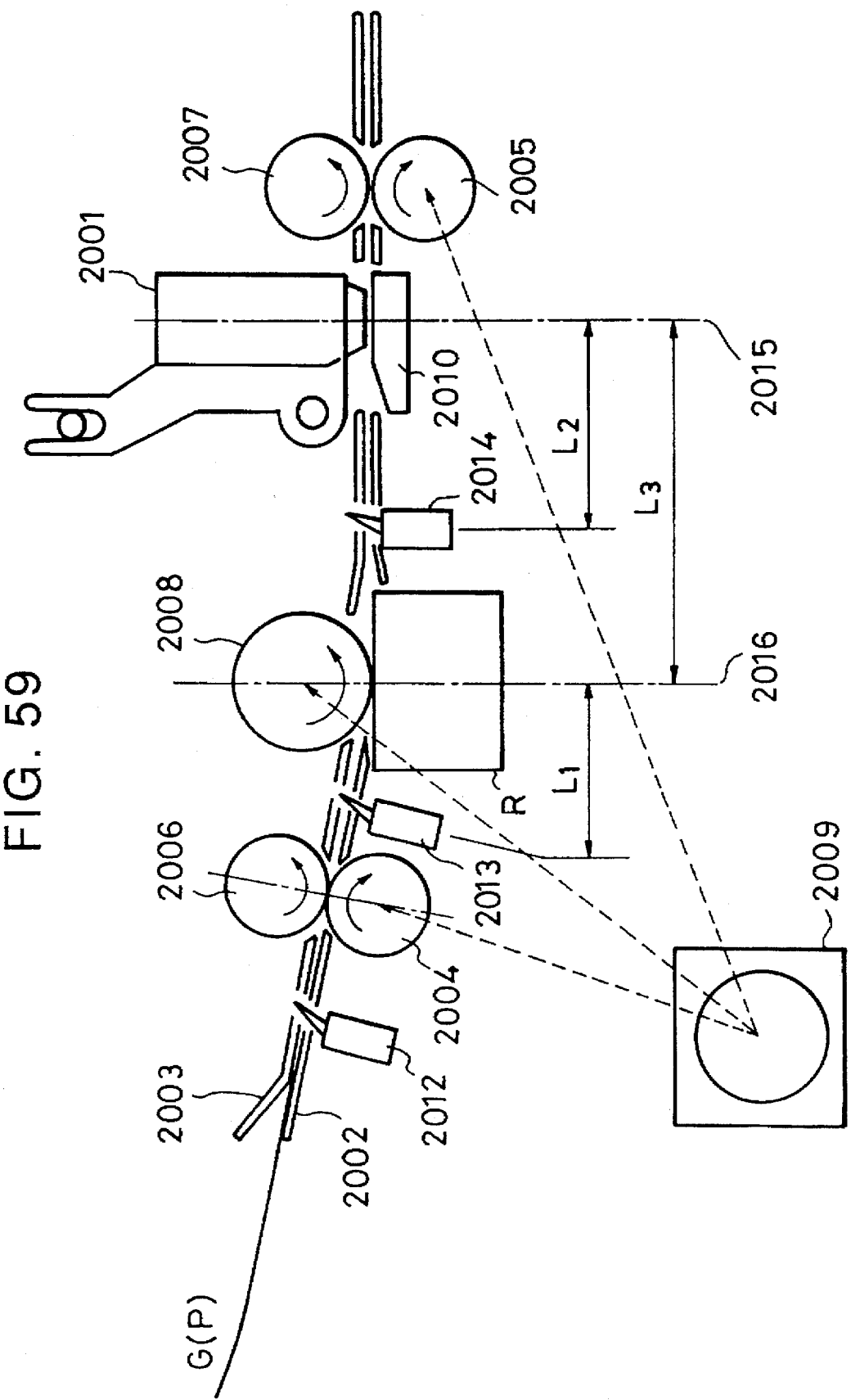
FIG. 59 is a schematic sectional view of the original reader section and image output section of an image forming apparatus according to Embodiment 2 of the present invention

FIG. 59 is a sectional view schematically showing the construction of an image reading section and an image output section of a second embodiment of the image forming apparatus of the present invention. This image forming apparatus is suitable for use in combination with, for example, a personal computer.

Referring to FIG. 59, a reading sensor R has a construction and function which are the same as those explained in connection with the known art. An ink jet printer section 2001 is disposed in the direction of conveyance of the original sheet G or a recording paper P and has a width corresponding to the width of printing to be done on the recording paper. Numerals 2002 and 2003 denote, respectively, lower and upper guide plates disposed adjacent to the entrances for the original sheet G or the recording paper sheet P so as to guide these paper sheets. An original detecting sensor 2012 is disposed adjacent to the upper and lower guide plates 2003 and 2002 so as to detect the original sheet G. A register sensor 2013 is dispose in the vicinity of the reading sensor R so as to sense the leading end of the recording paper sheet P. A register sensor 2014 is disposed in the vicinity of the ink jet printer section 2001 so as to detect the leading end of the original sheet G or the recording paper sheet P. Drive rollers for conveying the original sheet G or the recording paper sheet P are denoted by 2004, 2005 and 2008. Numerals 2006 and 2007 denote idle rollers opposing to the drive rollers 2004 and 2005, respectively. The drive roller 2008 functions also as a platen roller. A stepping motor 2009 drives the drive rollers 2004,2005 and the platen roller 2008 through a reduction means such as a gear train (not shown). Numeral 2010 denotes a platen disposed to oppose the ink jet printer section 2001.

The position where recording is performed by the ink jet printer section 2001 and the position where the reading is performed by the reading sensor R are denoted by numerals 2015 and 2016, respectively. The register sensor 2013 is spaced from the reading position by a distance L1, while the register sensor 2014 is spaced by a distance L2 from the recording position 2015. Symbol $L_3$ represents the distance between the reading position 2016 and the recording position 2015.

It is assumed that the resolution of recording performed by the ink jet printer section and the resolution of reading performed by the reading sensor R are respectively 200 dpi (dots per inch). Thus, the paper feed system is so designed that the original sheet G or the recording paper sheet P is fed by a distance corresponding to one line of data, i.e., 25.4/200=0.127 mm, per one driving pulse supplied to the driving motor 2009.

A detailed description will now be given of the construction of the above-mentioned ink jet printer section 2001, with specific reference to FIG. 60 which is a perspective view of an ink jet cartridge incorporated in the printer section 2001 and also to FIG. 61 which shows the construction of the ink jet printer section 2001.

Figure 60:
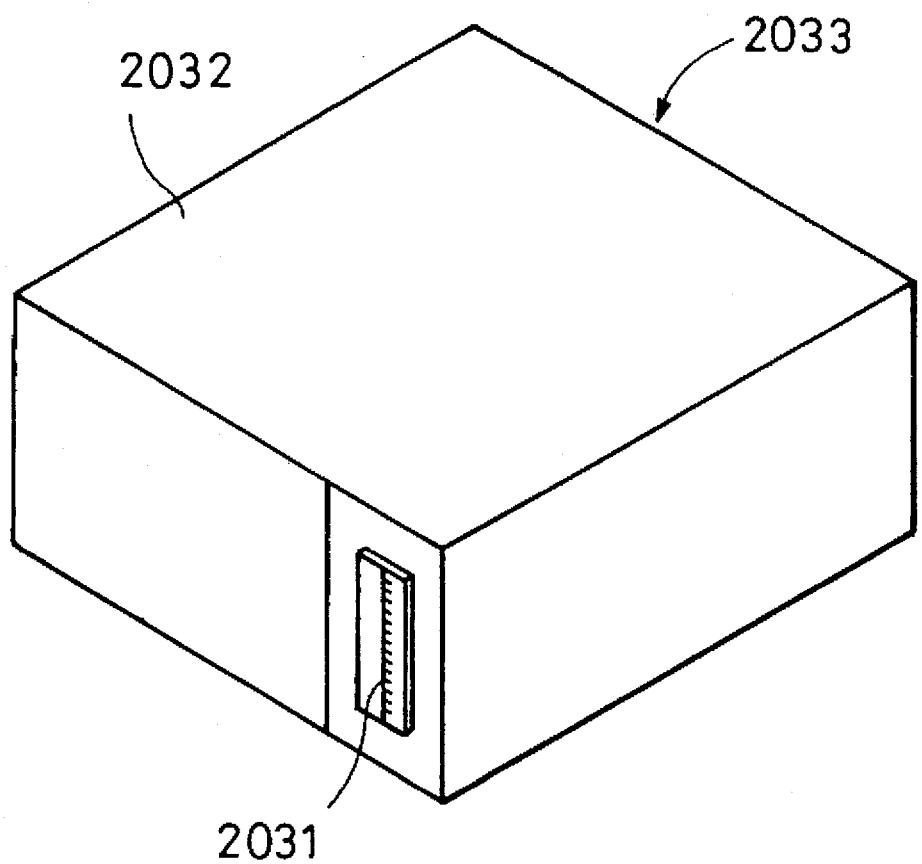
FIG. 60 is an exterior perspective view of the ink-jet cartridge of the ink-jet printer section of the image forming apparatus shown in FIG. 59.

Referring to FIG. 60, the ink jet cartridge 2033 incorporates an ink jet recording head 2031 of the type which forms a flying ink droplet by making use of thermal energy. The recording head 2031 is formed as a unit with an ink tank 2032 from which the ink is supplied. The whole ink jet cartridge is detachably mounted on the printer section 2001.

As will be seen from FIG. 60, the ink jet cartridge 2033 of this embodiment has such a configuration that the end of the ink jet head slightly projects ahead of the front face of the ink tank. The ink jet cartridge is fixed to a carriage 2041 (see FIG. 61) mounted on the ink jet printer section 2001. In this embodiment, the ink jet cartridge 2033 is of disposable type and is detachably secured to the carriage. The ink tank 2032 storing ink to be supplied to the ink jet head is composed of an ink absorption member, a container for accommodating the ink absorption member and a lid for sealing the container, all these components being not shown. The ink filling the ink tank is supplied to the ink jet head 2013 in accordance with the consumption of the ink from the ink jet head 2031.

The ink jet cartridge having the described construction is detachably mounted by a predetermined method on the carriage of the ink jet printer section 2001 which will be described later, and records the desired image on a recording medium based on input recording signals, in accordance with a relative movement between the carriage and the recording medium.

Figure 61:
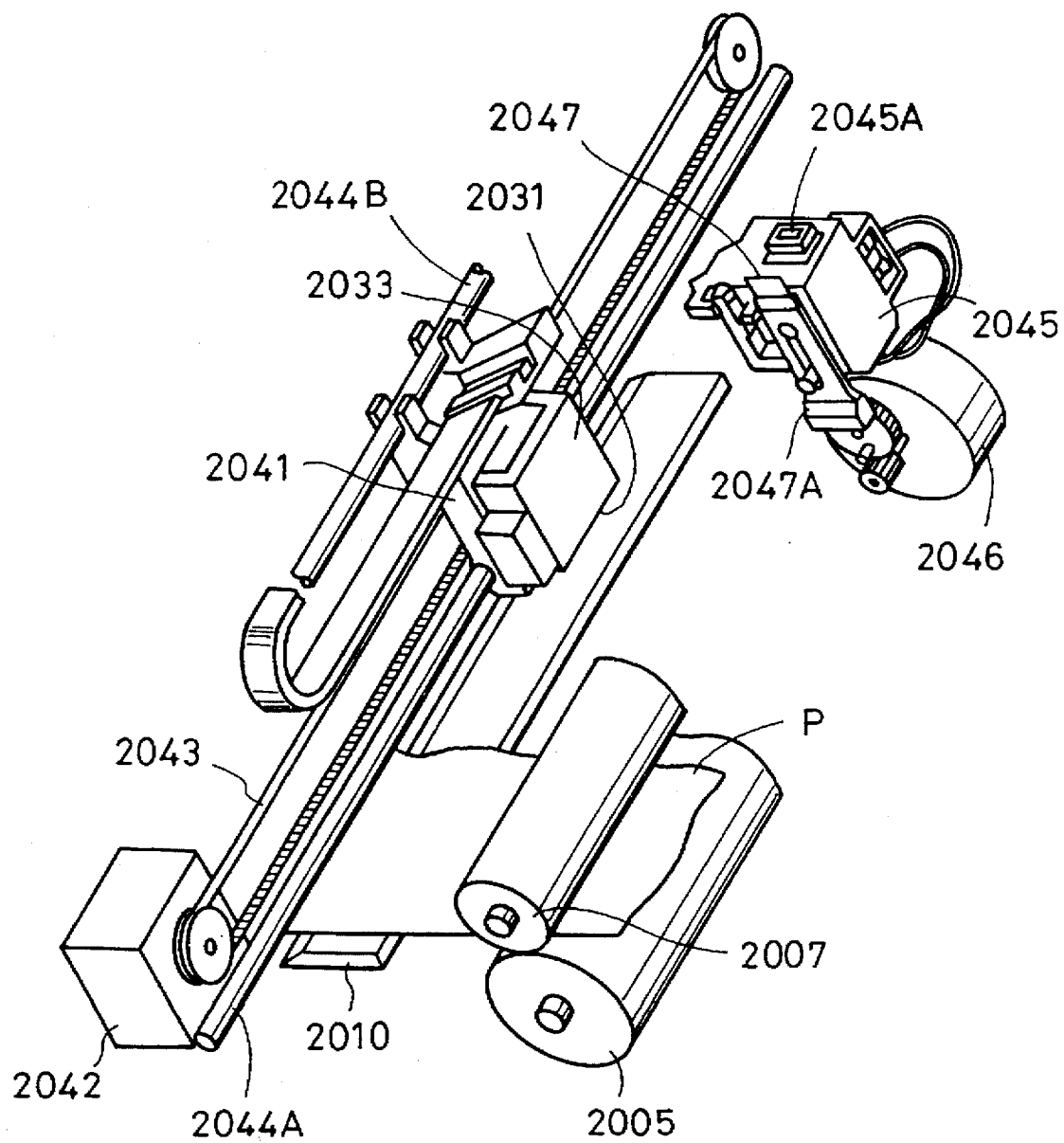
FIG. 61 illustrates the construction of the ink-jet printer section.

FIG. 61 is a perspective view of the ink jet printer section 2001.

The aforementioned carriage, which carries the ink jet cartridge including the ink jet head 2031 and the ink tank 2032 and which is denoted by 2041, is connected to a portion of a drive belt through which the driving force is transmitted to the carriage 2041. The carriage 2041 is slidably supported on a pair of parallel guide shafts 2044A, 2044B so as to reciprocate along these rails over a width covering the entire width of the recording paper sheet P.

A head recovery device 2045 is dispersed at one end of the stroke of the ink jet head, e.g., on the end where it opposes the ink jet head when the latter has been reset to the home position. The head recovery device 2045 is adapted to operate by the power of a motor so as to perform capping and wiping of the ink jet head 2031. The drive roller 2005 and the idler roller 2007 mentioned in connection with FIG. 59 operate to convey the original sheet G or the recording paper sheet P.

The capping operation is to position a cap portion 2045A at a position confronting the portion of the ink jet head 2031 to be capped, e.g., ink discharging nozzles, so as to cover the portion to be capped, thereby preventing the ink on the ink jet head from becoming dry. The recovery device 2045 also includes a suitable means for forcing the ink out of the recording head, e.g., a suction pump for sucking the ink or a pressurizing pump for forcibly discharging the ink. By the operation of such means, the ink remaining in the nozzles and dried to increase the viscosity is expelled from the ink nozzles, thereby recovering safe discharging conditions of the ink jet head 2031. The capping is performed each time the recording is finished, thus protecting the ink jet head 2031.

The wiping operation is performed by a wiping member such as a wiper blade made of, for example, a silicone rubber and disposed on one side of the head recovery device 2045. The blade 2047 is cantilevered by a blade holder 2047A and is driven by a motor 2046 so as to engage the ink discharging surface of the ink jet head 2031. In operation, the blade 2047 is brought into the path of movement of the ink jet head 2031 at a suitable timing during recording or after the recovery operation, so that any dew and dust are wiped off the ink discharge surface of the ink jet head 2031 as a result of the relative movement between the ink jet head 2031 and the blade 2047.

Figure 62:
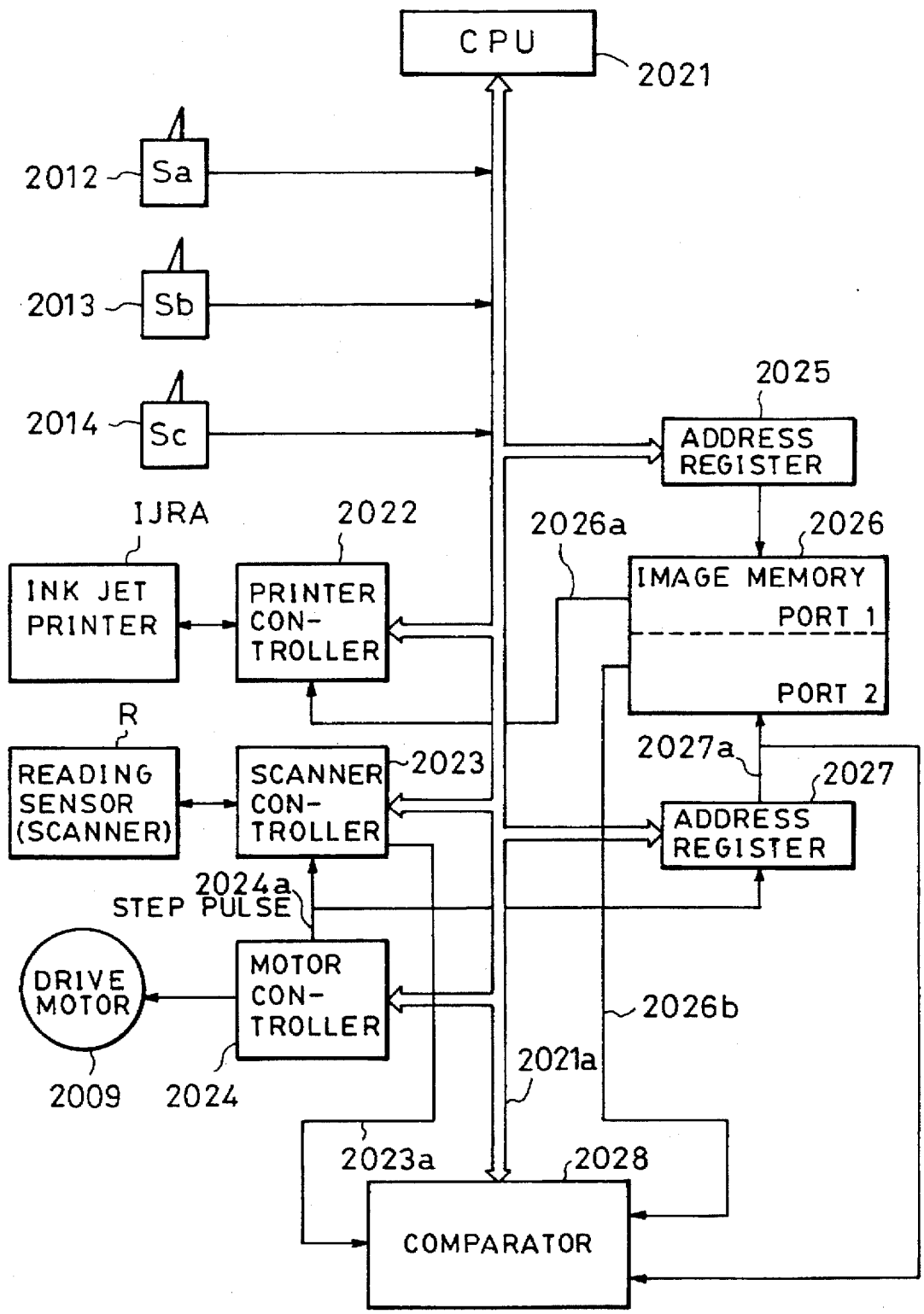
FIG. 62 is a schematic block diagram of the control system of the image forming apparatus of Embodiment 2.

Referring to FIG. 62 which is a block diagram schematically showing the construction of the control system for the image input/output device used in this embodiment, a central processing unit (referred to as "CPU") which performs an overall control of the whole apparatus is denoted by 2021, while a printer controller for controlling the ink jet printer section 2001 is denoted by 2022. Numeral 2023 denotes a scanner controller for controlling the reading sensor R, while a motor controller 2024 controls the operation of the drive motor 2009. An address register 2025 sets the address of a port 1 on an image memory 2024 which is composed of, for example, a dual port RAM. Numeral 2027 denotes an address register which sets the address of a port 2 of the image memory 2026. Numeral 2028 denotes a comparator which will be detailed later.

The operation of the image input/output device used in this embodiment will be described with reference to FIGS. 59 and 62.

When a recording paper sheet P is inserted, the original sensor 2012 is turned on to inform the CPU 2021 that the apparatus is now ready for operation. Then, the CPU 2021 gives print start instructions to various portions. Consequently, the motor controller 2024 determines the driving speed and controls the drive motor 2009 to cause the latter to operate at the determined speed, thereby driving the drive rollers 2004 and 2005 and the platen roller 2008, thus starting the feed of the recording paper sheet P. At the same time, the motor controller 2024 delivers pulses 2024a to the scanner controller 2023 and the address register 2027, at such a rate that one pulse is delivered for one-line feed of the recording paper sheet P in the direction of the sub-scan. At the same time, a print mode is set in the printer controller 2022 and a sequence for initializing the ink jet printer section 2001 is started. Meanwhile, a scan mode is set in the scanner controller 2023, triggering an initialize sequence for the reading sensor R.

The initialize sequence for the ink jet printer 2001 is a processing which includes setting of the ink jet head to the initial position and execution of preparatory discharge from the ink jet nozzle, while the initialize sequence of the reading sensor R is an operation which includes sensitivity correction of the sensor R and shading correction for compensating for any unevenness of brightness of the light source. The scanner controller 2023 controls the reading sensor R in synchronization with the step pulse derived from the motor controller 2024, thereby performing reading of the original. Thus, one-line is read in response to one step pulse 2024a.

When the recording paper sheet P has reached the position of the register sensor 2013, the motor controller 2024 counts the number of the step pulses. The feed of the recording paper P is continued until the counted pulse number P1 equals to the value expressed by the following equation:

$$P1 = (200\ dpi) \times L_1(mm)/(25.4\ mm) = 7.9 L_1 (pulses)$$

Thus, the leading end of the recording paper sheet P reaches the position of the reading sensor R when the recording paper sheet P has been fed by the distance corresponding to P1 pulses. The reading is started when the recording paper sheet P has reached this position. The data read by the reading sensor R is binary-coded by the scanner controller 2023 and is delivered to the comparator 2028 in the form of address values 2023a of the black pixels, i.e., effective pixels. At the same time, the image data 2026b which already has been recorded on the surface of the recording paper sheet P and stored in the image memory 2026 is successively read from the port 2 of the image memory 2026 in accordance with the address sequence set by the CPU 2021 and appointed by the address register 2027 and the thus read image data is input to the comparator 2028. The comparator 2028 then compares the read data 2023a and the image data which has already been formed on the surface of the recording paper sheet P. The position and direction of recording of the data on the reverse side of the recording paper sheet P are then determined on the basis of the result of the comparison, and the thus determined recording position and direction are delivered to the CPU 2021.

In the above-described manner, conveying and reading of the recording sheet P is continued until the recording sheet P is further conveyed by the amount of P2 pulses after the leading edge portion of the recording sheet P has reached the register sensor 2014. The number P2 of step pulses is obtained as follows:

$$P2 = (200\ dpi) \times L_2\ (mm)/25.4\ (mm) = 7.9\ L_2\ (pulses)$$

When the recording sheet P has been conveyed by the amount of P2 pulses, the leading edge portion of the recording sheet P reaches the recording position 2015 of the ink-jet printer section 2001, thus starting to record the image. At this moment, the image data 2026a to be recorded onto the recording sheet P is outputted from the port 1 of the image memory 2026.

The image data 2026a is read out in accordance with address designation performed by the address register 2025 whose addressing is set in accordance with the orientation of the recorded data that the comparator 2028 informed of the CPU 2021. The timing of reading initiation is instructed by the CPU 2021 based on the comparison result outputted by the comparator 2028.

As described above, the data recorded on the recording sheet P is read by the reading sensor R, and the image data read is outputted to the comparator 2028 simultaneously when the image data is outputted from the port 2 of the image memory 2026 to the comparator 2028. In other words, the image data read from the recording sheet P and the image data previously outputted for recording by the ink-jet printer section 2001 are synchronously inputted to the comparator 2028. The comparator 2028 compares the image data read from the recording sheet P with the image data which has been used for recording. The comparator 2028 determines the position and orientation of the data which has been recorded, the comparator 2028 informs the CPU 2021 the determination result obtained from the comparison. If the image data is correct data on the basis of the determination result, the CPU 2021 allows the recording to continue. If the image data is incorrect data, the CPU 2021 stops the recording and displays a message for the user in the display.

Figure 63:
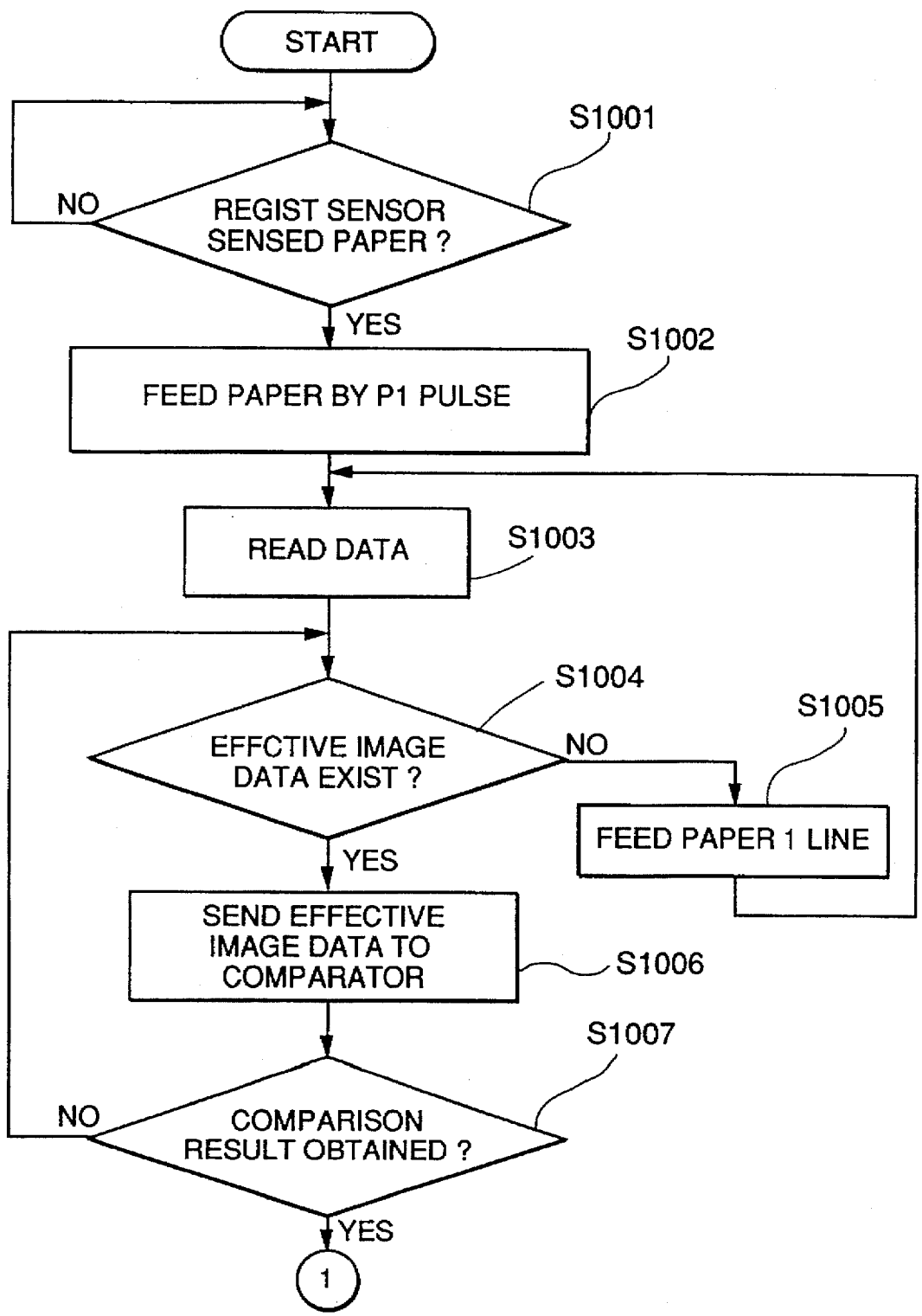
FIG. 63 is a flowchart of the operation of the control system of the image forming apparatus.
Figure 64:
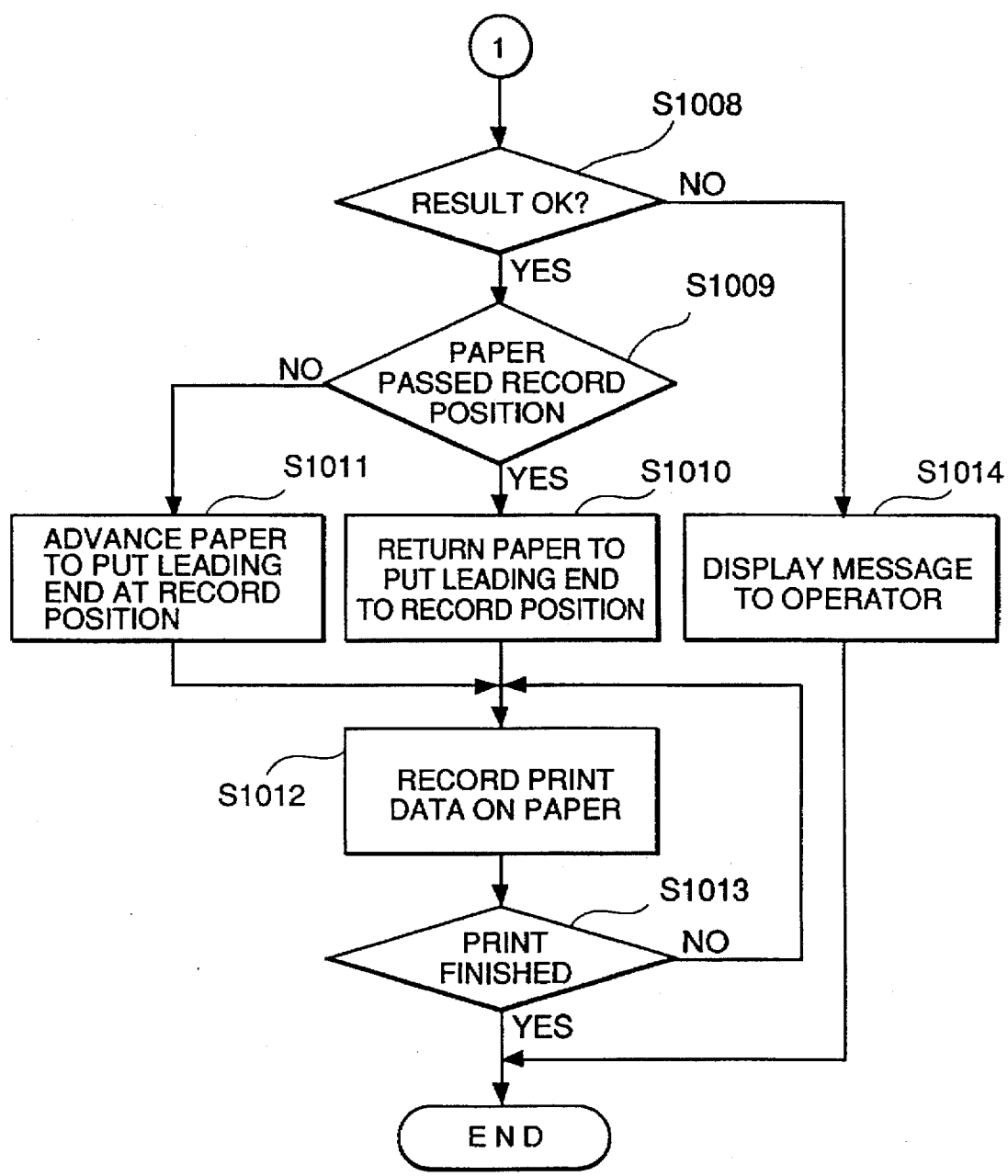
FIG. 64 is a continuation of the flowchart shown in FIG. 63.

FIGS. 63 and 64 show flowcharts of the control operation of the CPU 2021. It is assumed herein that before this operation is started, the image memory 2026 has stored at least one page of image data to be recorded and at least one page of image which has been recorded and, further, that the personal computer connected to the image input-output apparatus stores plural pages of data to be printed in the unit of a page.

Before step S1001, when the register sensor 2012 detects the leading edge of a recording sheet P, the convey roller 2009 rotates to convey the recording sheet P toward the reading sensor R. When the register sensor 2012 detects the recording sheet P in step S1001, operation proceeds to step S1002, where the convey roller 2012 is rotated by the amount of P1 pulses (7.9×$L_1$) to further convey the recording sheet P in the reading direction of the reading sensor R. When the recording sheet P reaches the reading position, operation proceeds to step S1003, where the reading sensor R continues reading the record sheet P until it obtains recorded data, which is checked by the comparator 2028 to find out the position and orientation of the recorded data.

In step S1004, it is determined whether the data read in step S1003 is effective image data. If it is not effective, the record sheet P is conveyed by an amount equal to the height of one line in step S1005, and data is read from the next line (step S1003). If it is determined that the data read is effective in step S1004, the address of the data is sent to the comparator 2028 in step S1006. The comparator 2028 compares the effective data with the comparable image data read out from the image memory 2026 corresponding to the address of the effective data. The procedure from step S1003 to step S1006 is repeated until it is determined in step S1007 that comparison result has been obtained.

If comparison result is obtained in step S1007, operation proceeds to step S1008, where it is determined whether the comparison result is normal. If it is not normal, a message indicating that the comparison result is not normal is displayed for the user (step S1014), and thus the operation finishes. If the comparison result is normal, it is determined in step S1009 whether the leading edge of the recording sheet P has passed the record position 2015. More specifically, it is determined whether the recording sheet P is conveyed by an amount more than P2 pulses after the register sensor 2014 has detected the leading edge of the recording sheet P. If the leading edge of the recording sheet P has passed the record position 2015, the recording sheet P is conveyed back to put the leading edge to the record position 2015 in step S1010. If the leading edge of the recording sheet P has not passed the record position 2015, the recording sheet P is advanced to put the leading edge to the record position 2015 in step S1011. Then, a recording image is recorded on the recording sheet P on the basis of the comparison result in step S1012 until the recording is completed in step S1013.

The comparison operation of the comparator 2028 from step S1002 to step S1007 will be described in detail with reference to FIGS. 65, 66 and 67.

Figure 65:
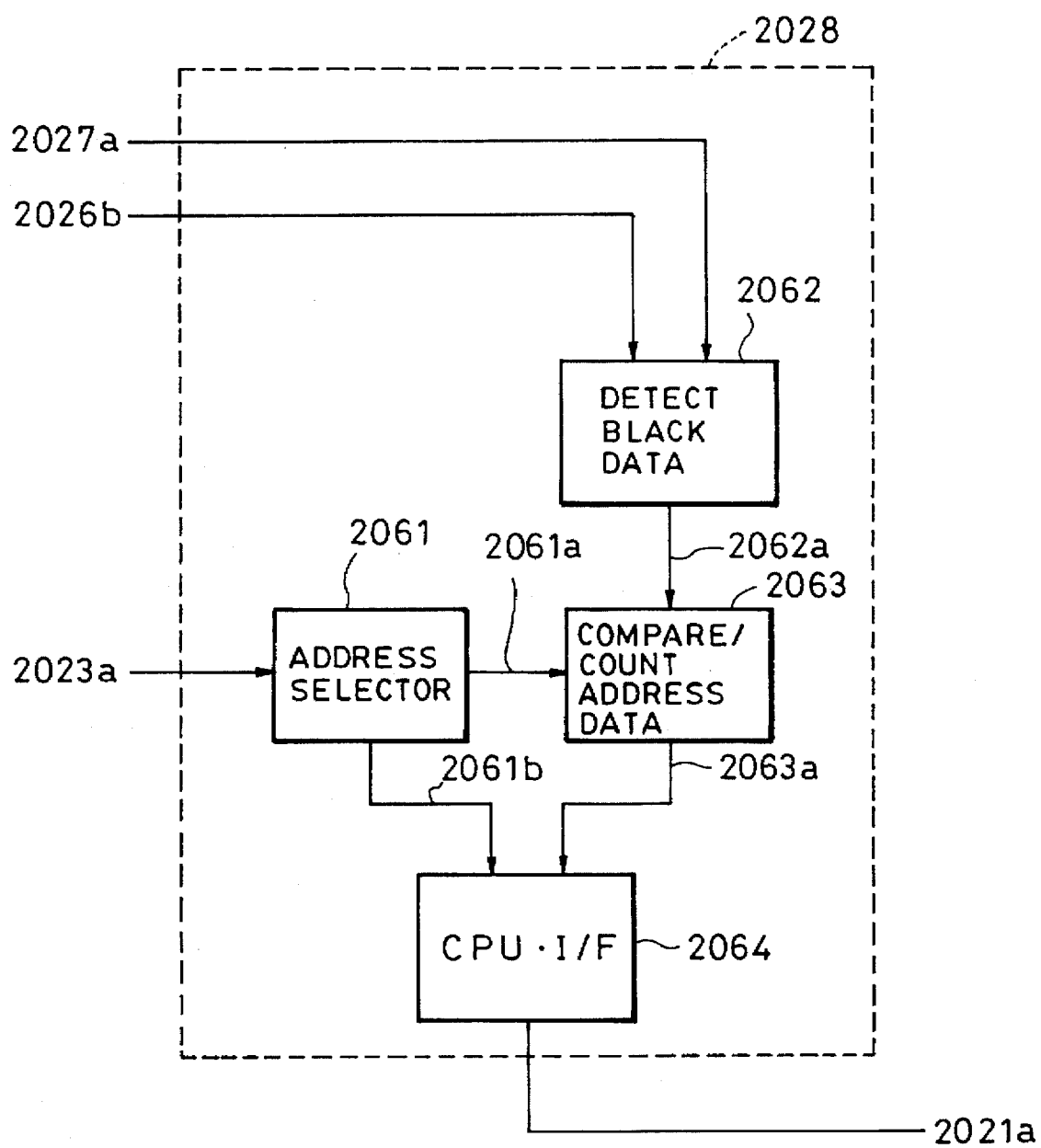
FIG. 65 is a schematic block diagram of the comparator of the apparatus.

FIG. 65 is a schematic block diagram of the construction of the comparator 2028. FIG. 66 is a flowchart of the operation of the comparator 2028.

When the scanner controller 2023 has taken in a line of image data, it checks whether the line of image data contains a black pixel. If a black pixel is contained, the scanner controller generates the address data ($x_i$, $y_j$) of the black pixel and sends it as address data 2023a to the address selector 2061. When the address selector 2061 receives the address data 2023a of the black pixel from the scanner controller 2023, it sends address data 2061a and the reception signal to the CPU interface 2064 (step S1020 to step S1023 in FIG. 66). If a black pixel is not contained in the image signals 2023a, the recording sheet p is conveyed by one line and the next line of data is read (operation returning from step 1022 to step S1020).

The CPU interface 2064 sends a command signal to the CPU 2021 so that the CPU 2021 will read out the recorded image data 2026b from the image memory 2026. In accordance with the signal, the CPU 2021 sets image addresses in the address register 2027 and, thereby, the image memory 2026 outputs the recorded image data from the port 2. The address data 2027a outputted from the address register 2027 in step S1024 are the addresses of 9×9 pixels consisting of the pixel ($x_i$, $y_j$) at its center and the 80 surrounding pixels (the x addresses thereof ranging from i−4 to i+4, the y addresses from j−4 to j+4).

The image data 2026b of 81 pixels outputted from the image memory 2026 in response to these 81 address signals 2027a is inputted to the black data detector circuit 2062. The image data 2026b are the image data which has once been outputted for recording. The black data detector circuit 2062 determines whether the image data of the 81 pixels include a black pixel data and outputs the determination result 2062a to the address data comparator-counter 2063. The address data comparator-counter 2063 determines whether the determination result 2062a is effective or ineffective to the address select signal 2061a which has been inputted from the address selector 2061, and then outputs the determination result 2063a to the CPU interface 2064. The determination result signal 2063a indicates effective when the address select signal 2063a is active and the determination result 2062a indicates detection of black data. The determination result signal 2063a indicates ineffective when the address select signal 2063a is active and the determination result 2062a indicates no detection of black data.

The address select signal 2061a remains active for a time long enough for the black detector circuit 2062 to output a determination result signal 2062a. The address select signal 2061a is made inactive by the address selector 2061. After inactivating the address select signal 2061a, the address selector 2061 selects the next black data address. The CPU interface 2064 receives and monitors effective or ineffective determination result signals 2063a.

If the CPU interface 2064 receives an effective signal 2063a, it starts counting the number of consecutive effective signals (step S1025 and step S1027). If the count value (the number of consecutive effective signals) exceeds a value counted by the address data comparator/counter 2063, the CPU interface 2064 determines that the image being read is identical to the image which has been recorded and is now used as the reference, and informs the CPU 2021 that the image data to be recorded will be recorded on the second side of the recording sheet P (step S1028 and step S1029). If the count value has not exceeded the value counted by the address data comparator/counter 2063, the address select signal 2061a is made inactive, and the next black data address is selected (process returning from step S1028 to step S1022). If the CPU interface 2064 receives an ineffective signal 2063a before the count value exceeds the value counted by the address data comparator/counter 2063, the CPU interface 2064 determines that the image being read is not identical to the image which has been recorded and is now used as the reference, and that the determination result is no good, thus finishing the operation (step S1025 and step S1026).

If the above-described comparator 2028 determines that the comparison result is no good, the image being read may be compared with other image data which has been recorded or image data obtained by vertically inverting (upside down) the image data which has been recorded and is used as the reference. If the image being read is not identical to any of these image data, an error message is displayed for the user. This operation can be performed by a procedure according to a flowchart similar to the flowchart shown in FIGS. 63 and 64 obtained by replacing the steps S1003 to S1007 shown in FIG. 63 with the steps of the flowchart shown in FIG. 67.

Figure 66:
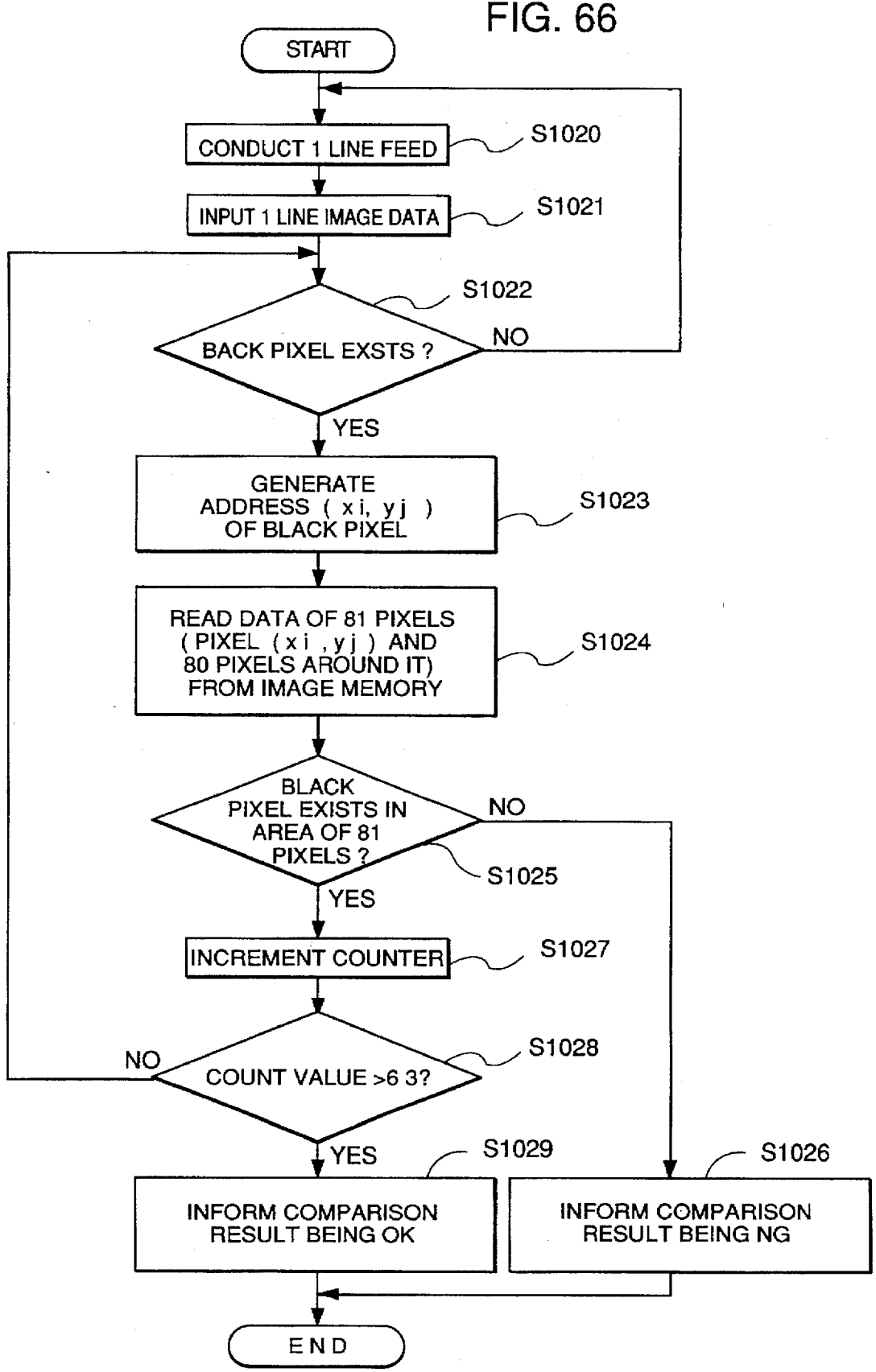
FIG. 66 is a flowchart of the operation of the comparator.
Figure 67:
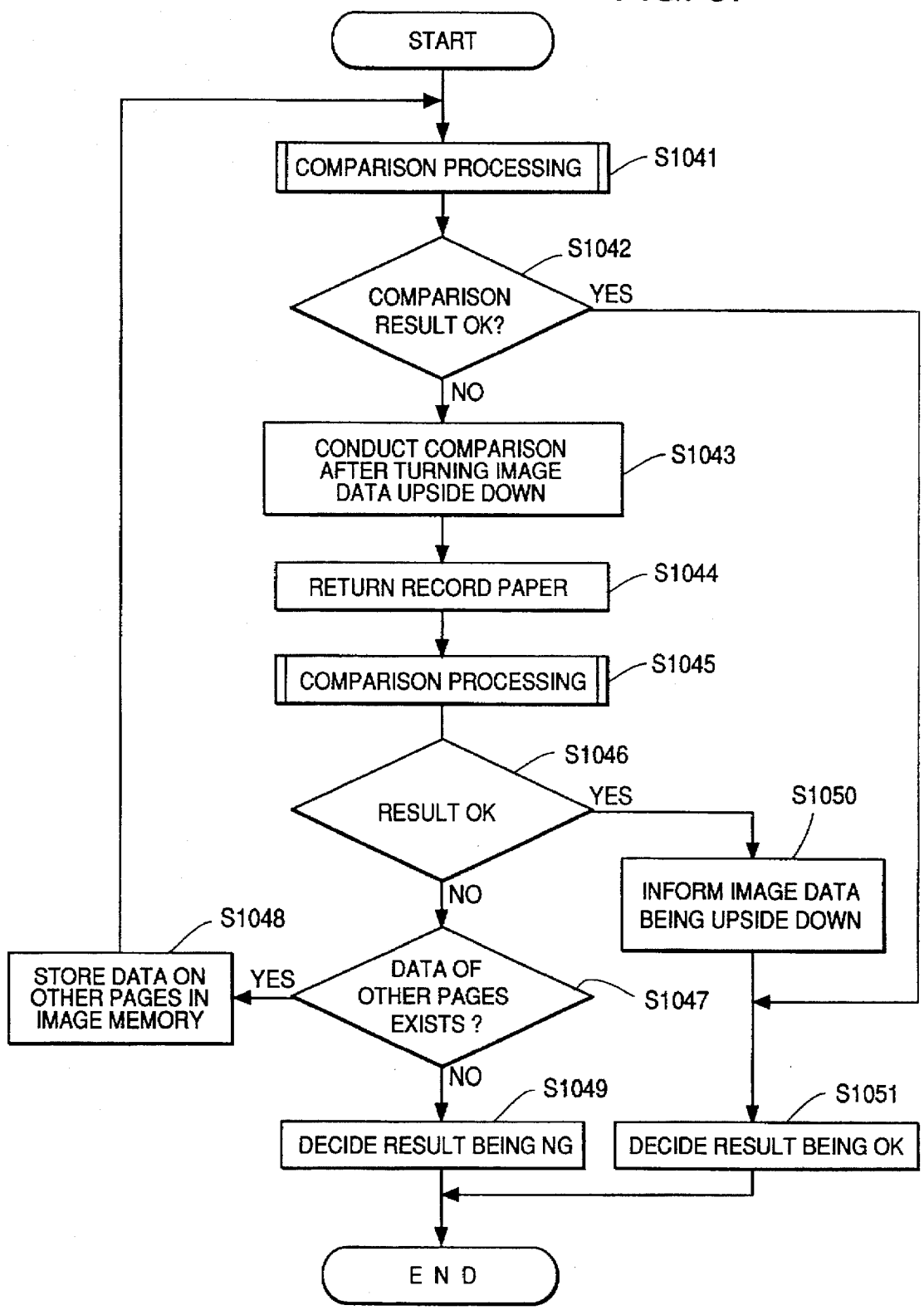
FIG. 67 is a flowchart of the sequence for comparison.
Figure 68:
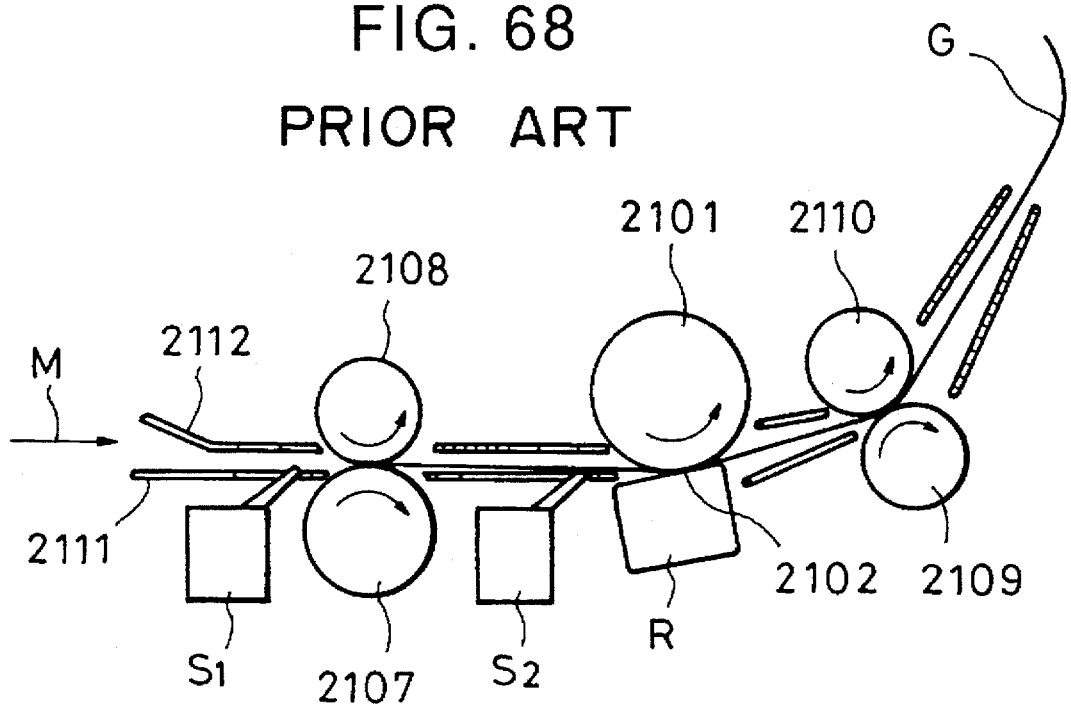
FIG. 68 is a schematic sectional view of the input section of a known image forming apparatus.
Figure 69:
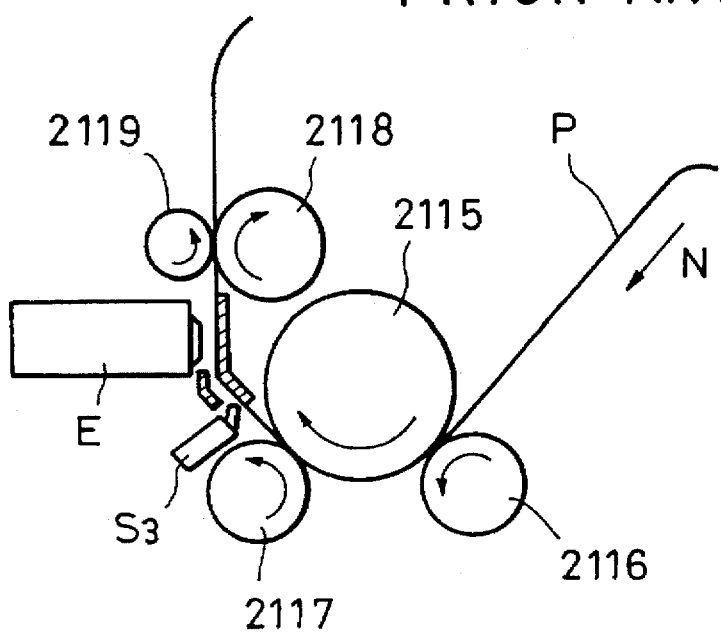
FIG. 69 is a schematic sectional view of the output section of a known image forming apparatus.
Figure 70:
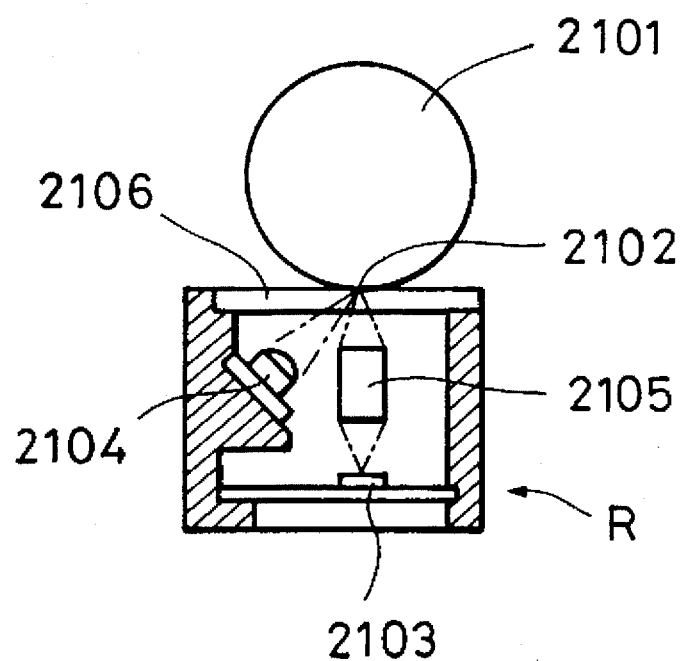
FIG. 70 is a schematic sectional view of the image reader section of a known image forming apparatus.

The flowchart shown in FIG. 67 shows an example procedure to perform the above-described comparison processings. In step S1041, the comparison processing shown in FIG. 66 is performed. If it is determined in step S1042 that the comparison result is good, operation proceeds to step S1051, where the comparator 2028 informs the CPU 2021 that the comparison result is good, thus finishing the operation.

If it is determined in step S1042 that the comparison result is no good, operation proceeds to step S1043, where comparison of the image data being read with the vertically inverted image data which has been recorded starts. In step S1044, the recording sheet P is conveyed back in order to perform comparison processing. In step S1045, the comparison processing is performed. Extraction of image data from the image memory in step S1024 shown in FIG. 66 is performed after turning the image data upside down.

If it is determined in step S1046 that the comparison result is good, operation proceeds to step S1050, where the comparator 2028 informs the CPU 2021 that the image data has been turned upside down (vertically inverted). Then, operation further proceeds to step S1051. When the CPU 2021 is informed that the image data is upside down, the ink-jet printer section 2001 records image data upside down.

If it is determined in step S1046 that the comparison result is no good, operation proceeds to step S1047, where it is checked whether there is any other page of image data which has been recorded but has not been compared with image data being read. If there is image data which has been recorded but not been used as the reference, the image data is inputted to the image memory 2026; for example, a page of image data is inputted to the image memory 2026 from the personal computer connected to the output apparatus. Operation is returned to step S1041, and the procedure described above is repeated.

If it is determined in step S1047 that all the image data that has been used for recording has been compared with the image data being currently read, operation proceeds to step S1049, where the comparator 2028 makes a final determination that the comparison result is no good.

Although comparison of image data is serially performed one page at a time according to the flowchart shown in FIGS. 66 and 67, the image data comparison may be performed in other manners. For example, a page of image data being read can be compared simultaneously with both normally orientated and vertically inverted imaged data which has been used for recording. Further, if the image memory is able to store plural pages of image data which has been used for recording, the image data being read can be compared simultaneously with the plural pages of image data. The amount of time required for comparison processing can thus be reduced.

The number of pixel addresses used for the comparison processing is 9×9=81 in the above description, because the convey error of the recording sheet convey system of the output apparatus is less than 9 pixels along x and y axes.

As described above, in the image forming apparatus according this embodiment, the image input section and the image output section are arranged on a portion of the convey path which is used for both an original G and a recording sheet P. When recording is to be performed onto the second side of a recording sheet P whose first side has been already used for recording, the image recorded on the first side of the recording sheet P is read by the image input section and then compared with image data which has been used for recording and stored in the image memory. In accordance with the comparison result, the apparatus determines the image data to be recorded onto the second side of the recording sheet P and the orientation of the image data before performing the recording. Therefore, the apparatus unfailingly records desired image data onto the second side of the recording sheet P in the same orientation as that of the recording on the first page.

This embodiment employs an ink-jet recording head which utilizes thermal energy to form ink droplet to be ejected.

The construction and principle of the ink-jet recording head is preferably accorded with, for example, disclosure of U.S. Pat. Nos. 4,723,129 and 4,740,796. The principles described in the specifications of the above U.S. Patents can be applied to both the on-demand type and the continuous type. However, the on-demand type ink-jet recording head is particularly advantageous because the on-demand type is able to form bubbles in a liquid (ink) on the basis of one-to-one correspondence to drive signals by applying at least one drive signal which corresponds to a piece of image data and will cause a rapid temperature rise of an electro-thermal converter so as to unfailingly achieve a nucleate boiling of the liquid, the electrothermal converter being arranged corresponding to a liquid passage and/or a sheet impregnated with the liquid, so that the electrothermal converter generates thermal energy to achieve film boiling on the heat-acting surface of the recording heat. As the bubble expands and reduces, the liquid (ink) is ejected from an ejection orifice, thus forming at least one droplet. The drive signal preferably has a pulse waveform because the bubble formed thereby instantly expands and reduces in an appropriate manner, thus achieving highly responsive ejection of the liquid (ink).

Suitable drive signals having a pulse waveform are described in, for example, U.S. Pat. Nos. 4,463,359 and 4,345,262. The quality of recording can be further enhanced by employing the conditions regarding the rate of temperature rise on the heat-acting surface which are described in U.S. Pat. No. 4,313,124.

The ink-jet recording head may be constructed according to the above-mentioned patent specifications, in which the recording head comprises an ejection orifice, a liquid passage and an electrothermal converter. Further, it may be constructed according to U.S. Pat. Nos. 4,558,333 and 4,459,600, in which the heat-acting surface is provided in a bent area.

Still further, the ink-jet recording head may be constructed according to Japanese Patent Application Laid-open No. 59-123670, in which a slit corresponding to a plurality of electrothermal converters is used as an ejection portion of the electrothermal converters, and also according to Japanese Patent Application Laid-open No. 59-138461, in which openings for absorbing thermal energy pressure waves are provided corresponding to the ejection portions.

A full line type recording head having a length corresponding to the maximum width of a recording sheet that can be handled by the printer may be employed according to this embodiment. Such a full line type recording head may achieve the required length either by assembling a plurality of recording heads according to the above-mentioned patent specifications or by forming a single recording head having the required length.

Further, this embodiment may employ a detachable chip-type recording head which achieves connection to the apparatus in terms of electricity and ink supply by simply attaching it to the apparatus, or a cartridge type recording head comprising a recording head and an ink tank connected to the recording head.

According to the present invention, it is preferable to provide means for recovering the recording head or other auxiliary means for the recording head, because such means will further enhance or help constant achievement of the advantages of the present invention. Examples of such means are: capping means; cleaning means; pressure or suction means; and pre-heating means such as an electrothermal converter, another type of heating device and a combination thereof. Further, a pre-print ejection mode for ejecting the ink separately from recording is also effective to achieve stable recording.

The apparatus of the present invention may perform not only single color recording using a recording head for a single color, for example, black, but also plural color recording or full color recording achieved by mixture of different colors using a recording head or a combination of recording heads for different colors.

Although the above embodiments have been described on assumption that the ink is liquid, the ink can be a variety of types, for example, an ink which solidifies at or below room temperature and softens or assumes the liquid state at room temperature. The ink used for the above-described ink-jet recording may be of various types as long as it assumes the liquid state when receiving a record signal, because, according to a normal ink-jet recording method, the temperature of the ink is maintained in a range between 30° C. to 70° C. so as to achieve a viscosity thereof within a range suitable for stable ejection.

An apparatus according to the present invention may employ an ink which liquefies when receiving thermal energy, such as an ink which liquefies when receiving an amount of energy corresponding to a record signal and, thus, is ejected as liquid, or an ink which starts solidifying before reaching a recording medium. Such an ink that assumes the solid state when thermal energy is not applied thereto will prevent undesired evaporation of the ink or prevent an excess temperature rise by absorbing thermal energy for its state change from solid to liquid. This type of ink may be held as either solid or liquid in either a through-hole or a recess of a porous sheet so as to face the electrothermal converter. The above-described inks can be most suitably employed by an output apparatus employing the above-described film boiling method according to the present invention.

Further, the output apparatus of the present invention may take various forms, for example: an image output terminal apparatus of an information processing apparatus, such as a word processor or a computer, which is provided separately from or in combination with the information processing apparatus; a copy machine combined with a reader section or the like; and a facsimile apparatus being able to communicate with an external apparatus.

Further, according to the present invention, comparison determination of image data can also be performed by converting an image pattern into vectors and using the vectors for comparison.

Although the above embodiments employ ink-jet printers as recorder sections, the output apparatus of the present invention may employ an impact-type printer, a thermal ink-transfer type printer, etc.

Although the above embodiments each comprise an image reading sensor and an image recorder section which are arranged facing each other across the recording sheet convey path so as to perform recording onto both sides of a recording sheet, the present invention is not limited by these embodiments. For example, the reading sensor and the recorder section may be arranged on the same side of the convey path. The thus-constructed apparatus is able to perform recording onto one of the sides of a recording sheet having a frame printed beforehand after checking the orientation (upright or inverted) of the frame.

Further, the reading sensors R employed in the above embodiments can be used as scanners for reading original images.

The present invention can be applied to a single apparatus or a system consisting of a plurality of apparatuses. Further, it is to be understood that the present invention can also be achieved by installing a program for executing processing according to the present invention into an apparatus or a system.

Further, although Embodiment 2 employs the printer controller 2022 and the ink-jet printer as shown in FIG. 62, it should be apparent that the output apparatus of the present invention may employ another type of printer such as a laser beam printer as shown in FIG. 58.

As described above, the output apparatus and method of the present invention achieves proper recording by reading an image which has been recorded and checking the image data read therefrom.

The individual components shown in outline or designated by blocks in the drawings are all well-known in the image reading and recording arts and their specific instruction and operation are not critical to the operation or best mode for carrying out the invention.

While the present invention has been described with reference to what are presently considered to be the preferred embodiments, it is to be understood that the invention is not limited to disclosed embodiments. To the contrary, the invention is intended to cover various modifications and equivalent arrangements included within the spirit and scope of the appended claims.

What is claimed:

1. An output apparatus comprising:
   conveyer means for conveying an output medium, said conveyer means having two output medium feed portions including respective feeding convey paths and one output medium ejection portion, wherein the feeding convey paths of said two output medium feed portions join at a joining point into one ejection convey path reaching said output medium ejection portion;
   output means for recording information on the output medium in accordance with output signals, said output means being provided adjacent the ejection convey path downstream from the joining point of the convey paths;
   reader means for reading recorded information which has been recorded on the output medium, said reader means being provided adjacent one of the two feeding convey paths upstream from the joining point; and
   control means for controlling said conveyer means, said output means and said reader means, wherein the output medium is movable in said conveyer means in only a forward direction.

2. An output apparatus according to claim 1, further comprising a display section for displaying at least the recorded information read by said reader means, said display section being provided in a front portion of said output apparatus, wherein said two output medium feed portions are respectively provided adjacent and below said display section and in the rear of said display section.

3. An apparatus comprising:
   conveyer means for conveying a sheet, said conveyer means including a sheet feed portion;
   detector means provided near said sheet feed portion for detecting a sheet set in said sheet feed portion;
   control means for controlling an execution of a program for recording information on a sheet and a program for reading an image on a sheet; and
   deciding means for, when said detector means has detected the sheet set in said sheet feed portion, deciding whether the sheet set in said sheet feed portion corresponds to the program to be executed.

4. An apparatus according to claim 3, further comprising means for, when said deciding means decides that the sheet set in said sheet feed portion does not correspond to the program to be executed, inhibiting the conveyance of the sheet for reading or recording before a break of sheet detection by said detector means.

5. An output apparatus comprising:
   storage means for storing first information to be recorded on an output medium;
   reader means for reading from the output medium fed into said output apparatus second information which has been recorded onto the fed output medium;
   comparing means for comparing the second information read by said reader means with the first information stored in said storage means; and
   setting means for setting at least one of an output position and an output orientation for recording additional information inputted from an external source onto the output medium in accordance with a comparison result provided by said comparing means.

6. An output apparatus according to claim 5, further comprising output means for recording the additional information inputted from the external source onto the output medium in accordance with at least one of the output position and the output orientation which has been set by said setting means.

7. An output apparatus according to claim 6, wherein said output means includes a recording head for recording information onto the output medium.

8. An output apparatus comprising:
   storage means for storing first information to be recorded onto an output medium;
   reader means for reading from an output medium fed in said output apparatus second information which has been recorded onto the fed output medium fed;
   comparing means for comparing the second information read by said reader means with the first information stored in said storage means; and
   selecting means for selecting additional information to be recorded from information inputted from an external source, based on a comparison performed by said comparing means.

9. An output apparatus according to claim 8, further comprising output means for recording the additional information selected by said selecting means from the information inputted from the external source.

10. An output apparatus according to claim 9, wherein said output means comprises a recording head for recording onto an output medium the additional information selected by said selecting means.

11. An output apparatus according to claim 7 or 10, further comprising conveyer means having a convey path for conveying the output medium, wherein said reader means is provided along an upstream portion of said convey path, and wherein said recording head is provided along a downstream portion of said convey path.

12. An output apparatus according to claim 11, wherein said reader means includes a reader portion, and said reader portion and said recording head face each other across said convey path.

13. An output apparatus according to claim 7 or 10, wherein said recording head comprises an ink-jet recording head which ejects ink for recording.

14. An output apparatus according to claim 11, wherein said recording head comprises an ink-jet recording head which ejects ink for recording.

15. An output apparatus according to claim 12, wherein said recording head comprises an ink-jet recording head which ejects ink for recording.

16. An output apparatus according to claim 13, wherein said recording head ejects ink utilizing thermal energy, said ink-jet recording head having a thermal energy converter member for generating the thermal energy to be applied to the ink.

17. An output apparatus according to claim 14, wherein said recording head ejects ink utilizing thermal energy, said ink-jet recording head having a thermal energy converter member for generating the thermal energy to be applied to the ink.

18. An output apparatus according to claim 15, wherein said recording head ejects ink utilizing thermal energy, said ink-jet recording head having a thermal energy converter member for generating the thermal energy to be applied to the ink.

19. An output apparatus according to claim 16, wherein said ink-jet recording head ejects ink from an ejection orifice by utilizing a change in the state of the ink caused by the thermal energy which is applied to the ink by said thermal energy converter member.

20. An output apparatus according to claim 17, wherein said ink-jet recording head ejects ink from an ejection orifice by utilizing a change in the state of the ink caused by the thermal energy which is applied to the ink by said thermal energy converter member.

21. An output apparatus according to claim 18, wherein said ink-jet recording head ejects ink from an ejection orifice by utilizing a change in the state of the ink caused by the thermal energy which is applied to the ink by said thermal energy converter member.

22. An output apparatus according to claim 1, 6 or 9, wherein said output means comprises an ink-jet printer.

23. An output apparatus according to claim 1, 6 or 9, wherein said output means comprises a laser beam printer.

24. An output method comprising the steps of:
storing first information to be recorded onto an output medium;
reading from the output medium second information which has been recorded onto the output medium;
comparing the second information read in said reading step with the first information stored in said storing step; and
setting at least one of an output position and an output orientation for recording additional information inputted from an external source onto the output medium on the basis of the result of a comparison in said comparing step of the second information read with the first information stored.

25. An output method according to claim 24, further comprising the step of recording the additional information inputted from the external source onto the output medium on the basis of settings regarding at least one of the output position and the output orientation.

26. An output method comprising the steps of:
storing first information to be recorded onto an output medium;
reading from the output medium second information which has been recorded onto the output medium;
comparing the second information read in said reading step with the first information stored in said storing step; and
selecting additional information to be recorded onto the output medium from information inputted from the external source on the basis of a result of comparison in said comparing step of the second information read with the first information stored.

27. An output method according to claim 26, further comprising the step of recording onto the output medium the additional information selected from the information inputted from the external source.

* * * * *

UNITED STATES PATENT AND TRADEMARK OFFICE
CERTIFICATE OF CORRECTION

PATENT NO. : 5,710,634
DATED : January 20, 1998
INVENTOR(S) : Hiroyuki KURIYAMA, et al.

It is certified that error appears in the above-identified patent and that said Letters Patent is hereby corrected as shown below:

ON THE COVER PAGE

Item [30] Foreign Application Priority Data:

"Jun. 22, 1992   [JP]   Japan.......... 187534"

should read

--Jun. 22, 1992   [JP]   Japan......... 4-187534--.

IN THE DRAWINGS

Sheet 39 of 69, FIG. 39:

"ATART" should read --START--.

Sheet 63 of 69, FIG. 63:

"EFFCTIVE" should read --EFFECTIVE--.

COLUMN 3:

Line 54, "sheet-set" should read --sheet set--.

UNITED STATES PATENT AND TRADEMARK OFFICE
CERTIFICATE OF CORRECTION

PATENT NO. : 5,710,634
DATED : January 20, 1998
INVENTOR(S) : Hiroyuki KURIYAMA, et al.

It is certified that error appears in the above-identified patent and that said Letters Patent is hereby corrected as shown below:

COLUMN 4:

Line 18, "a" should be deleted.

Figure 28:
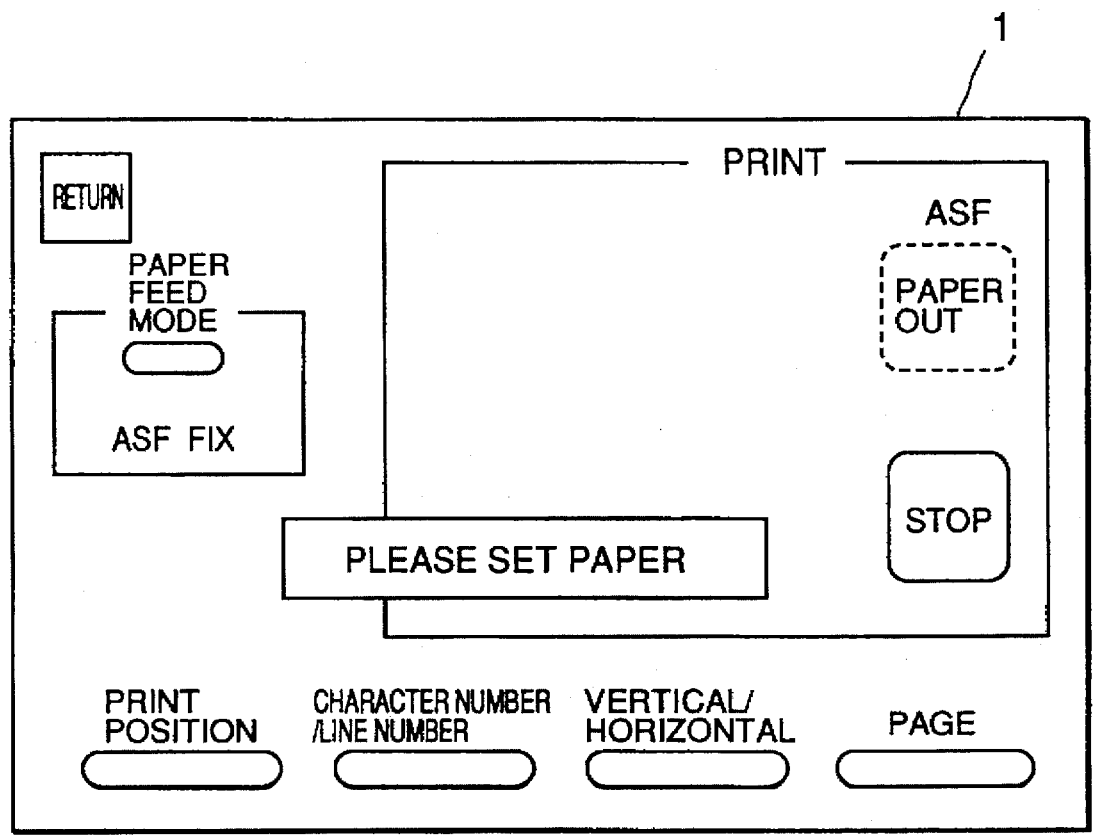
FIG. 28 is a table of various flags for checking the current state of the apparatus in order to determine the construction of a view for printing.
Figure 29:
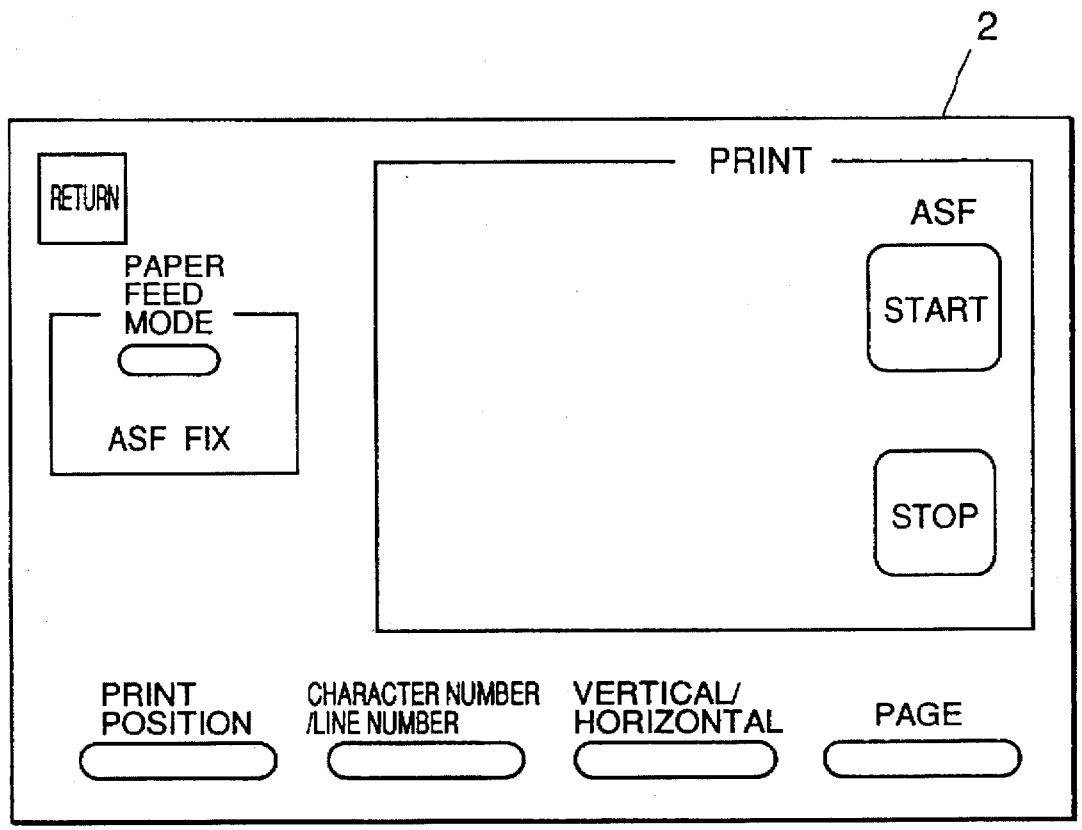
FIG. 29 shows pre-print menu (2)
Figure 30:
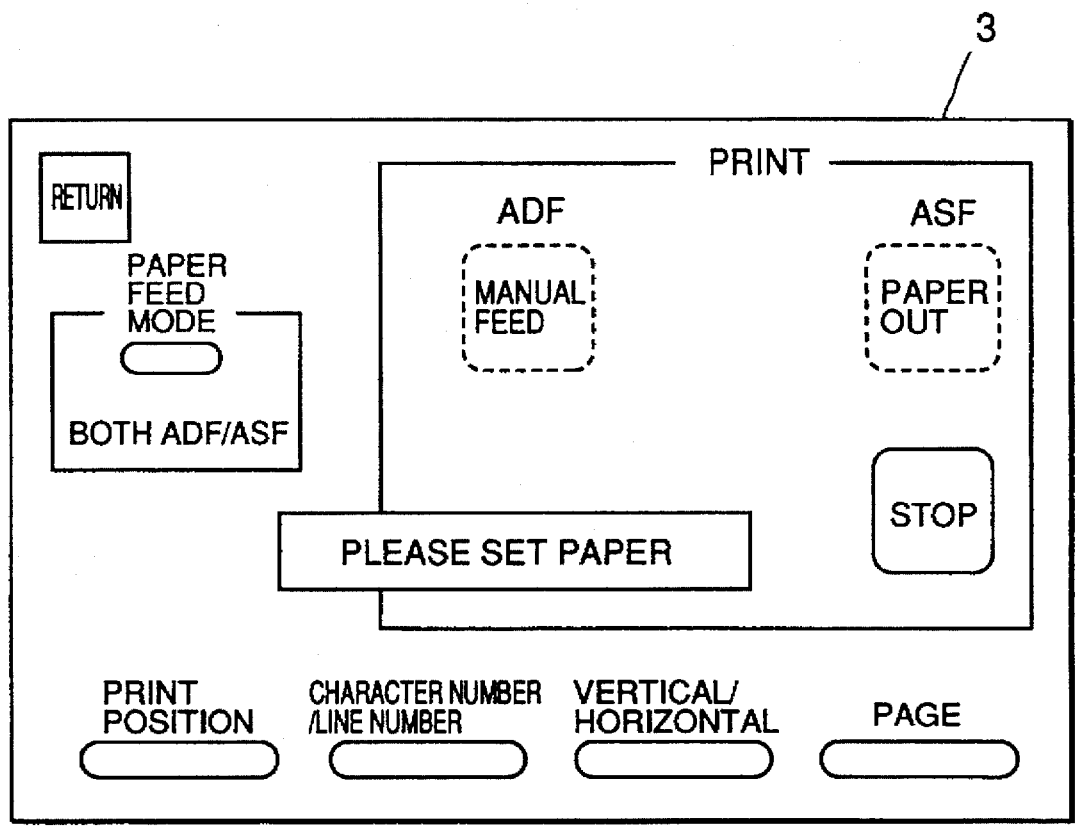
FIG. 30 shows pre-print menu (3)
Figure 31:
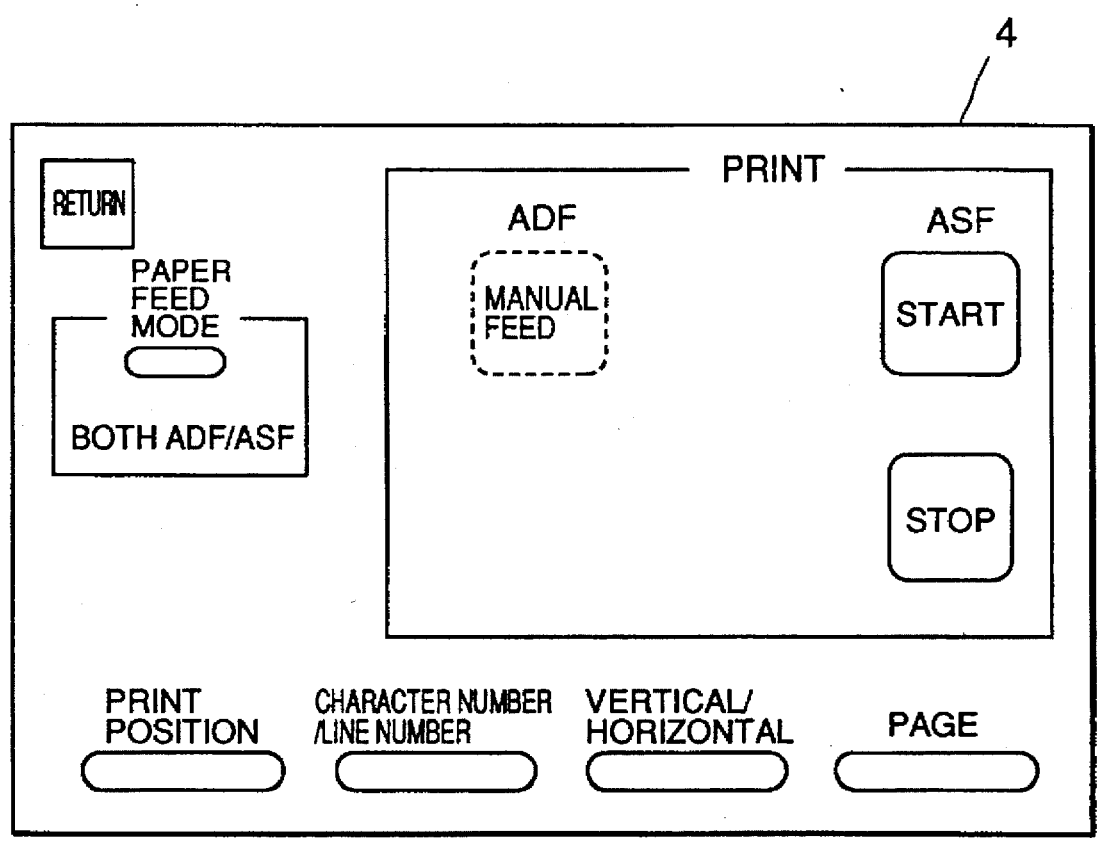
FIG. 31 shows pre-print menu (4)
Figure 32:
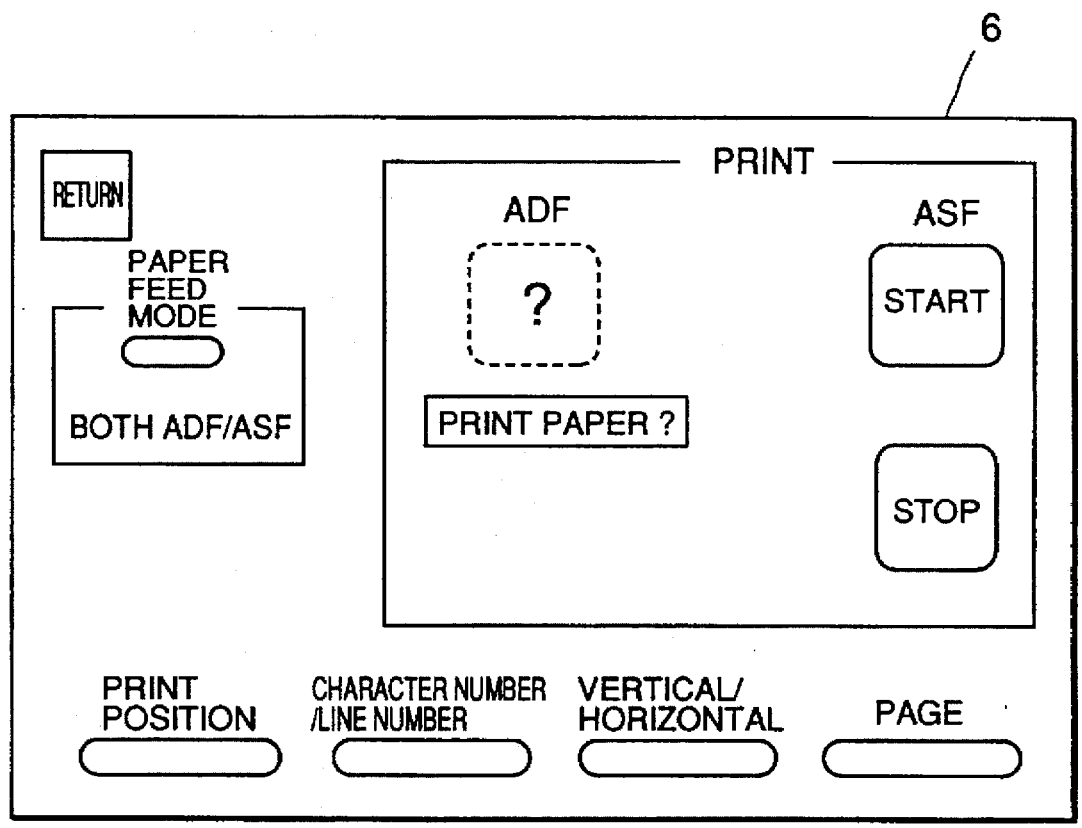
FIG. 32 shows pre-print menu (6)

COLUMN 6:

Line 34, "FIG. 28" should read --FIG. 23--;

Line 47, "menu (2)" should read --menu (2).--;

Line 48, "menu (3)" should read --menu (3).--;

Line 49, "menu (4)" should read --menu (4).--;

Line 50, "menu (6)" should read --menu (6).--;

Line 51, "menu (7)" should read --menu (7).--;

Line 52, "menu (8)" should read --menu (8).--;

Line 63, "display" should read --is a display--;

COLUMN 7:

Line 26, "tion" should read --tion.--;

Line 53, "eembodiments" should read --embodiments--.

UNITED STATES PATENT AND TRADEMARK OFFICE
CERTIFICATE OF CORRECTION

PATENT NO. : 5,710,634
DATED : January 20, 1998
INVENTOR(S) : Hiroyuki KURIYAMA, et al.

It is certified that error appears in the above-identified patent and that said Letters Patent is hereby corrected as shown below:

COLUMN 9:

Line 25, "pate 33" should read --plate 33--.

COLUMN 14:

Line 25, "performs" should read --which performs--.

COLUMN 16:

Line 30, "reached yet" should read --yet reached--.

COLUMN 17:

Line 51, "completion" should read --completion of--.

COLUMN 24:

Line 41, "a intermediate" should read --an intermediate--.

UNITED STATES PATENT AND TRADEMARK OFFICE
CERTIFICATE OF CORRECTION

PATENT NO. : 5,710,634
DATED : January 20, 1998
INVENTOR(S) : Hiroyuki KURIYAMA, et al.

It is certified that error appears in the above-identified patent and that said Letters Patent is hereby corrected as shown below:

COLUMN 25:

Line 66, "dispose" should read --disposed--.

COLUMN 36:

Line 15, "medium fed;" should read --medium;--.

Signed and Sealed this

Fifteenth Day of September, 1998

Attest:

BRUCE LEHMAN

Attesting Officer

Commissioner of Patents and Trademarks